United States Patent
Ogasawara et al.

(10) Patent No.: US 7,206,277 B2
(45) Date of Patent: Apr. 17, 2007

(54) OPTICAL PICKUP DEVICE AND FOCAL ERROR DETECTING DEVICE THEREFOR AND WAVE ABERRATION AND FOCAL ERROR DETECTING DEVICE THEREFOR

(75) Inventors: Masakazu Ogasawara, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 718 days.

(21) Appl. No.: 10/199,706

(22) Filed: Jul. 22, 2002

(65) Prior Publication Data
US 2003/0035350 A1   Feb. 20, 2003

(30) Foreign Application Priority Data
Jul. 27, 2001 (JP) ............................. 2001-227364
Jul. 27, 2001 (JP) ............................. 2001-227365

(51) Int. Cl.
*G11B 7/00* (2006.01)

(52) U.S. Cl. ........................... 369/112.12; 369/112.03; 369/44.23; 369/44.41

(58) Field of Classification Search .................... None
See application file for complete search history.

(56) References Cited

U.S. PATENT DOCUMENTS

| | | | | |
|---|---|---|---|---|
| 5,708,638 A | * | 1/1998 | Braat et al. ............. | 369/112.02 |
| 6,229,600 B1 | * | 5/2001 | Martynov .................... | 356/123 |
| 6,822,209 B2 | * | 11/2004 | Tadano et al. ........... | 369/112.1 |
| 6,967,916 B2 | * | 11/2005 | Sano et al. ............. | 369/112.03 |

FOREIGN PATENT DOCUMENTS

| | | |
|---|---|---|
| JP | 10-106012 | 4/1998 |
| JP | 2000-171346 | 6/2000 |

* cited by examiner

*Primary Examiner*—Andrea Wellington
*Assistant Examiner*—Jorge L. Ortiz-Criado
(74) *Attorney, Agent, or Firm*—Drinker Biddle Reath LLP

(57) ABSTRACT

An optical pickup device includes an irradiating optical system for converging a light beam to form a spot on a recording surface via a light-transmitting layer of an optical recording medium, and a photodetection optical system for converging return light reflected and returned from the spot on a photodetector. The device detects wave aberration and focal error of the light beam. A diffractive optical element is disposed on the optical axis of return light in the photodetection optical system and provided with an annulus. The diffractive optical element annularly extracts, from return light, ray components in the vicinity of a predetermined radius on a pupil on the emitting pupil surface of the irradiating optical system, which is affected by the wave aberration generated in the optical system. The photodetector contains first light receiving components for receiving the ray components transmitted and extracted by the annulus, and second light receiving components for receiving at least some of the ray components other than the ray components transmitted by the annulus. The device further includes a focal error detecting circuit connected to the first light receiving components and which detects the focal error of the light beam on the basis of a subsequent photoelectrically converted output. The device may include a wave aberration error detecting circuit connected to the second light receiving components and which detects the wave aberration of the light beam on the basis of a subsequent photoelectrically converted output.

25 Claims, 42 Drawing Sheets

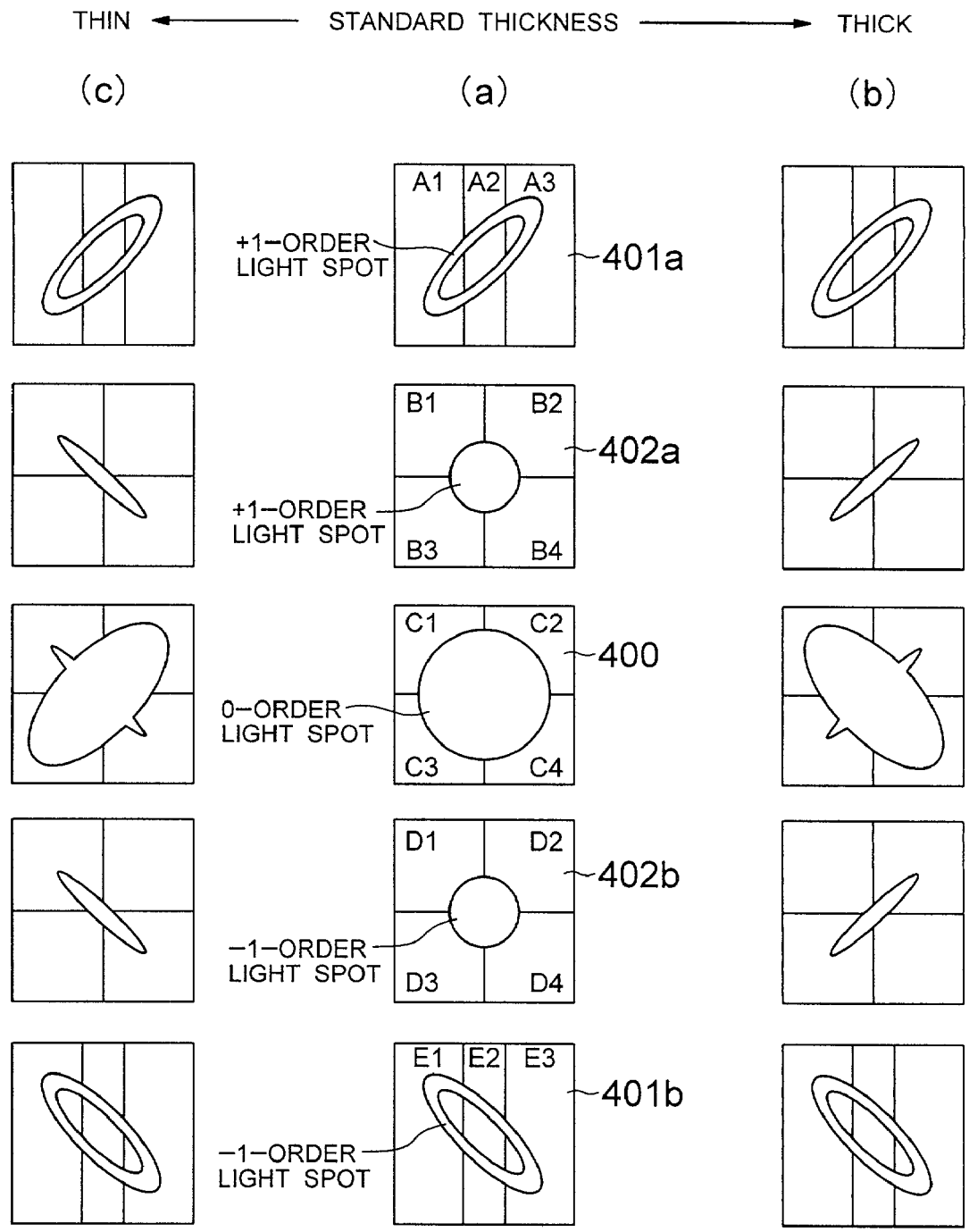

OPTICAL PICKUP DEVICE AND FOCAL ERROR DETECTING DEVICE THEREFOR AND WAVE ABERRATION AND FOCAL ERROR DETECTING DEVICE THEREFOR

BACKGROUND OF THE INVENTION

1. Field of the Invention

The present invention relates to an optical pickup of a recording and reproducing apparatus for an optical data-recording medium such as an optical disk, card or the like.

2. Description of the Related Art

In recent years, there has been developed a high capacity and high recording density information recording medium referred to as a DVD (Digital Versatile Disc) as well as a system using the same medium. A DVD having a single recording layer on one side of the disk has a capacity of 4.7 GB. A two-layer DVD, which is compliant with the DVD standard, has been developed to increase the recording capacity.

There has been proposed an optical system having a high numerical aperture (high NA) and a shorter wavelength light-source in the optical pickup to be used for the next generation multi-layer optical disk system utilizing an optical disk having three or four recording layers in order to further increase the recording capacity. In such a multi-layer optical disk in which a plurality of recording surfaces and interposed spacer layers are alternately stacked, the focal point (the focused point or optimum converging position) of a light beam should be set to a surface of a desired recording layer. In other words, a converged light spot has to be irradiated upon the desired recording layer in order to read information from one side of the optical disk using the optical pickup.

In a converging optical system with a large effective NA, there occurs a large wave aberration (primarily spherical aberration). The amount of wave aberration is proportional to the numerical aperture to the fourth power. The wave aberration is caused by a thickness error of a transparent cover layer in the optical disk. The wave aberration is also caused by a fluctuation of the combined thickness (depth) of the desired recording layer (also referred to merely as a "thickness error"), which depth includes light-transmitting layers all the way from the cover layer to the recording layer in the case of multi-layer structure.

A spherical aberration brought about by the thickness error greatly widens the spot diameter of a light beam illuminated onto the desired recording layer. Thus the focal error signal of the optical pickup is suffered serious damage from the spherical aberration in a high NA irradiating optical system during the operation of focal servo system thereof, even if the optical system and focal servo system is optimized for the predetermined light-transmitting layers. As a result, a large thickness error caused by the light-transmitting layers on the recording layer moves the converged spot away from the optimized position so as to deteriorate the quality of the focal error.

Furthermore, it is necessary to mount a mechanism capable of correcting such spherical aberration on the optical pickup even if it has an optical system with a focal servo system that is optimized for predetermined light-transmitting layers. According to an earlier proposal aimed at compensating for such spherical aberration (Japanese Patent Application Laid-open Kokai No. H10-106012), the passing light beam is afforded a phase difference as a result of the fact that a liquid-crystal element is disposed in the optical path of the converging optical system of an optical pickup, and a voltage proportional to the detected spherical aberration is applied to the liquid-crystal element.

A method has also been proposed (Japanese Patent Application Laid-open Kokai No. 2000-171346) for compensating for such spherical aberration. In such a method, a focal servo function is performed using the light beam components in the vicinity of the optical axis of a light beam passing through an objective lens. Namely, spherical aberration is detected using the beam components on the outside thereof in order to obtain a signal that can be used to compensate for the spherical aberration.

In the conventional case that a part of the light beam passing through the objective lens is used to detect spherical aberration, the error signal of the focal point is greatly affected by the spherical aberration during the focal servo operation in a high NA converging optical system. Specifically, a large thickness error generated by the light-transmitting layer on a recording layer sometimes deflects the optimum converging position of the spot and degrades the focal error signal. For this reason, conventional optical pickup devices are still affected by spherical aberration, making it impossible to obtain adequate reproduction characteristics.

OBJECTS AND SUMMARY OF THE INVENTION

The present invention has been made in view of the above situation. An object of the invention is to provide a focal error detecting device and/or wave aberration and focal error detecting device capable of stably detecting the focal error and/or wave aberration of a converged light beam. Another object of the invention is to an optical pickup device having an optical system including a high NA objective lens and capable of correcting the spherical aberration produced by the thickness error in the optical disk. A further object of the invention is to provide an optical pickup device capable of stably rendering a focal servo operation in a satisfactory manner that the optimum converging position of an irradiated light beam can be traced on the target recording surface.

According to one aspect of the present invention, there is provided an optical pickup device having a function to detect focal error and/or wave aberration of a light beam, the optical pickup device including an irradiating optical system for converging a light beam to form a spot on a recording surface via a light-transmitting layer of an optical recording medium; a photodetection optical system for converging return light reflected and returned from the spot onto a photodetector. The optical pickup device is characterized by comprising a diffractive optical element disposed on the optical axis of return light in the photodetection optical system and provided with an annulus annularly extracting from return light ray components in the vicinity of a predetermined radius on a pupil on an emitting pupil surface of the irradiating optical system. The wave aberration distribution is affected by wave aberration generated in the optical system. The photodetector contains first light receiving components (also referred to as first LRCs hereinbelow) for receiving the ray components transmitted and extracted by the annulus. Further, the photodetector may contain second light receiving components (also referred to as second LRCs hereinbelow) for receiving at least some of the ray components other than the ray components transmitted by the annulus.

The optical pickup device further comprises a focal error detecting circuit (also referred to as FEDC hereinbelow)

connected to the first LRCs and which detects the focal error of the light beam on the basis of a subsequent photoelectrically converted output.

The optical pickup device further may comprise a wave aberration error detecting circuit (also referred to as WAEDC hereinbelow) connected to the second LRCs and which detects the wave aberration of the light beam on the basis of a subsequent photoelectrically converted output.

In the optical pickup device mentioned above, the predetermined radius on the pupil ranges from $0.71R_0$ to $0.74R_0$, where $R_0$ is a radius of the pupil measured in relation to the optical axis of the return light.

In the optical pickup device mentioned above, the annulus has inside and outside radii $r_{min}$ and $r_{max}$ that satisfy Equation (3) below, $$\int_0^{2\pi} \int_{r_{min}}^{r_{max}} I(r\cos\theta, r\sin\theta) S(y(r)) r\, dr\, d\theta = 0 \qquad (3)$$

(In Equation (3), $I(r\cos\theta, r\sin\theta)$ is the distribution of intensities on the emission pupil, $S(y)$ is the focal error signal function, and $y(r)$ is longitudinal aberration).

In the optical pickup device mentioned above, the diffractive optical element is a grating or blaze-type transmitting hologram lens which separates transmitted light into 0-th order diffracted light and 1st order diffracted light by means of a diffraction grating with which the annulus is provided.

The optical pickup device mentioned above further comprises an astigmatism generating optical element (also referred to as AGOE hereinbelow), which is disposed in front of or behind the hologram lens on the optical axis of return light in the photodetection optical system, and which provides astigmatism to the return light.

In the optical pickup device mentioned above, the hologram lens has a function to provide astigmatism to the return light.

In the optical pickup device mentioned above, the first LRCs comprise four split light receiving elements which are disposed adjacent to each other with two orthogonal dividing lines as boundaries, and which receive any type of ±1st order diffracted light emitted by the annulus of the diffractive optical element and arranged about the point of intersection of the dividing lines; and wherein the FEDC generates the difference between the output sums of each diagonally located pair of the four light receiving elements as a focal error signal of the light beam.

In the optical pickup device mentioned above, the diffractive optical element is a grating or blaze-type transmitting hologram lens which separates transmitted light into 0-th order diffracted light and 1st order diffracted light by means of a diffraction grating provided to an internal area defined inside the annulus;

the second LRCs comprise four split light receiving elements which are disposed adjacent to each other with two orthogonal dividing lines as boundaries, and which receive any type of 1st order diffracted light emitted by the internal area of the diffractive optical element and arranged about the point of intersection of the dividing lines; and wherein the WAEDC generates the difference between the output sums of each diagonally located pair of the four light receiving elements as a wave aberration error signal of the light beam.

In the optical pickup device mentioned above, the diffractive optical element is a grating or blaze-type transmitting hologram lens which separates transmitted light into 0-th order diffracted light and 1st order diffracted light by means of a diffraction grating provided to an external area defined outside the annulus;

the second LRCs comprise four split light receiving elements which are disposed adjacent to each other with two orthogonal dividing lines as boundaries, and which receive 1st order diffracted light emitted by the external area of the diffractive optical element and arranged about the point of intersection of the dividing lines; and wherein the WAEDC generates the difference between the output sums of each diagonally located pair of the four light receiving elements as a wave aberration error signal of the light beam.

In the optical pickup device mentioned above, the hologram lens has an off-center lens effect whereby ±1st order diffracted light of the return light are converged by being deflected away from the original optical axis, and possesses a function of acting as a concave or convex lens for any type of ±1st order diffracted light.

In the optical pickup device mentioned above, the first LRCs each comprise at least two light receiving elements which receive ±1st order diffracted light emitted from the annulus of the diffractive optical element and disposed adjacent to each other while separated by dividing lines for dividing the spots formed by the ±1st order diffracted light, the total surface area of at least the one or more light receiving elements on the side of positive polarity being substantially equal to the total surface area of at least the one or more light receiving elements on the side of negative polarity; and wherein the FEDC generates the difference between the output sums of the light receiving elements on the side of positive polarity and the side of negative polarity as a focal error signal of the light beam.

In the optical pickup device mentioned above, the diffractive optical element is a grating or blaze-type transmitting hologram lens which separates transmitted light into 0-th order diffracted light and 1st order diffracted light by means of a diffraction grating provided to an internal area defined inside the annulus;

the second LRCs each comprise at least two light receiving elements which receive 1st order diffracted light emitted from the internal area of the diffractive optical element and which are disposed adjacent to each other while separated by dividing lines for dividing the spot formed by the 1st order diffracted light, the total surface area of the at least one or more light receiving elements on the side of positive polarity being substantially equal to the total surface area of the at least one or more light receiving elements on the side of negative polarity; and wherein the WAEDC generates the difference between the output sums of the light receiving elements on the side of positive polarity and the side of negative polarity as a wave aberration error signal of the light beam.

In the optical pickup device mentioned above, the diffractive optical element is a grating or blaze-type transmitting hologram lens which separates transmitted light into 0-th order diffracted light and 1st order diffracted light by means of a diffraction grating provided to an external area defined outside the annulus;

the second LRCs each comprise at least two light receiving elements which receive 1st order diffracted light emitted from the external area of the diffractive optical element and which are disposed adjacent to each other while separated by dividing lines for dividing the spot formed by the 1st order diffracted light, the total surface area of the at least one or more light receiving elements on the side of positive polarity being substantially equal to the total surface area of the at least one or more light receiving elements on the side of negative polarity; and wherein the WAEDC generates the difference between the output sums of the light receiving elements on the side of positive polarity and the side of negative polarity as a wave aberration error signal of the light beam.

In the optical pickup device mentioned above, the hologram lens possesses a function of acting as a concave or convex lens for any of the types of ±1st order diffracted light produced by return light;

the first LRCs comprise four split light receiving elements which are disposed adjacent to each other with two orthogonal dividing lines as boundaries, and which receive 1st order diffracted light emitted by the annulus of the diffractive optical element and arranged about the point of intersection of the dividing lines; and wherein the FEDC generates the difference between the output sums of each diagonally located pair of the four light receiving elements as a focal error signal of the light beam.

In the optical pickup device mentioned above, the diffractive optical element is a grating or blaze-type transmitting hologram lens which separates transmitted light into 0-th order diffracted light and 1st order diffracted light by means of a diffraction grating provided to an internal area defined inside the annulus;

the second LRCs comprise four split light receiving elements which are disposed adjacent to each other with two orthogonal dividing lines as boundaries, and which receive 1st order diffracted light emitted by the internal area of the diffractive optical element and arranged about the point of intersection of the dividing lines; and wherein the WAEDC generates the difference between the output sums of each diagonally located pair of the four light receiving elements as a wave aberration error signal of the light beam.

According to another aspect of the present invention, there is provided a focal error detecting device having a function to detect focal error of a light beam, comprising:

an irradiating optical system for converging a light beam to form a spot on a recording surface via a light-transmitting layer of an optical recording medium;

a photodetection optical system for converging return light reflected and returned from the spot onto a photodetector;

a diffractive optical element disposed on an optical axis of the return light in the photodetection optical system and provided with an annulus annularly extracting from the return light ray components in a vicinity of a predetermined radius on a pupil on an emitting pupil surface of the irradiating optical system, the wave aberration distribution being affected by the wave aberration generated in the optical system;

first LRCs provided with the photodetector and receiving the ray components transmitted and extracted by the annulus; and a FEDC connected to the first LRCs and detecting a focal error of the light beam on the basis of a subsequent photoelectrically converted output.

According to a further aspect of the present invention, there is provided a wave aberration and focal error detecting device having a function to detect wave aberration and focal error of a light beam, comprising:

an irradiating optical system for converging a light beam to form a spot on a recording surface via a light-transmitting layer of an optical recording medium;

a photodetection optical system for converging return light reflected and returned from the spot onto a photodetector;

a diffractive optical element disposed on an optical axis of the return light in the photodetection optical system and provided with an annulus annularly extracting from the return light ray components in a vicinity of a predetermined radius on a pupil on an emitting pupil surface of the irradiating optical system, the wave aberration distribution being affected by the wave aberration generated in the optical system;

first LRCs provided with the photodetector and receiving the ray components transmitted and extracted by the annulus;

second LRCs provided with the photodetector and receiving at least some of the ray components other than the ray components transmitted by the annulus;

a FEDC connected to the first LRCs and detecting a focal error of the light beam on the basis of a subsequent photoelectrically converted output; and a WAEDC connected to the second LRCs and detecting the wave aberration of the light beam on the basis of a subsequent photoelectrically converted output.

BRIEF DESCRIPTION OF THE DRAWINGS

FIG. 46 is a schematic plan view depicting photodetectors and illustrating the modes of return light spots on the LRCs for 0-th or ±1st order diffracted light produced by return light during the converging of a light beam in the optical pickup device according to another embodiment of the present invention.

DESCRIPTION OF THE PREFERRED EMBODIMENTS

Embodiments of recording and reproducing apparatus having the optical pickup device according to the present invention will be described below with reference to the drawings.

First Embodiment

Figure 1:
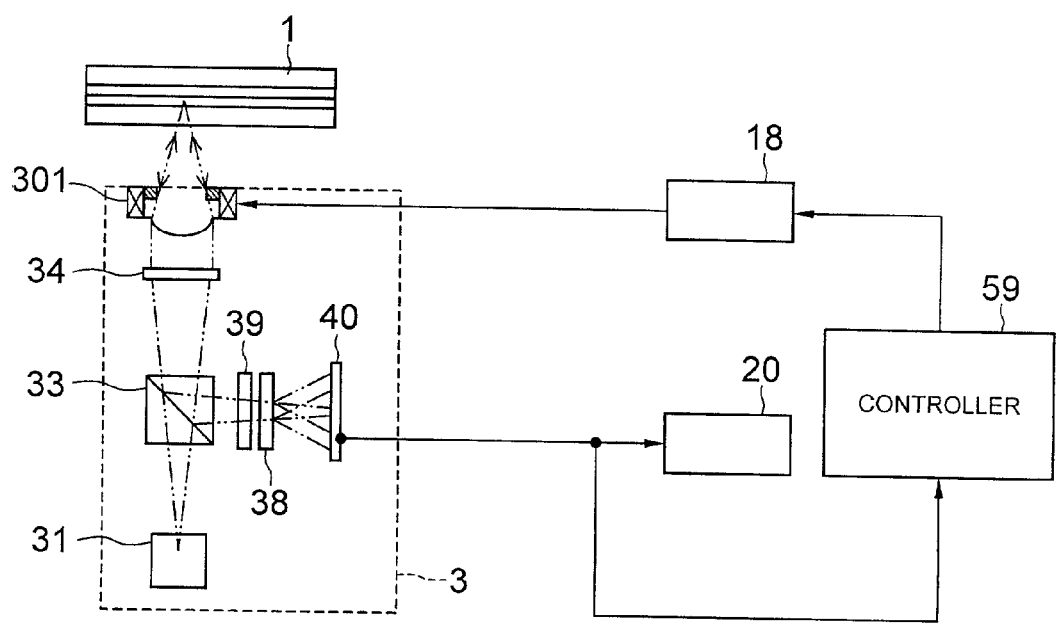
FIG. 1 is a schematic block diagram depicting the structure of a recording and reproducing apparatus provided with the optical pickup device according to the present invention.

FIG. 1 is a diagram depicting the structure of a recording and reproducing apparatus as a first embodiment of the present invention.

A recording and reproducing apparatus fitted with an optical pickup device 3 comprises a driving controller 59 which controllably drives a focal actuator 301 via a focal driving circuit 18 connected thereto. A photodetector 40 in the pickup device 3 is connected to the driving controller 59. The driving controller 59 is designed to generate error signals on the basis of signals detected by the photodetector 40. The error signals are fed to the focal driving circuit 18 and the like. The recording and reproducing apparatus also has a demodulation circuit 20 for generating a reproduced signal based on the detected signal, and is further provided with a spindle motor, slider, and a servo driving circuit for tracking (not shown).

Figure 2:
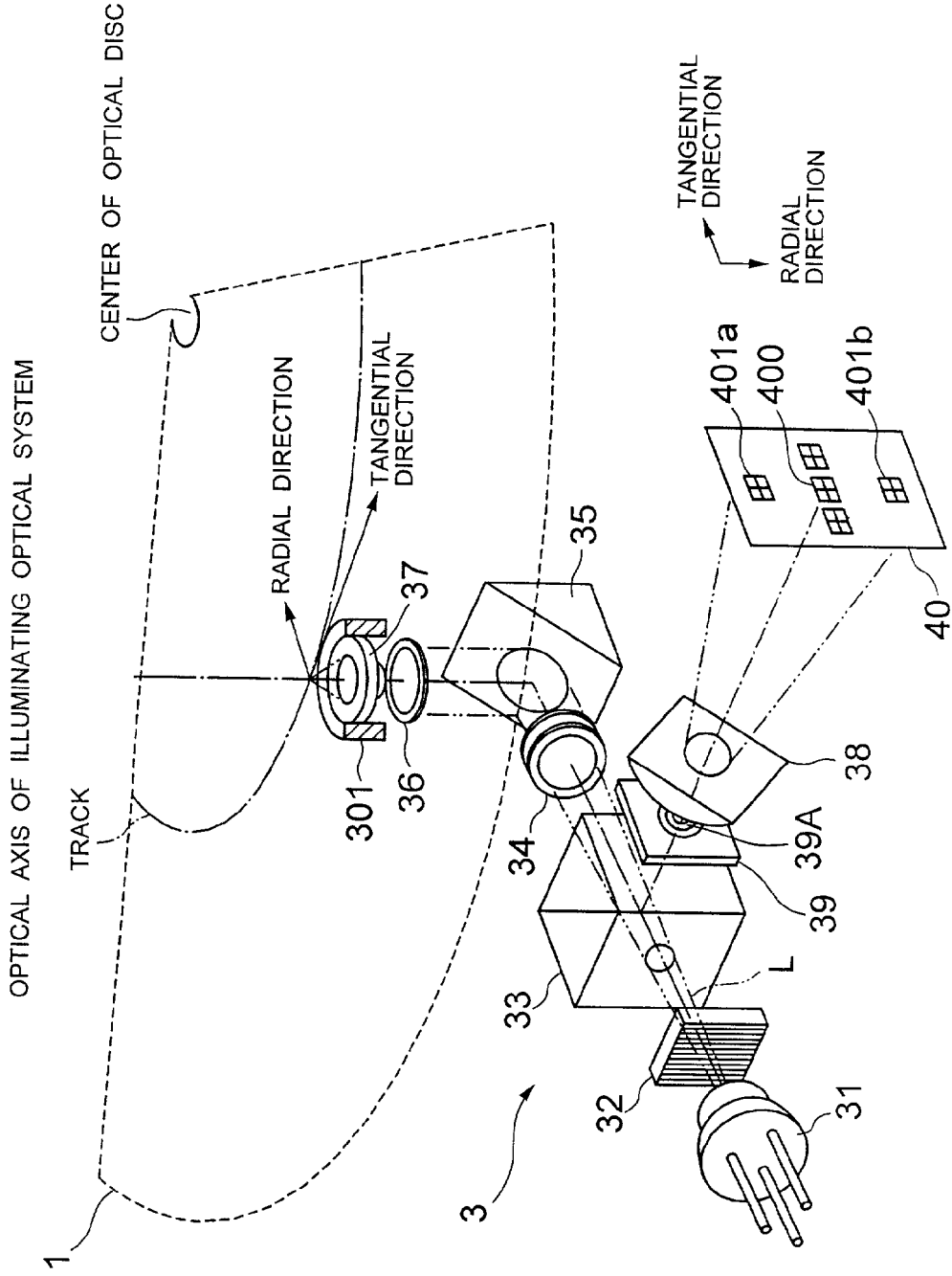
FIG. 2 is a schematic perspective view depicting the structure of the optical pickup device according to the present invention.

FIG. 2 is a schematic perspective view depicting a structure of the optical pickup device according to the present invention.

The optical pickup device 3 comprises a semiconductor laser 31 or a light source; a grating 32; a polarization beam splitter 33; a collimator lens 34; a mirror 35; a quarter-wave plate 36; an objective lens 37; an AGOE 38; a diffractive optical element 39 such as a holographic lens or the like; and a photodetector 40. The AGOE 38 may be selected from a cylindrical lens, multi-lens, or the like made of a transparent material. The photodetector 40 comprises a 0-th order diffracted light receiving component (also referred to as 0-th order DLRC hereinbelow) 400 and ±1st order diffracted light receiving components (also referred to as ±1st order DLRCs hereinbelow) 401a and 401b. An optical disk 1 is disposed at a distance from the objective lens 37 on the turntable (not shown) of a spindle motor belonging to the recording and reproducing apparatus.

The optical pickup device 3 contains a focal actuator 301 which supports and drives the objective lens 37. In the optical pickup device 3, a spherical aberration correcting device (also referred to as SACD hereinbelow) may be disposed between the polarization beam splitter 33 and the objective lens 37 in the optical path to correct aberration.

The focal actuator 301 performs a focal servo function to move the objective lens 37 along the optical axis in the direction perpendicular to the surface of the optical disk 1 in accordance with the level of the focal error signal provided by the focal driving circuit 18 so as to converge the light beam emitted by the light source onto a predetermined recording layer.

Figure 3:
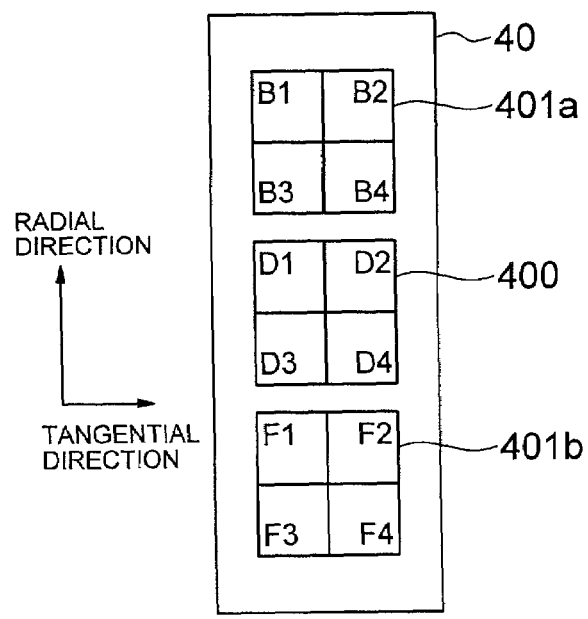
FIG. 3 is a schematic plan view depicting the photodetector of the optical pickup device according to the present invention.

As shown in FIG. 3, the 0-th order DLRC 400 of the photodetector 40 is disposed on the optical axis and comprises four split light receiving elements each having an equal area (D1, D2, D3, D4). The light receiving elements are disposed adjacent to each other so as to be separated by two orthogonal dividing lines as boundaries one of which is parallel to the longitudinal track (tangential) direction of the optical disk 1. The ±1st order DLRCs 401a and 401b are disposed on both sides of the 0-th order DLRC 400. The ±1st order DLRCs 401a and 401b consist of, respectively, four individual light receiving elements (B1, B2, B3, B4) and (F1, F2, F3, F4) each having an equal area in the set. The light receiving elements in each set are also disposed adjacent to each other so as to be separated by two orthogonal dividing lines. The photodetector 40 is disposed in the plane perpendicular to the optical axis in a manner such that, when the light spot is formed on the recording layer of an optical disk at the focal point by 0-th order diffracted light, the focusing light spot forms the least circle of confusion described below and occupies a position at the intersection of the dividing line on the 0-th order DLRC 400. The ±1st order DLRCs are formed and arranged in point-symmetry with respect to the center (i.e., intersection of orthogonal dividing lines) of the 0-th order DLRC 400. Namely, the ±1st order DLRCs are symmetrical with respect to the straight lines extending from the center in the track direction and perpendicular direction.

As shown in FIG. 2, the light beam emitted by the semiconductor laser 31 reaches the polarization beam splitter 33 via the grating 32. The polarization beam splitter 33 has a polarizing mirror, and the incident light beam passes through the polarization beam splitter 33 and travels through the collimator lens 34. The optical path is then diverted at a right angle by the mirror 35, and the light beam passes through the quarter-wave plate 36 and reaches a predetermined data-recording surface of the optical disk 1 from the objective lens 37. The objective lens 37 of the irradiating optical system can thus form rows of pits arranged in a spiral or in concentric circles on the optical disk 1, or can form spots on the recording surface by focusing the light beam on the tracks. The spot formed by a beam of illuminating light can thus write or read data on the data-recording surface of the optical disk.

The return light resulting from the reflection of the light beam spot on the recording surface of the optical disk is guided to the photodetector 40 by a photodetection optical system as follows. Specifically, the return light passes through the objective lens 37, quarter-wave plate 36, mirror 35, and collimator lens 34, returning to the polarization beam splitter 33. In this case, the optical path of return light is changed by the polarization beam splitter 33 to a direction different from the direction oriented toward the semiconductor laser 31, and the return light is guided to the diffractive optical element 39 and AGOE 38. The return light that has passed through the diffractive optical element 39 and AGOE 38 is provided with astigmatism, diffracted, split and directed to the 0-th order DLRC 400 and ±1st order DLRCs 401a and 401b in the photodetector 40 as diffracted light. It is also possible to arrange the AGOE 38 and diffractive optical element 39 in reverse order and to provide the return light with astigmatism after it has been diffracted. According to another option, the cylindrical lens may be replaced with a holographic lens having an ability to provide the return light with astigmatism.

The LRCs of the photodetector 40 photoelectrically convert received light to photodetection electrical signals respectively and feed them to the driving controller 59 shown in FIG. 1. The driving controller 59, which is connected to the photodetector 40, performs predetermined operations and generates a focal error signal FE and a reproduced signal RF (Radio Frequency). Specifically, the signal outputs FE and RF of the driving controller 59 can be expressed by the following equations:

$FE=(B1+B4+F1+F4)-(B2+B4+F1+F3)$ $RF=D1+D2+D3+D4,$ where the outputs are denoted by the same symbols as those used for the light receiving elements of the photodetector 40 shown in FIG. 3.

The driving controller 59 provides the focal error signal FE and reproduced signal RF to the focal driving circuit 18 and demodulation circuit 20, respectively (FIG. 1). The photoelectrically converted signals of the light receiving elements whose one of the dividing lines is parallel to the tangential direction of the optical disk, can be used to generate tracking error signals.

The hologram lens of the diffractive optical element 39, which is disposed on the optical axis of return light in the photodetection optical system shown in FIG. 2, includes a grating or a blaze-type transparent hologram comprising a diffraction grating formed on a parallel plate made of optical glass.

Figure 4:
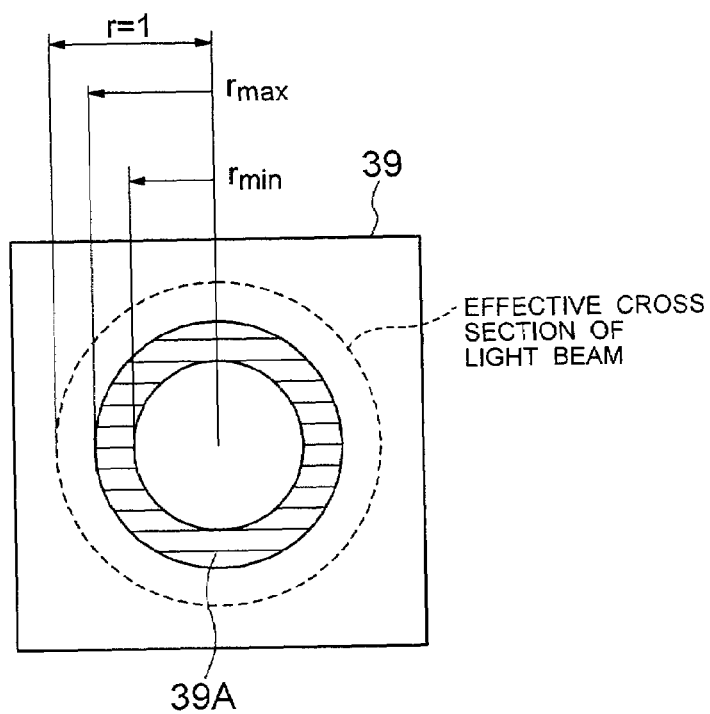
FIG. 4 is a schematic plan view depicting the structure of a hologram lens for the diffractive optical element of the optical pickup device according to the present invention.

FIG. 4 shows the hologram lens of the diffractive optical element 39 which has a diffraction grating in the form of an annulus 39A to extract a predetermined ray components from the return light in the form of a ring. The predetermined ray components extracted by the annulus 39A are certain ray components that lie in the vicinity of a circlet with a predetermined radius corresponding to the maximum value of the wave aberration distribution which is generated by a light-transmitting layer formed on the data-recording surface of the optical disk 1. The annular wave aberration distribution appears as a pupil on an emitting pupil surface of the irradiating optical system including the objective lens 37 or the like. For this reason, the annulus 39A covers an area that extends in the range of radius from $0.71R_0$ to $0.74R_0$, where $R_0$ is the pupil radius measured in relation to the optical axis of return light. Thus the annulus 39A extracting the predetermined ray components is disposed in the effective cross section of the return light beam.

Figure 5:
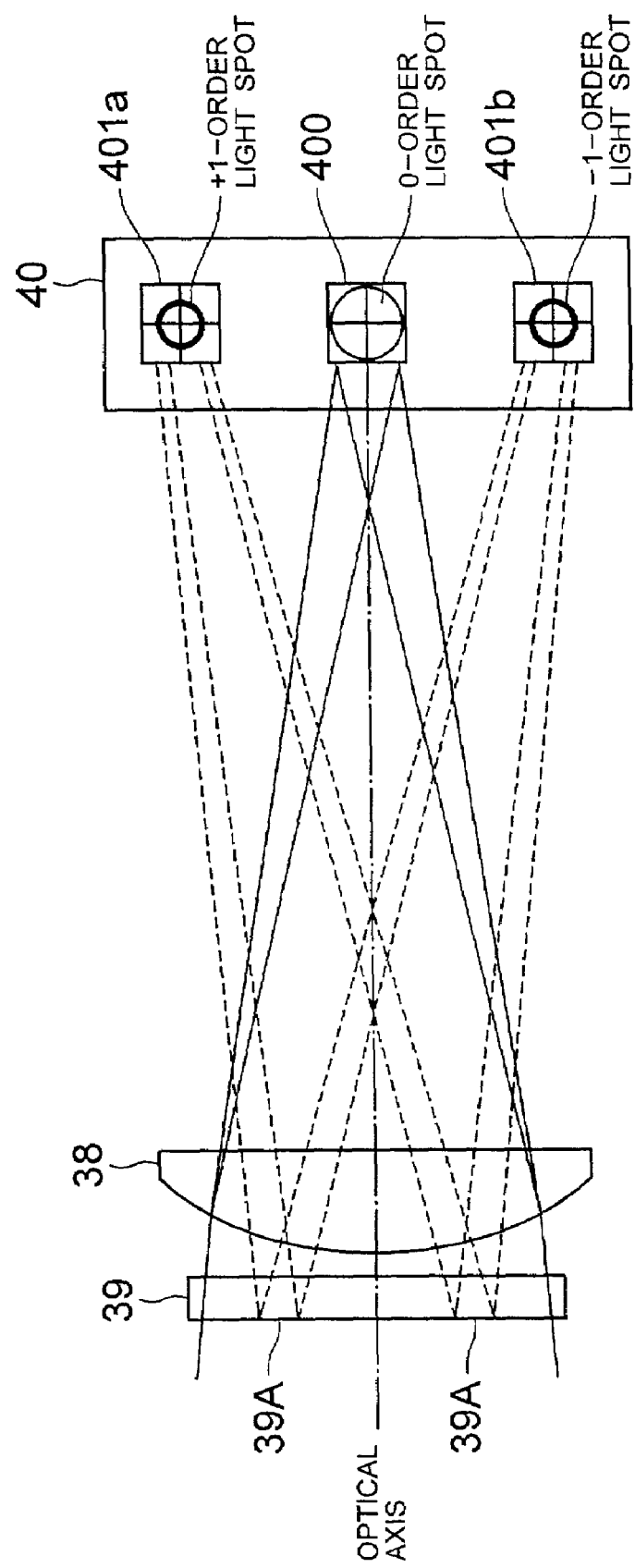
FIG. 5 is a schematic diagram depicting ray paths of diffracted light caused due to the return light from the hologram lens of the diffractive optical element to the photodetector of the optical pickup device according to the present invention.

FIG. 5 shows the ray paths of diffracted light caused due to the return light from the hologram lens of the diffractive optical element 39 through the cylindrical lens 38 (AGOE) to the photodetector 40 of the optical pickup. The element 39 and the cylindrical lens 38 appear in cross section but the photodetector 40 in front view in the Figure. The annulus 39A of the diffractive optical element 39 guides ±1st order diffracted light as ring spots to the respective ±1st order DLRCs 401a and 401b of the photodetector 40 via the cylindrical lens 38. The annulus 39A of the diffractive optical element 39 guides 0-th order diffracted light as a circular spot to the 0-th order DLRC 400 of the photodetector 40 via the cylindrical lens 38. In this way, the diffractive optical element 39 separates return light into 0-th and ±1st order diffracted light. Specifically, 0-th order diffracted light passes through the diffractive optical element 39 and cylindrical lens 38 while unaffected by the action of the hologram lens. The 0-th order diffracted light travels without deviating from the original optical axis, but ±1st order diffracted light are symmetrically deflected with respect to the optical axis. The 0-th order DLRC 400 is connected to the demodulation circuit 20. The ±1st order DLRCs are connected to the driving controller 59, and the outputs thereof are presented to the corresponding electric circuits.

Figure 6:
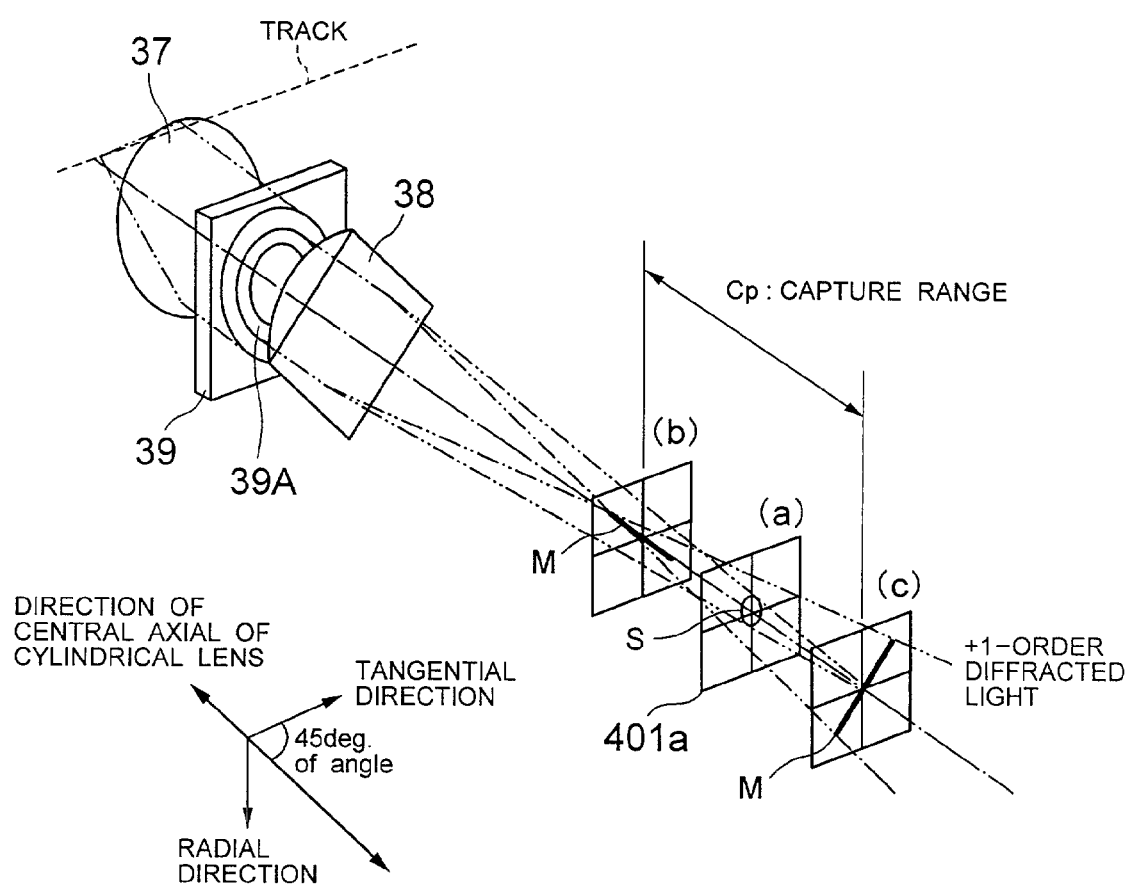
FIG. 6 is a schematic perspective view depicting the structure of a photodetection optical system for the optical pickup device according to the present invention.

A first embodiment for performing the focal servo function in accordance with an astigmatism technique with the aid of the ±1st order diffracted light obtained from the annulus 39A will now be described in detail with reference to FIG. 6. The outputs of the ±1st order DLRCs 401a and 401b for receiving the annular spot extracted by the annulus 39A of the diffractive optical element 39 are used to detect the focal error signal FE. The astigmatism technique is a method in which, if an AGOE such as a cylindrical lens, parallel plate, or the like is disposed in the optical system of return light and the return light is received near the center of four split light receiving components, then variations in the spot shape of return light are detected to generate a focal error signal. In FIG. 6, elements other than the objective lens 37, the AGOE 38 in the form of a cylindrical lens, the diffractive optical element 39 in the form of a hologram lens, or the +1st order DLRC 401a are omitted in order to describe an operation that is typical of the +1st order diffracted light from the annulus 39A.

As shown in FIG. 6, the +1st order diffracted light, which is generated by annulus 39A of the diffractive optical element 39 based on return light passed from the objective lens 37, passes through the cylindrical lens 38 and acquires astigmatism, so that a ring light spot S (the least circle or ring of confusion as will be described) of +1st order diffracted light appears at the center of the +1st order DLRC 401a whose light-receiving surface is divided into four parts by two orthogonal line segments in the longitudinal (tangential) track direction and radial disk direction.

The cylindrical lens 38 is disposed in the optical path of return light in a manner such that the center axis of the lens (axis of rotational symmetry of the cylindrical surface constituting the lens surface) extends at an angle of 45 degrees in relation to the longitudinal track direction of the optical disk, as shown in FIG. 6. In this arrangement, the converging return light (+1st order diffracted light) is provided with astigmatism by the cylindrical lens 38. Since such return light acquires two different types of astigmatism oriented 90 degrees relative to each other, an image such as a front line image M, the least ring of confusion S, or back line image M is formed according to the distance variations between the optical disk (track) and the objective lens 37. The optical detection system operates in such a manner that, when the light beam is just focused on the track, the least ring of confusion S is formed to the +1st order DLRC 401a as shown at (a) in FIG. 6. When defocusing as shown at (b) or (c) in FIG. 6, a line image or elliptical ring spot extending in the diagonal direction of the light-receiving surface appears. The distance between the line images obtained by converging +1st order diffracted light (that is, the distance between (b) and (c) in FIG. 6) corresponds to the capture range Cp of the focal error signal.

Figure 7:
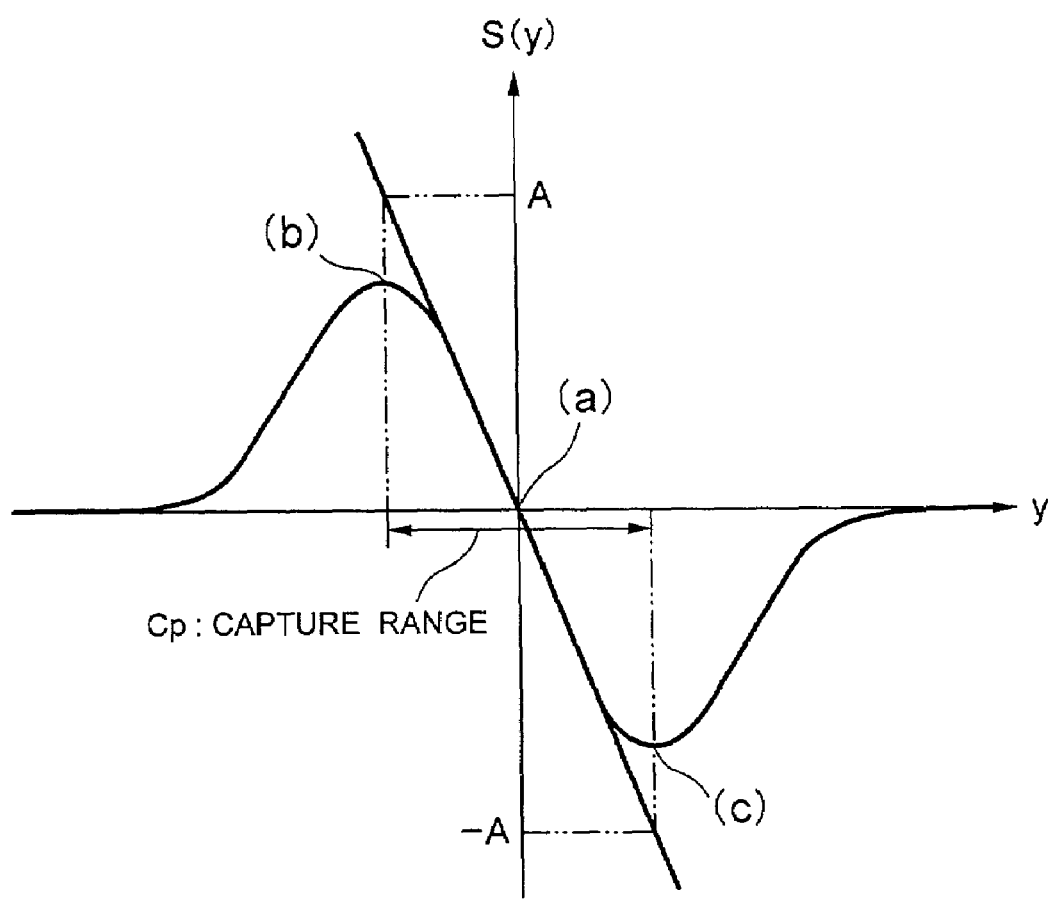
FIG. 7 is a graph depicting the manner in which a focal error signal having a capture range varies in the optical pickup device according to the present invention.

FIG. 7 shows function S(y), so-called S-shaped characteristic, of the focal error signal FE generated based on the output of the +1st order DLRC 401a. For example, the vertical axis denotes intensity of the focal error signal S(y): FE=(B1+B4)−(B2+B3) of component 401a; the horizontal axis denotes distance (y) between the optical disk and the objective lens. The S-shaped characteristic shows that, when being the just focusing state, the truly ring spot at (a) in FIG. 6 is formed at the center on the light receiving elements (B1, B2, B3, B4) resulting that the values obtained by adding the photoelectrically converted outputs of two diagonally arranged light receiving elements (B1, B4) and (B2, B3) are equal to each other, so that the focal error component becomes zero. This is because the intensity distributions of ring spot on the four split LRC 401a is symmetrical with respect to the centers O thereof; that is, symmetrical in the tangential direction and radial direction. In addition, when being the defocusing state, oval or linear ring spot is formed on the LRC in the diagonal direction as shown at (b) or (c) in FIG. 6, so the values obtained by adding the photoelectrically converted outputs of two diagonally arranged elements have mutually opposite polarity. Therefore the distance between the maximum (b) and minimum (c) shown in FIG. 7 of the S-shaped characteristic of the focal error signal function corresponds to the capture range Cp.

Figure 8:
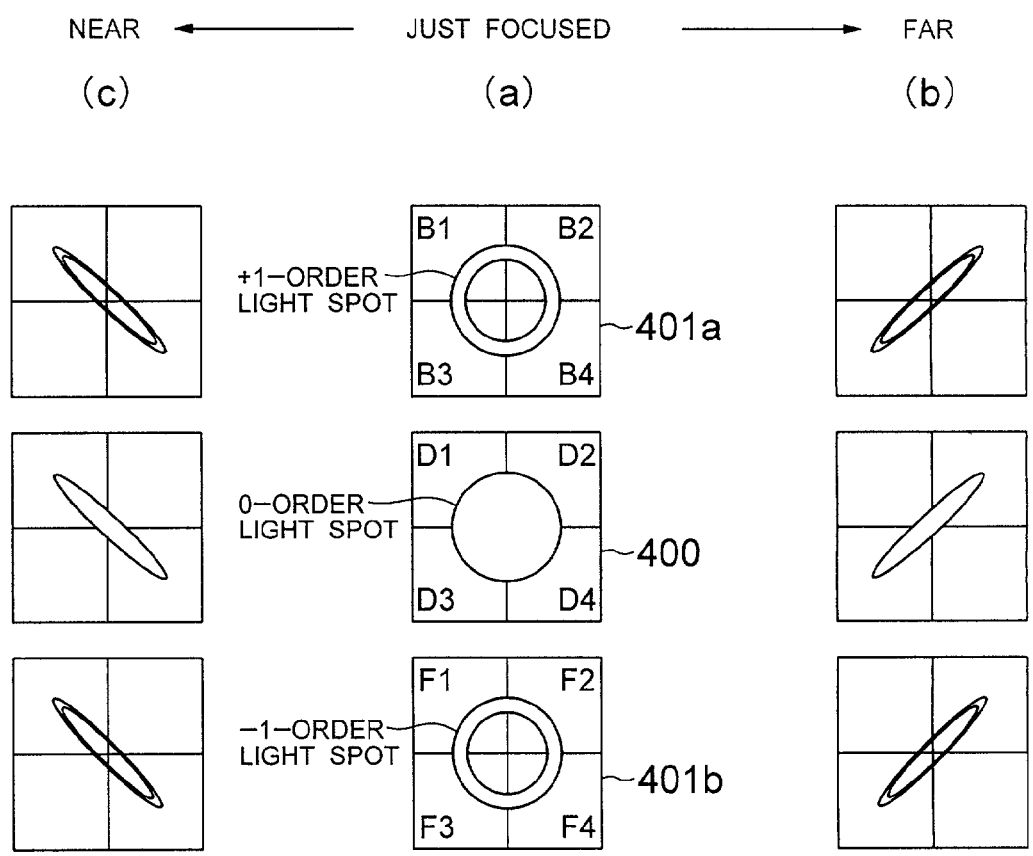
FIG. 8 is a schematic plan view depicting photodetectors and illustrating the modes of return light spots on the LRCs for 0-th or ±1st order diffracted light produced by return light during the converging of a light beam in the optical pickup device according to the present invention.

FIG. 8 illustrates the modes of return light spots on the LRCs for 0-th or ±1st order diffracted light produced by return light during the converging of a light having a Gauss intensity distribution. As shown at (a) in FIG. 8, when the light is focused under conditions in which the cover layer of the optical disk has a predetermined thickness, then 0-order diffracted light is converged into the least circle spot of confusion on the 0-th order DLRC 400 and, at the same time, ±1st order diffracted light are converged into the least circular ring spots of confusion on the ±1st order DLRCs 401a and 401b.

As shown at (b) in FIG. 8, in case that the optical disk is placed farther away from the focal point of the objective lens, 0-th and ±1st order diffracted light are converged into distorted oval and oval ring spots extending in one diagonal direction of the respective light-receiving elements. As shown at (c) in FIG. 8, on the other hand in case that the optical disk is placed closer to the objective lens than to the focal point thereof, 0-th and ±1st order diffracted light are converged into distorted oval and oval ring spots extending in the other diagonal direction of the respective light-receiving elements with astigmatism of 90 degrees rotated.

Even during the just focused state of the light beam depicted at (a) in FIG. 8, the spot diameter of return light illuminating the LRCs of the photodetector varies considerably because spherical aberration is generated when the thickness error occurs away from the predetermined thickness of the cover layer or other layers belonging to the optical disk. However, the circular spots on the ±1st order DLRCs 401a and 401b have stable shapes, that is, they keep point symmetry with respect to the centers of the LRCs. This is because the annulus 39A of the diffraction grating belonging to the diffractive optical element 39 of the hologram lens operates such that predetermined ray components resistant to the thickness variations of the cover layer belonging to the optical disk 1 are extracted from return light in the form of a ring.

The inventors have discovered that such extracted ray components of return light are related to the formation of areas characterized by considerable spherical aberration. The inventors thus also propose an approach for detection of focal error and/or aberration in which the ray components are extracted in the form of a predetermined annular ring by a diffractive optical element, and the focal error and/or aberration are detected using the intensity distribution of these ray components. For example, the ray components existing in the vicinity of a normalized radius for a cross section of a light beam corresponding to the maximum value of a wave aberration distribution on the emitting pupil surface, are usable for detection of focal error and/or aberration in the optical system using an objective lens with a numerical aperture of 0.85, as described above.

Figure 9:
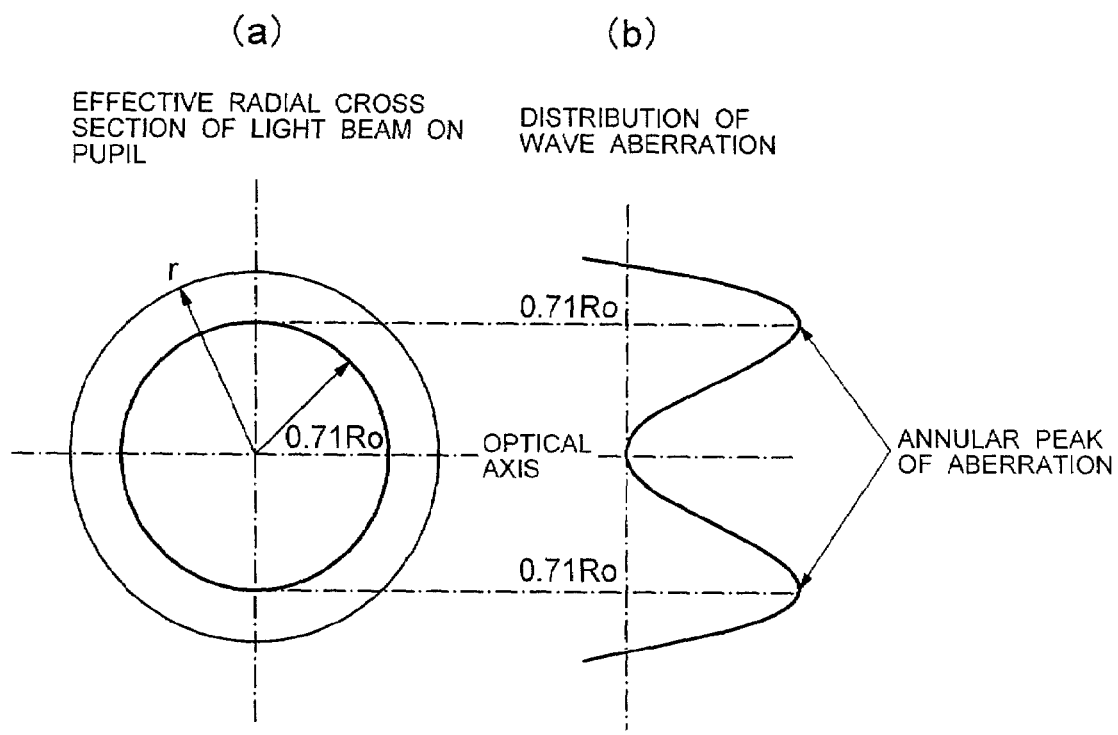
FIG. 9 is a schematic diagram depicting the relationship between the cross section of a light beam on a pupil and the wave aberration produced when spherical aberration is caused by a thickness error in the cover layer of an optical disk.

FIG. 9 shows the relationship between the cross section of a light beam (a) on a pupil and wave aberration (b) existing when spherical aberration is generated by the thickness error in a cover layer of an optical disk. When the focus is aligned with the best image point, the wave aberration distribution (b) has a peak (annular aberration) in the vicinity of radius $0.71R_0$, where $R_0$ is the pupil radius of the objective lens. The image point of a light ray passing over a circle with an annular aberration radius of $0.71R_0$ does not move at all even when the pickup develops spherical aberration. The annular aberration radius varies somewhat with the NA of the objective lens and increases slightly with greater NA. This is attributed to the fact that higher-order components increase in addition to the components that are proportional to radius squared and that belong to the spherical aberration thus generated. For example, the annular aberration radius reaches a value of $0.74R_0$ when the objective lens's NA is 0.85.

FIG. 8 includes the light intensity patterns or distributions observed on the ±1st order DLRCs 401a and 401b e.g., at (b) and (c) in the case that the cover layer or the like of the optical disk has a thickness error, that is, generates spherical aberration. As apparent from FIG. 8, the light rays on the inside and outside of the annular aberration radius of $0.71R_0$ have different distributions when the thickness of a cover layer or the like is different from a predetermined standard thickness. Because these light distributions are unbalanced, errors (defocusing) that affect the detection of the focal error are generated when spherical aberration is generated. However, the light rays passing through an area with an annular aberration radius of $0.71R_0$ do not move at all on the ±1st order DLRC 401a or 401b. This phenomenon makes it possible to perform a detection operation completely unaffected by the spherical aberration if the focal error is detected using this light ray alone.

Figure 10C:
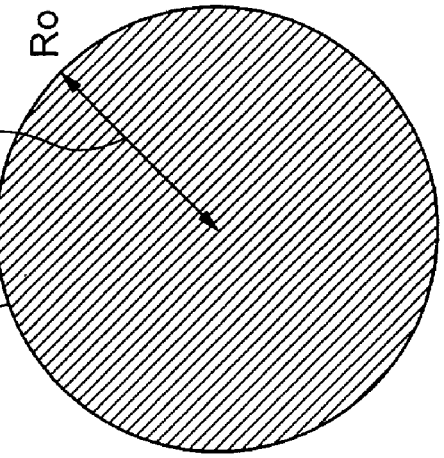
FIGS. 10A, 10B and 10C are schematic plan views showing the annular diffraction gratings of three diffractive optical elements having different sizes for extracting the beam components used to detect the focal error signal of the optical pickup device according to the present invention.
Figure 10B:
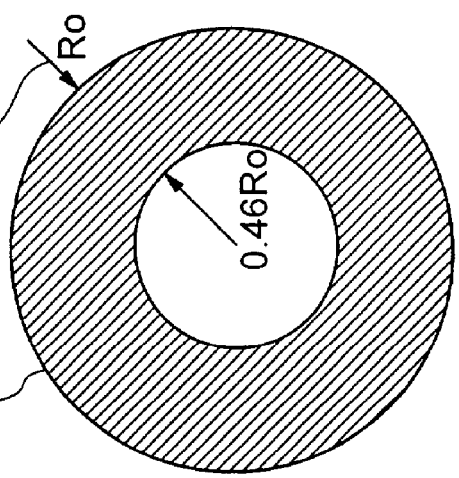
Figure 10A:
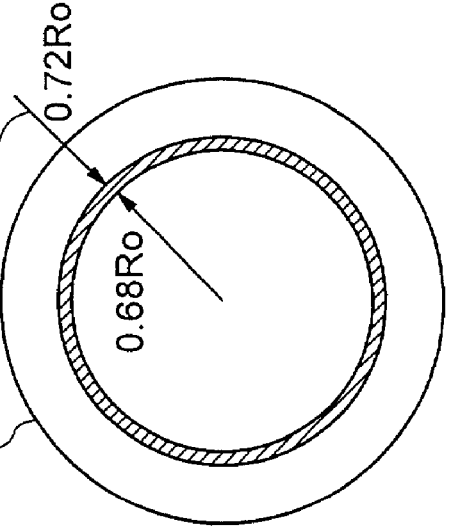
Figure 11:
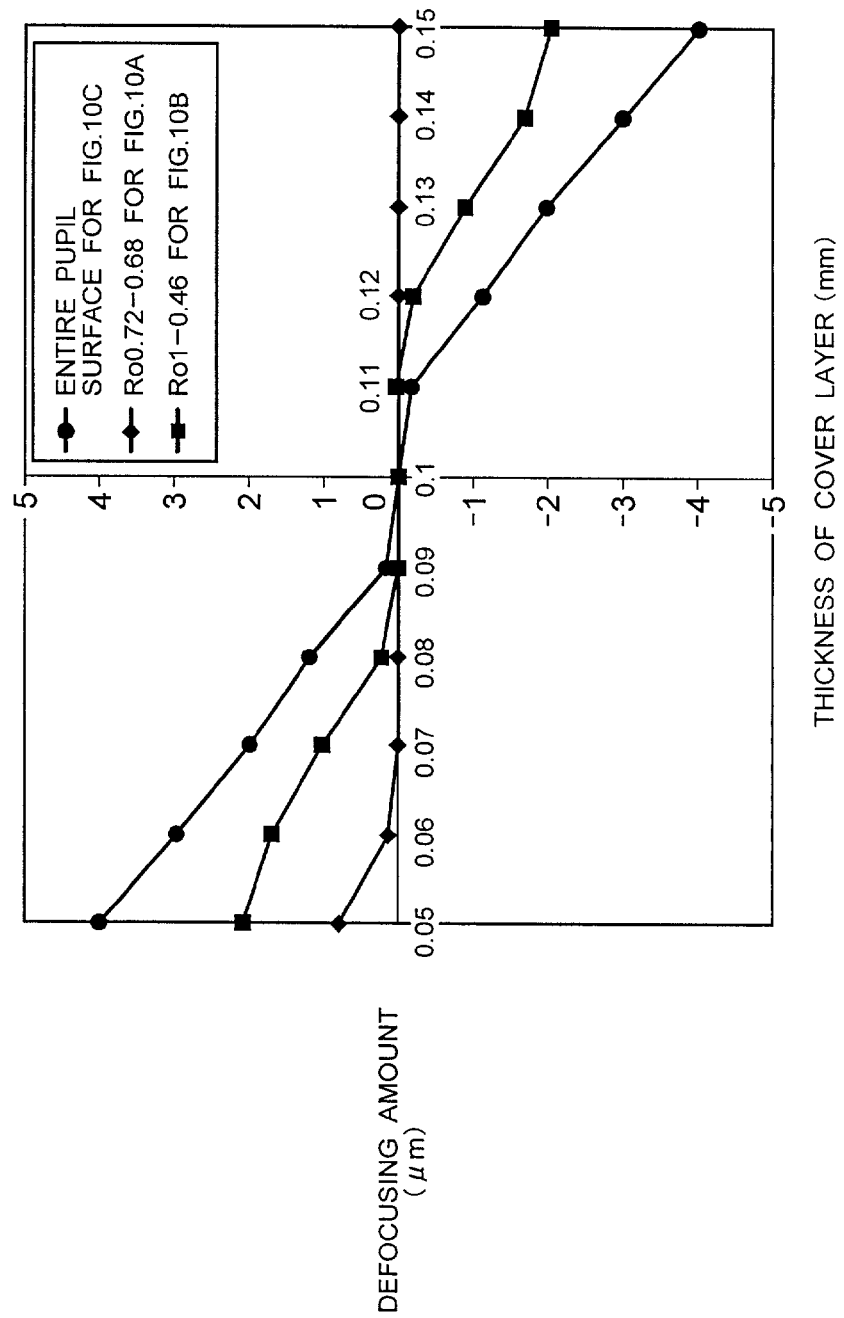
FIG. 11 is a graph depicting the manner in which the amount of defocusing varies with the thickness error in the cover layer of an optical disk in the optical pickup device according to the present invention.
Figure 12:
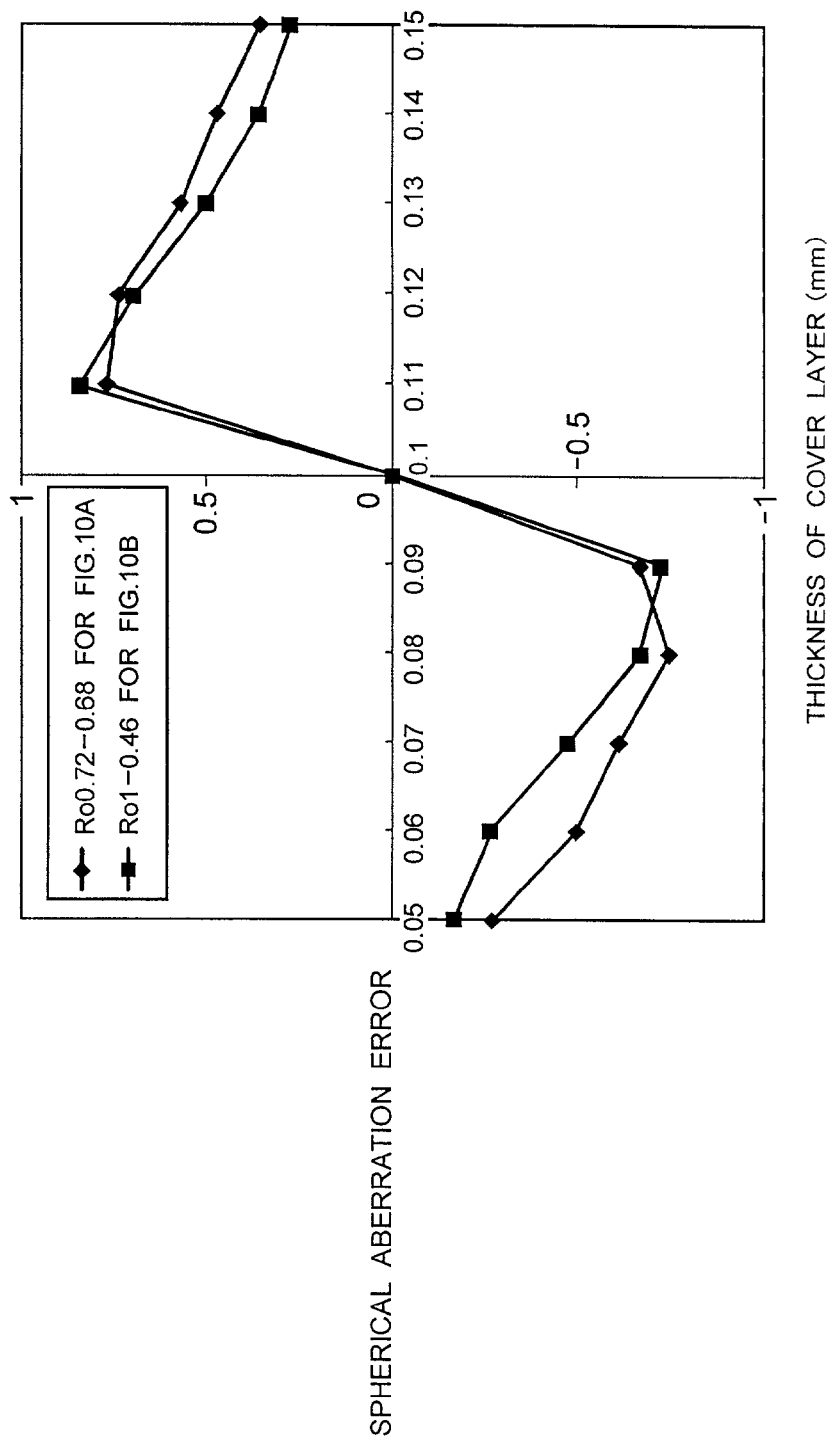
FIG. 12 is a graph depicting the manner in which the spherical aberration error varies with the thickness error in the cover layer of an optical disk in the optical pickup device according to the present invention.

FIGS. 10A, 10B and 10C show diffractive optical elements 39 with diffraction grating annuli of various sizes designed to extract the ray components for focal error detection from reflected return light. FIG. 10A shows an annulus defining a narrow annular area that contains the radius $0.71R_0$. FIG. 10B shows a wide annular area for accommodating the light rays in the vicinity of the pupil (including the radius $0.71R_0$). FIG. 10C shows the widest annular area of the entire surface area of the pupil, that is, all reflected return light rays involving defocusing caused by the thickness error of a cover layer are used for focal error detection. FIG. 11 shows the relationship between the thickness error and the amount of defocusing, that is, the manner in which the amount of defocusing varies according to annulus size. As seen from FIG. 11, the presence of a considerable thickness error in the cover layer fails to bring about any defocusing at all if the area shown in FIG. 10A (that is, annulus 39A) is used alone in comparison with the case the area shown in FIGS. 10B and 10B are used. The case shown in FIG. 10B is more effective in comparison with the case (FIG. 10C) in which all the ray components are used, but defocusing becomes pronounced with increased thickness error. Using the hologram shown in FIG. 10A is believed to be preferable when a large thickness error is anticipated or when the device is used with multi-layer disks or the like. FIG. 12 shows the relationship between the thickness error and spherical aberration error. FIG. 12 shows the same characteristics as those obtained using the annular areas shown in FIGS. 10A and 10B.

In principle, the area completely unaffected by spherical aberration is equal to a circular area with a radius of $0.71R_0$ on a pupil, as shown in FIG. 9, but there is danger that adequate signal S/N will be impossible to obtain and that inadequate luminous energy will result if the ray components in this area alone are used, so in practice it is necessary to provide a certain width that includes the radius $0.71R_0$. The aberrations of the light rays both on the inside and outside of the radius $0.71R_0$ on the pupil must be balanced on the detector.

Appropriate ranges will now be established for the inside radius ($r_{min}$) and outside radius ($r_{max}$) of a diffraction grating annulus 39A belonging to the diffractive optical element 39, with radius as a variable r. Following is a calculation of the range of radii for an optimal annulus needed to focus light on the best image point without any dependence on spherical aberration.

The wave front arriving at the best image point in the presence of spherical aberration can be expressed by Equation (1) below if the Zernike aberration polynomial is used.

$$W(r) = A_{42}(6r^4 - 6r^2 + 1) + A_{63}(20r^6 - 30r^4 + 12r^2 - 1) A_{84}(70r^8 - 140r^6 + 90r^4 - 20r^2 + 1) \quad (1)$$

Equation (2) below can be obtained if wavefront function $W(r)$ is converted to longitudinal aberration $y(r)$.

$$y(r) = -\left\{\frac{1}{\mathrm{Tan}(\mathrm{Sin}^{-1}(NA))}\right\}^2 \frac{1}{r} \frac{dW(r)}{dr} \quad (2)$$

$$= \frac{4(NA^2 - 1)\{3A_{42}(2r^2 - 1) + 6A_{63}(5r^4 - 5r^2 + 1) + 10A_{84}(14r^6 - 21r^4 + 9r^2 - 1)\}}{NA^2}$$

The above equation shows the degree to which a light ray passing above a circle with a radius "r" (normalized with the pupil radius) on a pupil connects the focal point with the defocused position when light is focused on the best image point (with spherical aberration converted to defocusing for each radius). In the equation, $A_{mn}$ (where m and n are integers respectively) is a spherical aberration coefficient that can be analytically determined using Equations (2a) below for a spherical aberration generated by the thickness error $\Delta T$ of the cover layer.

$$A_{42} = \frac{W_{40}}{6} + \frac{W_{60}}{4} + \frac{2W_{80}}{7} + \frac{25W_{100}}{84} + \frac{25W_{120}}{84}, \quad (2a)$$

$$A_{63} = \frac{W_{60}}{20} + \frac{W_{80}}{10} + \frac{5W_{100}}{36} + \frac{W_{120}}{6},$$

$$A_{84} = \frac{W_{80}}{70} + \frac{W_{100}}{28} + \frac{9W_{120}}{154},$$

-continued $$W_{k_0} = \left[\frac{(-1)^k(n^{k-2} - 1)NA^k}{k!n^{k-1}} \Delta \frac{T}{\lambda}\right] \prod_{s=1}^{k/2}(1 - (2s - 2)^2)$$

(where k0=40, 60, 80, 100, or 120).

Figure 13:
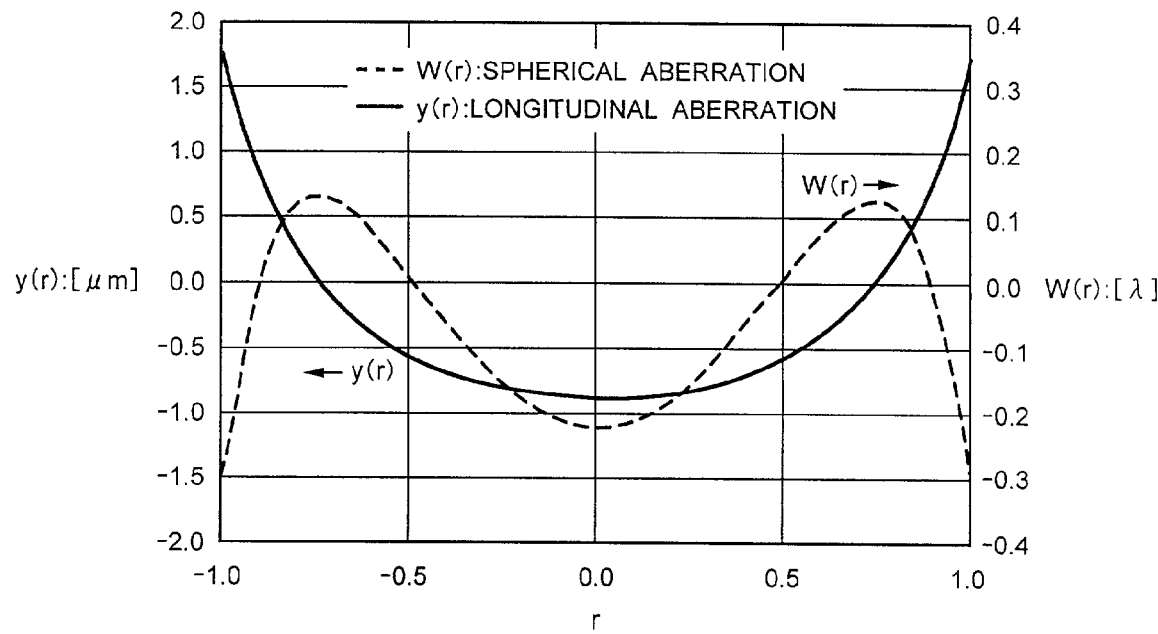
FIG. 13 is a graph depicting spherical aberration produced by the thickness error in the cover layer of an optical disk in the optical pickup device according to the present invention.

For example, if (NA, $\lambda$)=(0.85, 405 µm), n=1.62, and $\Delta T$=10 µm then $A_{42}$=−0.26, $A_{63}$=−0.049, and $A_{84}$=−0.0076. As shown in FIG. 13, the longitudinal aberration y(r) is represented in a substantially parabolic form (it is assumed herein that only outward movement occurs). Specifically, when the spherical aberration generated by the thickness error of the cover layer is expressed in terms of defocusing, it becomes possible to enter all the light rays between the amount of defocusing (=y(0)) for the light rays passing through the center of the pupil and the amount of defocusing (=y(1)) for the light rays passing through the outermost periphery of the pupil. Solving this equation for y(r)=0 indicates that the position for focusing the light ray in the vicinity of radius r=0.74 is always disposed at the best image point without being dependent on the thickness error $\Delta T$ of the cover layer. Here, r=0.74 is obtained as the radius because higher orders are considered, but r=0.71 will be obtained as the radius value if it is assumed that $W_{60}=W_{80}=W_{100}=W_{120}=0$. In other words, generating a focal error signal solely with the light rays in the vicinity of r=0.74 will make it possible to always keep the beam at the best image point without any dependence on $\Delta T$.

Figure 14:
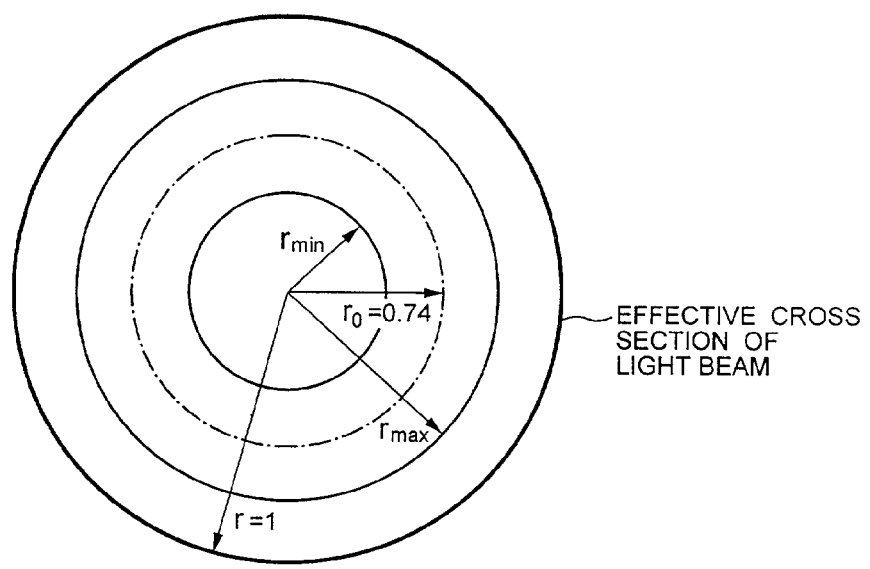
FIG. 14 is a schematic plan view depicting the inside and outside radii of an annular diffraction grating of the diffractive optical element for extracting the beam components used to detect the focal error signal of the optical pickup device according to the present invention.

The use of light disposed solely in the vicinity of the radius r=0.74 is expected to provide a dim view and to have a markedly adverse effect on the S/N of the detection signal, so light disposed within an annulus whose width fits within r=0.74 is used in practice. A range extending between the inside radius $r_{min}$ and outside radius $r_{max}$ is defined for an annulus that contains the radius r=0.74 and lies on the pupil, as shown in FIG. 14.

It is an established fact that the inside radius $r_{min}$ and outside radius $r_{max}$ of an annulus can be determined numerically in this case by ray tracing. The inventors also suggest that the radii can be selected analytically such that Equation (3a) or (3) described below is satisfied, provided that the focal error signal function S(y) (so-called S-shaped characteristic) generated using the light passing through the entire surface in the absence of spherical aberration is a known quantity. Specifically, an inside radius $r_{min}$ and outside radius $r_{max}$ that satisfy Equation (3a) below can be calculated on the assumption that the product of light intensity distribution and focal error signal function S(y) (with longitudinal aberration as the parameter) is equal to zero across the entire pupil in a manner such that the light intensities inside and outside the maximum value (peak) of annular aberration are balanced and canceled out.

$$\int_0^{2\pi}\int_{r_{min}}^{r_{max}} I(r)S(y(r))r\,dr\,d\theta = 0 \quad (3a)$$

In the above equation, I(r) is the distribution of intensities on the emission pupil of the objective lens. In the absence of rotational symmetry, the inside radius $r_{min}$ and outside radius $r_{max}$ can be calculated such that Equation (3) below is satisfied.

$$\int_0^{2\pi} \int_{r_{min}}^{r_{max}} I(r\cos\theta, r\sin\theta) S(y(r)) r \, dr \, d\theta = 0 \qquad (3)$$

where $I(r\cos\theta, r\sin\theta)$ is the distribution of intensities on the emission pupil.

For example, the focal error signal function $S(y)$ of an S-shaped characteristic obtained using the light across the entire surface of the pupil in the absence of spherical aberration can be written in simple form as Equation (4) below, provided the spherical aberration is not particularly large (that is, $y(r)$ is distributed within the linear area of $S(y)$) in cases such as the one shown in FIG. 7 above. Specifically, the function can be expressed as the product of longitudinal aberration $y(r)$ and the inclination of $S(y)$ at $y=0$ in FIG. 7.

$$S(y) = \frac{-2A}{Cp} \cdot y(r) \qquad (4)$$

Equation (5) below is obtained when it is assumed that $I(r)=1.0$ (uniform light incidence and specular reflection) and Equations (1) and (4) are substituted into Equation (3) and rearranged in order to create a simple model.

$$2.59(r_{min}^2 - r_{max}^2) - 1.78(r_{min}^4 - r_{max}^4) + 0.20(r_{min}^6 - r_{max}^6) - 1.23(r_{min}^8 - r_{max}^8) = 0.0 \qquad (5)$$

where NA=0.85, $\lambda$=405 nm, and n=1.62.

Figure 15:
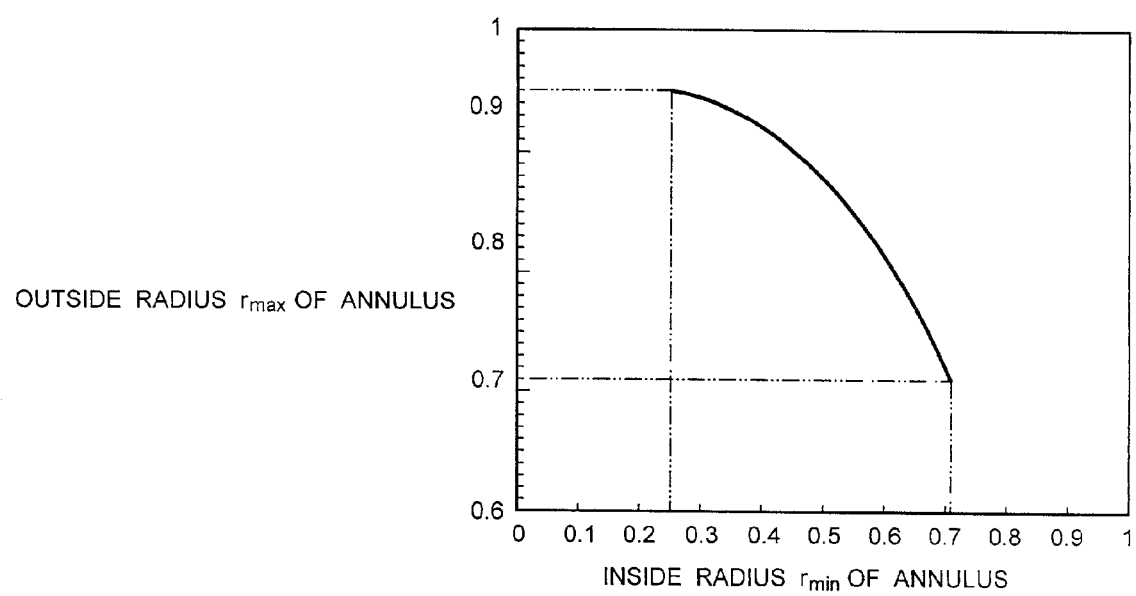
FIG. 15 is a graph depicting an example of a relationship between the inside and outside radii of an annular diffraction grating of the diffractive optical element for extracting the beam components used to detect the focal error signal of the optical pickup device according to the present invention.

The inside radius $r_{min}$ and outside radius $r_{max}$ (inner and outer radii) of an annulus such as the one that satisfies Equation (5) are shown in the form of a graph in FIG. 15. It can be seen in FIG. 15 that suitable ray components in conformity with the maximum value of the distribution formed on the surface of an emission pupil by wave aberration in a light-transmitting layer can be extracted in annular form from return light by setting the annulus width of the diffractive optical element within a range that extends from an extremely narrow range in which the pupil radii are $r_{min}=r_{max}=0.71$ to a broad range in which the width is between $r_{min}=0.25$ and $r_{max}=0.95$.

In practice, $I(r)$ may have a Gauss distribution or a more complex distribution in case that the diffraction on the optical disk is taken into account, but the relationship between the inside radius $r_{min}$ and outside radius $r_{max}$ of the width defining the annulus of the diffractive optical element can be derived such that Equation (3) is satisfied in the same manner as above, making it possible to determine the optimum values of the inside and outside radii on the basis of the focal error signal function and the distribution of intensities on the emission pupil.

Thus, the first embodiment is configured such that a light ray whose annular portion contains annular aberration from the distribution of intensities on the emission pupil is separated from the initial optical axis with the aid of a diffractive optical element provided with a diffraction grating in the annulus 39A corresponding to the annular portion while an astigmatism technique is used to detect focal errors. The annular light ray deviated and separated by the annular diffraction grating are directed to the photodetector (±1st order DLRCs 401a and 401b) used exclusively to detect focal errors, and focal errors are thus detected, with the result that the LRCs remain completely unaffected even in the presence of spherical aberration.

In the first embodiment, the spherical aberration generated in the optical system might be detected if there are usage of the light rays on the outside of the area of annular aberration (area that includes $0.71R_0$ as the pupil radius) and the light rays passing through the area behaving differently due to the presence of spherical aberration.

Adopting this arrangement makes it possible to highly accurately detect spherical aberration without any effect from defocusing (because the focal servo function is actuated solely by the light rays passing through the annulus 39A of the diffractive optical element).

Figure 16:
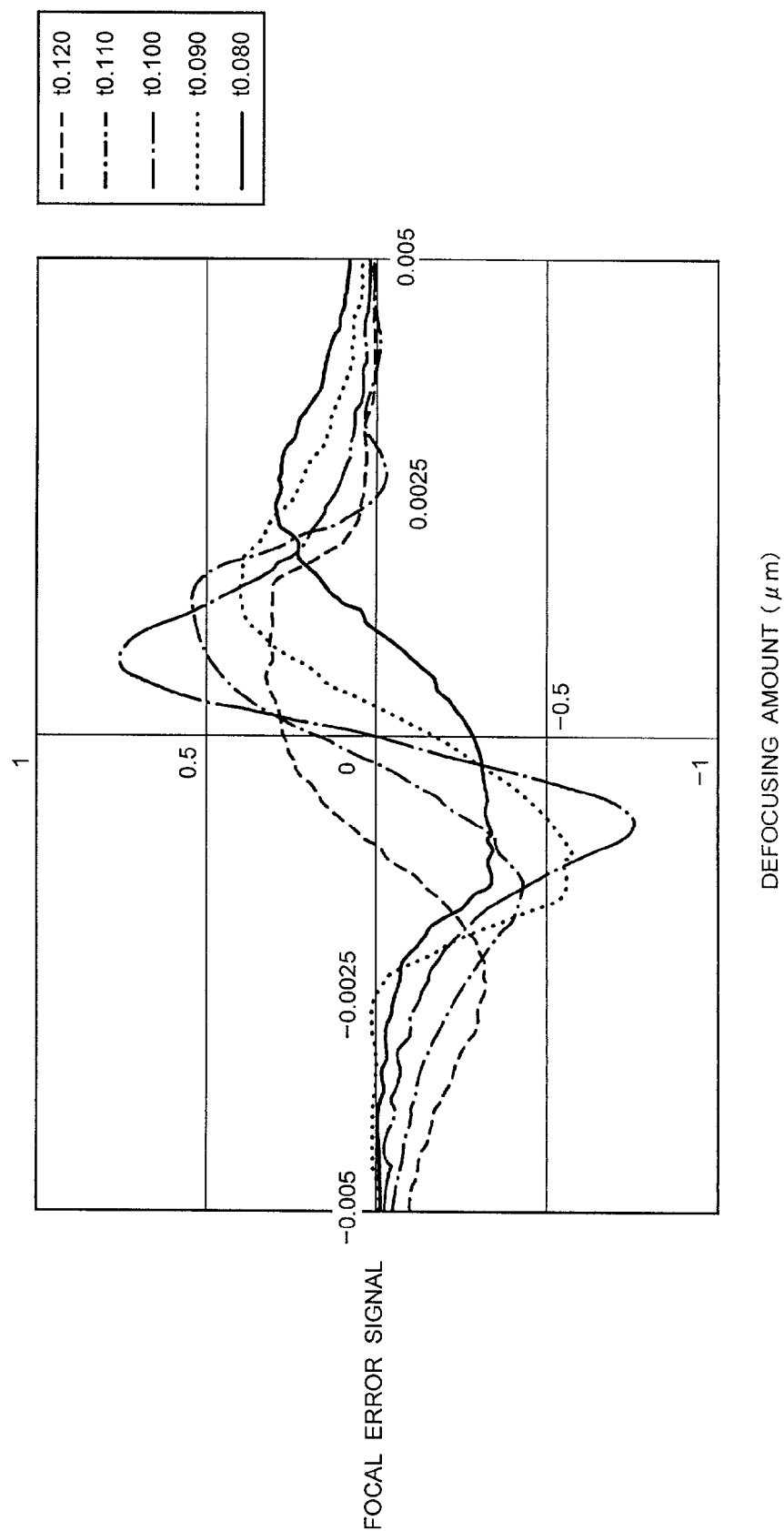
FIG. 16 is a graph depicting the manner in which the focal error signal level of the optical pickup varies with the amount of defocusing per thickness error in the cover layer of an optical disk when being detected using 0-th order diffracted light as comparative examples.
Figure 17:
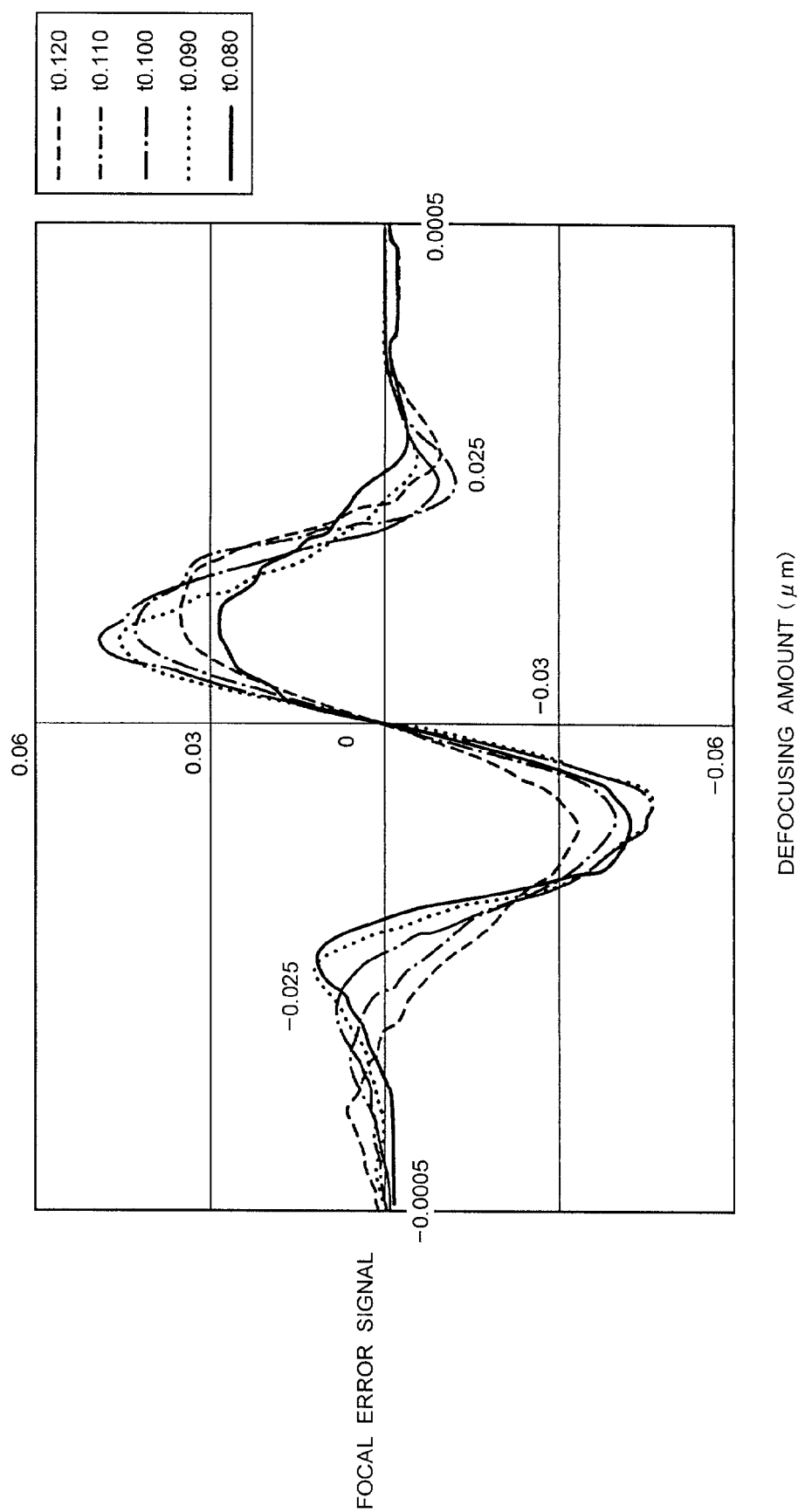
FIG. 17 is a graph depicting the manner in which the focal error signal level of the optical pickup varies with the amount of defocusing per thickness error in the cover layer of an optical disk when being detected using ±1st order diffracted light according to the present invention.

Concretely, relationships between the level of the focal error signal (focusing error) and the amount of defocusing have been measured on the 0-th and ±1st order DLRCs of the first embodiment shown FIG. 8 during just focused state. Such levels are measured while the thickness of the cover layer belonging to the optical disk is varied in the range of 0.1 mm±0.02 mm i.e., t0.080, t0.090, t0.100, t0.110 and t0.120 (mm). FIG. 16 shows curves of astigmatism-based signal (D1+D4)−(D2+D3) calculated from the outputs of the 0-th order DLRC 400 as comparative examples. FIG. 17 shows curves of astigmatism-based signal (B1+B4+F1+F4)−(B2+B4+F1+F3) calculated from the outputs of the ±1st order DLRCs 401a and 401b of the first embodiment. As seen from FIG. 17 compared with FIG. 16, preferable S-shaped characteristics are obtained in the case that the annular diffraction grating extracts from the return light the ray components existing in the vicinity of a normalized radius for a cross section of a light beam corresponding to the maximum value of a wave aberration distribution on the emitting pupil surface.

In this way, the first embodiment using the an astigmatism method for the focal error detection is provided with the annulus which separates transmitted light into 0-th and deflected 1st order diffracted light rays by means of a diffraction grating with which the annulus is provided, and introduces the deflected annular ray incident onto the exclusive light receiving elements for focal error detection. The exclusive light receiving elements are so-called four-split photodetector. The diffractive optical element is installed such that the intensity of 0-th order diffracted light gradually increases. Since this arrangement entails detecting RF signals, thickness error signals, and the like with the 0-th order DLRC 400 for admitting 0-th order diffracted light, it is possible to reduce the number of summing amplifiers for obtaining RF signals, and to reduce the unnecessary noise. In addition to the first embodiment using both ±1st order diffracted light, only one of both may be used with a pertinent diffractive optical element. Besides the diffractive optical element may be a blaze-type transmitting hologram lens to utilize one of ±1st order diffracted light.

Second Embodiment

The second embodiment is substantially the same as the first embodiment except that the AGOE 38 used in the second embodiment is dispensed with and the photodetector 40, diffractive optical element 39, and driving controller 59 are modified in accordance with a differential spot size technique. Whereas the first embodiment is implemented using an astigmatism technique as the method for the focusing servo control of the focal actuator 301, the second embodiment is implemented using a differential spot size technique. A spot size technique is a method in which the return light from an optical disk is divided into two optical paths, the system is configured such that front and back focal points having different focal distances are generated, LRCs are positioned in front and behind the focal points, the light spots on them are compared in terms of size, and a focal error signal is generated.

Figure 18:
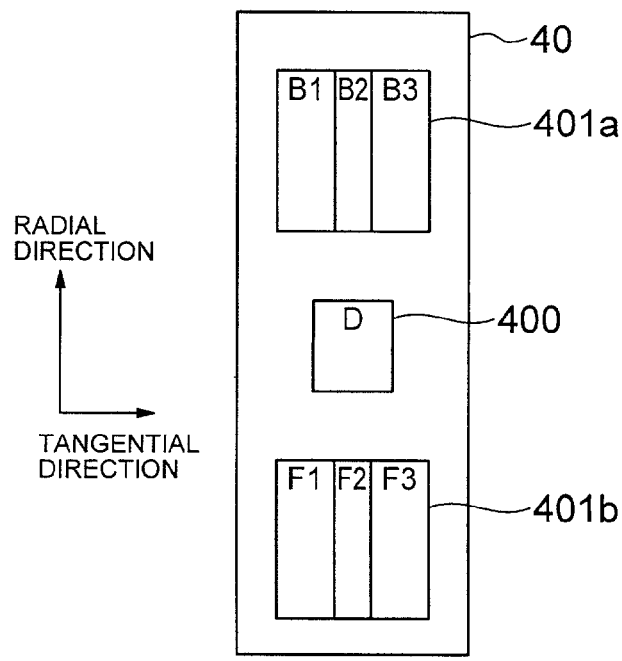
FIG. 18 is a schematic plan view depicting the photodetector of the optical pickup device according to another embodiment of the present invention.

As shown in FIG. 18, the 0-th order DLRC 400 on the optical axis is composed of a single light receiving element (D) in the photodetector 40 of the second embodiment. The ±1st order DLRCs 401a and 401b are disposed separately on both sides of the 0-th order DLRC 400 in the radial disk direction. The 1st order DLRCs 401a and 401b consist of, respectively, three individual light receiving elements (B1, B2, B3) and (F1, F2, F3). The respective pairs of light receiving elements (B1, B3) and (F1, F3) have equal surface areas. These respective pairs of light receiving elements are disposed symmetrically with respect to a straight line that extends in the radial direction along the centrally located light receiving elements (B2) and (F2). The photodetector 40 is disposed in a plane perpendicular to the optical axis in a manner such that the 0-th order diffracted light spot on the recording layer of an optical disk forms the least circle of confusion described above and remains in the center of the 0-th order DLRC 400 when focused. The LRCs are symmetrical with respect to the straight lines that extend from this center in the track direction and the perpendicular direction.

Figure 19:
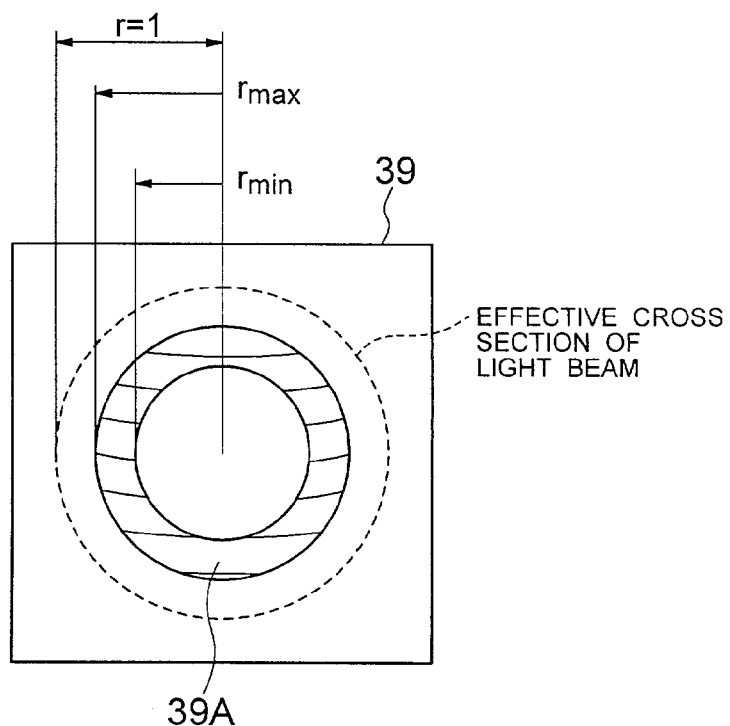
FIG. 19 is a schematic plan view depicting the structure of a hologram lens for the diffractive optical element of the optical pickup device according to another embodiment of the present invention.

FIG. 19 shows the hologram lens of the diffractive optical element 39 according to the second embodiment. This diffractive optical element also comprises a diffraction grating in the form of an annulus 39A whereby the predetermined ray components are extracted from the return light in the form of a ring. Namely the predetermined ray components exist in the vicinity of a normalized radius for a cross section of a light beam corresponding to the maximum value of a wave aberration distribution on the emitting pupil surface of the optical system including the objective lens 37 or the like. Specifically, the annulus 39A is formed with diffraction gratings so as to provide an off-center lens effect whereby ±1st order diffracted light are converged by being deflected substantially symmetrically away from the original optical axis. The annulus 39A is also designed to act as a concave or convex lens for any type of ±1st order diffracted light. The annulus 39A of the diffractive optical element 39 includes an area on the pupil whose radius ranges from $0.71R_0$ to $0.74R_0$, where $R_0$ is the pupil radius measured in relation to the optical axis of return light.

Figure 20:
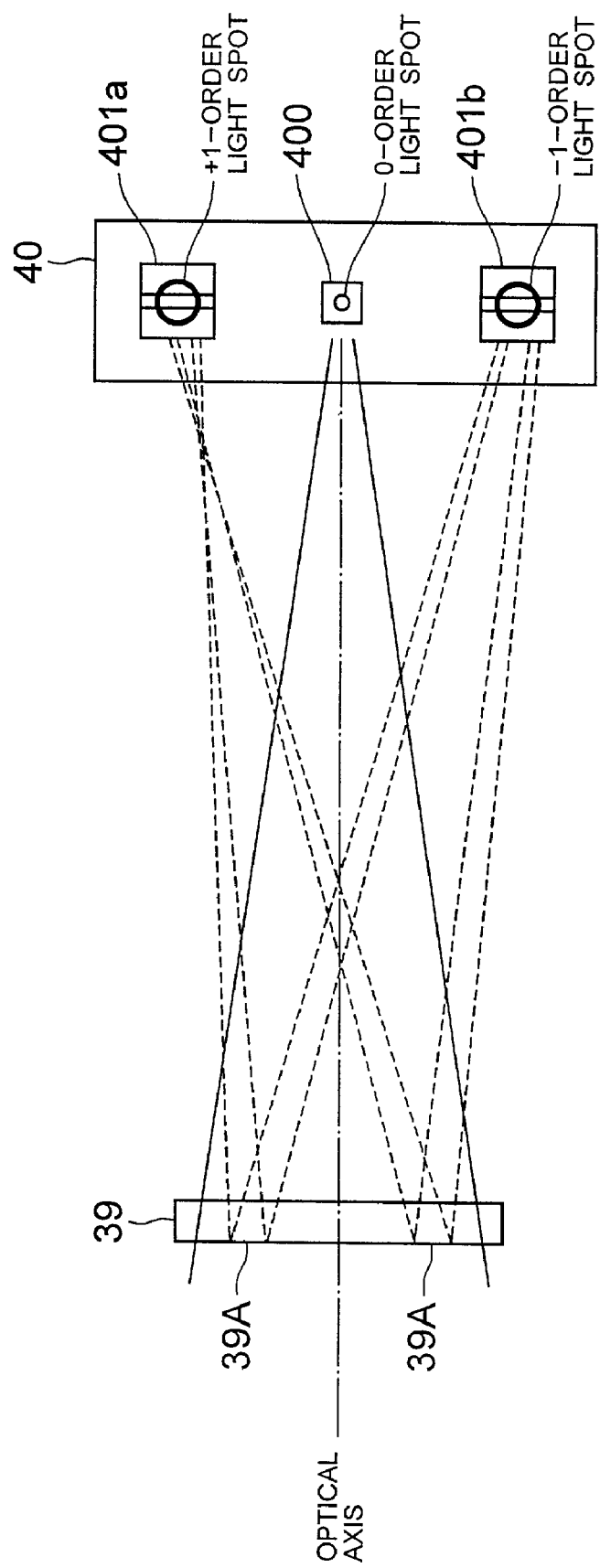
FIG. 20 is a schematic diagram depicting ray paths of diffracted light caused due to the return light from the hologram lens of the diffractive optical element to the photodetector of the optical pickup device according to another embodiment of the present invention.

FIG. 20 shows the ray paths of diffracted light caused due to the return light from the hologram lens of the diffractive optical element 39 to the photodetector 40 of the optical pickup. The element 39 appears in cross section but the photodetector 40 in front view in the Figure. The annulus 39A of the diffractive optical element 39 guides ±1st order diffracted light as ring spots to the respective ±1st order DLRCs 401a and 401b of the photodetector 40. The annulus 39A of the diffractive optical element 39 guides 0-th order diffracted light as a circular spot to the 0-th order DLRC 400 of the photodetector 40. In this way, the diffractive optical element 39 separates return light into 0-th and ±1st order diffracted light. Specifically, 0-th order diffracted light passes through the diffractive optical element 39 while unaffected by the action of the hologram lens. The 0-th order diffracted light travels without deviating from the original optical axis, but ±1st order diffracted light are symmetrically deflected with respect to the optical axis. The 0-th order DLRC 400 is connected to the demodulation circuit 20. The ±1st order DLRCs are connected to the driving controller 59, and the outputs thereof are presented to the corresponding electric circuits. The outputs of the ±1st order DLRCs 401a and 401b for receiving the annular spots extracted by the annulus 39A of the diffractive optical element 39 are used for detecting focal error signals FE.

Figure 21:
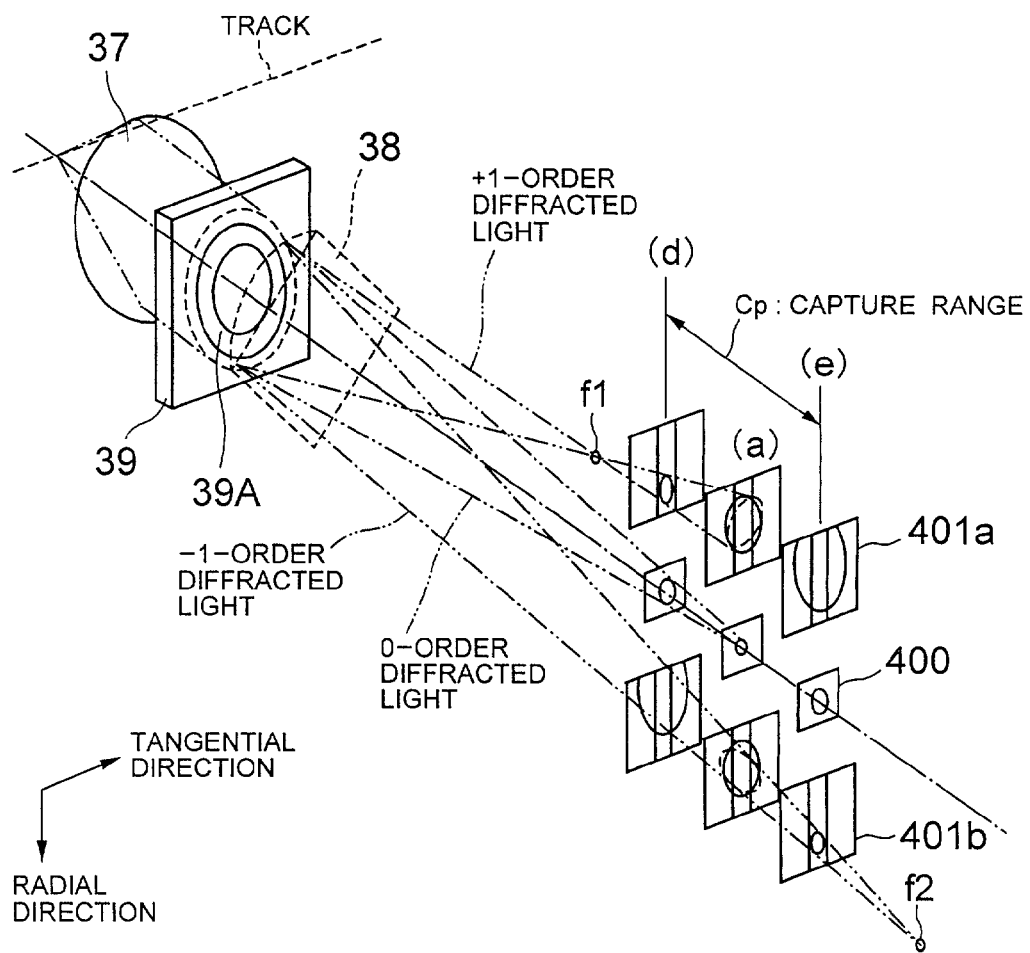
FIG. 21 is a schematic perspective view depicting the structure of a photodetection optical system for the optical pickup device according to another embodiment of the present invention.

FIG. 21 shows the second embodiment which is used to perform the focal servo function of the differential spot size technique with the aid of the ±1st order diffracted light obtained from the annulus 39A. In this figure, details unrelated to the objective lens 37, diffractive optical element 39, 0-th order DLRC 400, and ±1st order DLRCs 401a and 401b are omitted in order to better describe an operation typified by the ±1st order diffracted light from the annulus 39A.

As shown in FIG. 21, the diffractive optical element 39 is configured such that, if a light beam is focused on the tracks of an optical disk, then the 0-th order diffracted light converges a focal point on the 0-th order DLRC 400 in the optical axis, but the ±1st order diffracted light moves away from the optical axis and at the same time forms a focal point f1 in front of the photodetector 40, while the −1st order diffracted light moves away from the optical axis and forms a focal point f2 at a distance from the photodetector 40, so that annular spots are formed on the light receiving elements (B2) and (F2) in the center of the ±1st order DLRCs 401a and 401b. The annular spots on the +1st order DLRCs 401a and 401b will therefore differ in size according to whether the objective lens approaches or moves away during defocusing, so normalization can be achieved such that the distance between the (d) and (e) shown in FIG. 21 may, for example, be assumed to be equal to the capture range of the focal error signal when the widths of the corresponding central light receiving elements are properly set. A signal having an S-shaped characteristic can be obtained in the same manner as in the preceding embodiments.

Figure 22:
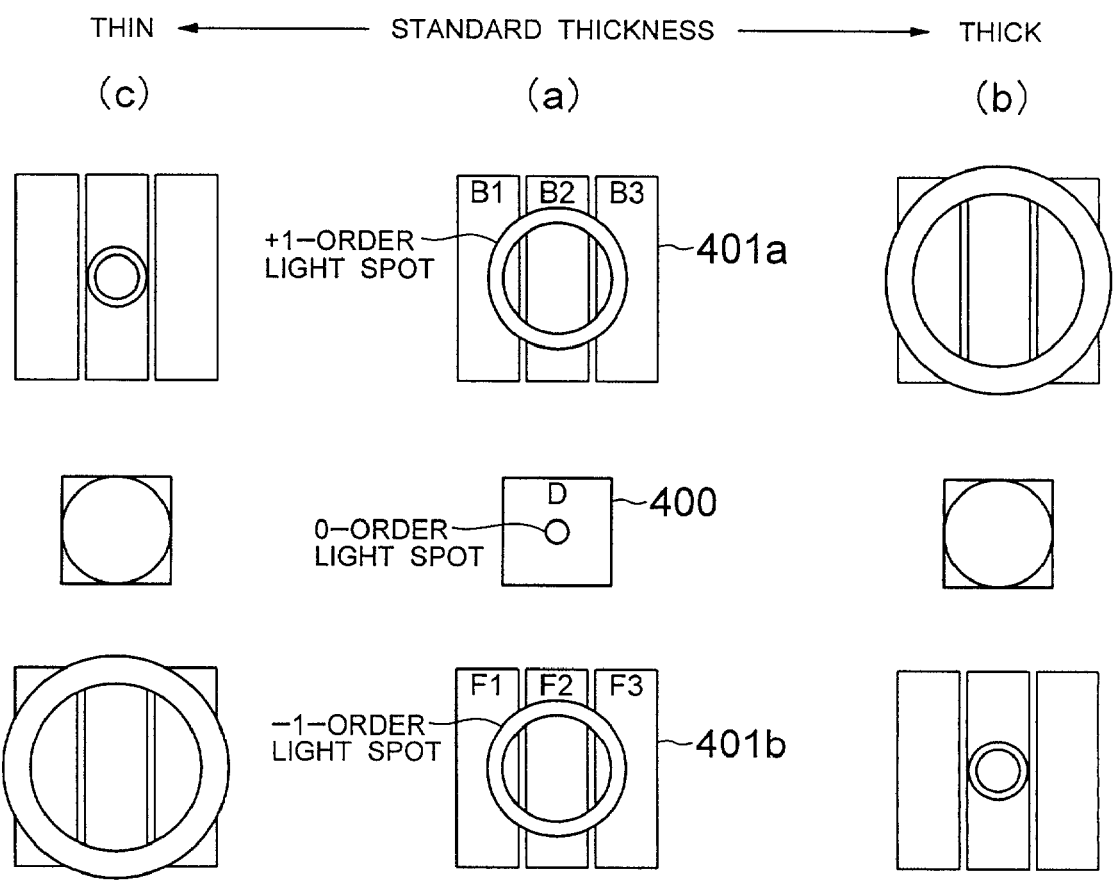
FIG. 22 is a schematic plan view depicting photodetectors and illustrating the modes of return light spots on the LRCs for 0-th or ±1st order diffracted light produced by return light during the converging of a light beam in the optical pickup device according to another embodiment of the present invention.

The driving controller 59 is configured such that the outputted focal error signal FE and reproduced signal RF are expressed by the following formulas, wherein the outputs are labeled by the symbols used for the LRCs of the photodetector 40 shown in FIG. 22.

$$FE = (B1+B3+F2)-(B2+F1+F3)$$

$$RF = D$$

As shown at (a) in FIG. 22, if the cover layer of the optical disk 1 has the predetermined thickness, then the 0-th order diffracted light is converged into the least circle of confusion on the 0-th order DLRC 400 and ±1st order diffracted light are at the same time converged into the least rings of confusion on the ±1st order DLRCs 401a and 401b respectively during just focusing. As shown at (b) in FIG. 22, in a case that the cover layer of the optical disk 1 has a thickness greater than the predetermined thickness, the 0-th order diffracted light spot is somewhat expanded and ±1st order diffracted light are at the same time converged into an expanded and contracted rings on the ±1st order DLRCs 401a and 401b respectively. As shown at (c) in FIG. 22, inversely, in a case that the cover layer of the optical disk 1 has a thickness less than the predetermined thickness, the 0-th order diffracted light spot is somewhat expanded and ±1st order diffracted light are at the same time converged into a contracted or expanded circle on the ±1st order DLRCs 401a and 401b respectively.

Third Embodiment

The third embodiment is substantially the same as the first embodiment except that the photodetector 40, diffractive optical element 39 and driving controller 59 used in the first embodiment are modified in accordance with the astigmatism technique and differential spot size technique. Whereas an astigmatism technique is used in the above-described first embodiment for the focusing servo control of the focal actuator 301, a hybrid technique composed of an astigmatism technique and differential spot size technique is used in the third embodiment to detect focal errors.

Figure 23:
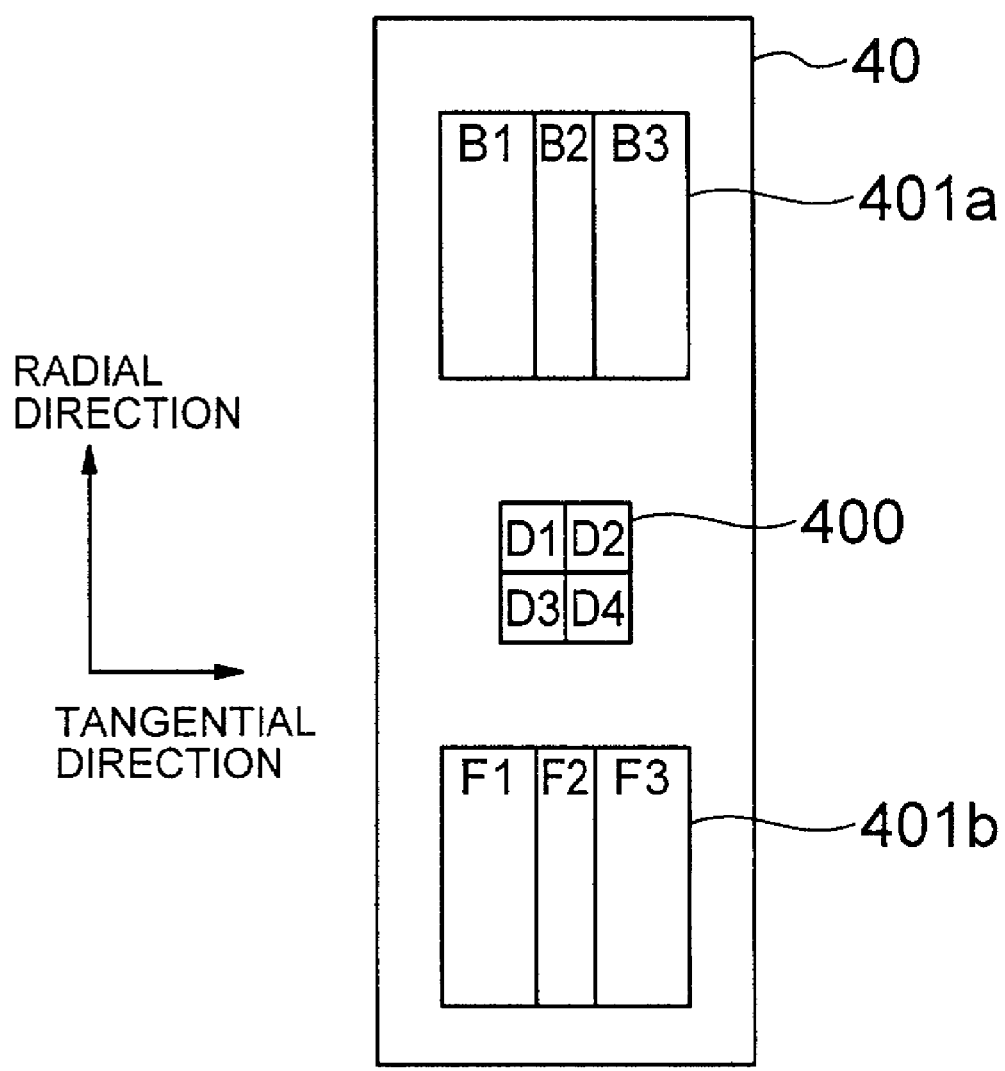
FIG. 23 is a schematic plan view depicting the photodetector of the optical pickup device according to another embodiment of the present invention.

FIG. 23 shows the photodetector 40 of the third embodiment. The 0-th order DLRC 400 is disposed on the optical axis and comprises four split light receiving elements (D1, D2, D3, D4) each having an equal area in the set. The light receiving elements are disposed adjacent to each other with two orthogonal dividing lines as boundaries, one of which is parallel to the longitudinal track direction of the optical disk 1. The ±1st order DLRCs 401a and 401b are disposed farther away on both sides of the 0-th order DLRC 400 in the radial direction of the disk. The ±1st order DLRCs 401a and 401b consist of, respectively, three individual light receiving elements (B1, B2, B3) and (F1, F2, F3). The respective pairs of light receiving elements (B1, B3) and (F1, F3) have equal surface areas and are disposed symmetrically with respect to a straight line that extends in the radial direction along the centrally located light receiving elements (B2) and (F2). The photodetector 40 is disposed in a plane perpendicular to the optical axis in a manner such that the 0-th order diffracted light spot on the recording layer of an optical disk forms the least circle of confusion described above and remains at the point of intersection of dividing lines on the 0-th order DLRC 400 when focused. The LRCs are symmetrical with respect to the straight lines that extend from this center in the track direction and the perpendicular direction.

The hologram lens of the diffractive optical element 39 of the third embodiment is identical to the one shown in FIG. 19 which is provided with the annulus 39A of grating to act as a concave or convex lens for any type of ±1st order diffracted light. A transparent parallel plate portions devoid of a diffraction grating are provided on the inside and outside of the annulus 39A respectively. The annulus 39A of the diffractive optical element 39 includes an area on the pupil whose radius ranges from $0.71R_0$ to $0.74R_0$, where $R_0$ is the pupil radius measured in relation to the optical axis of return light.

Figure 24:
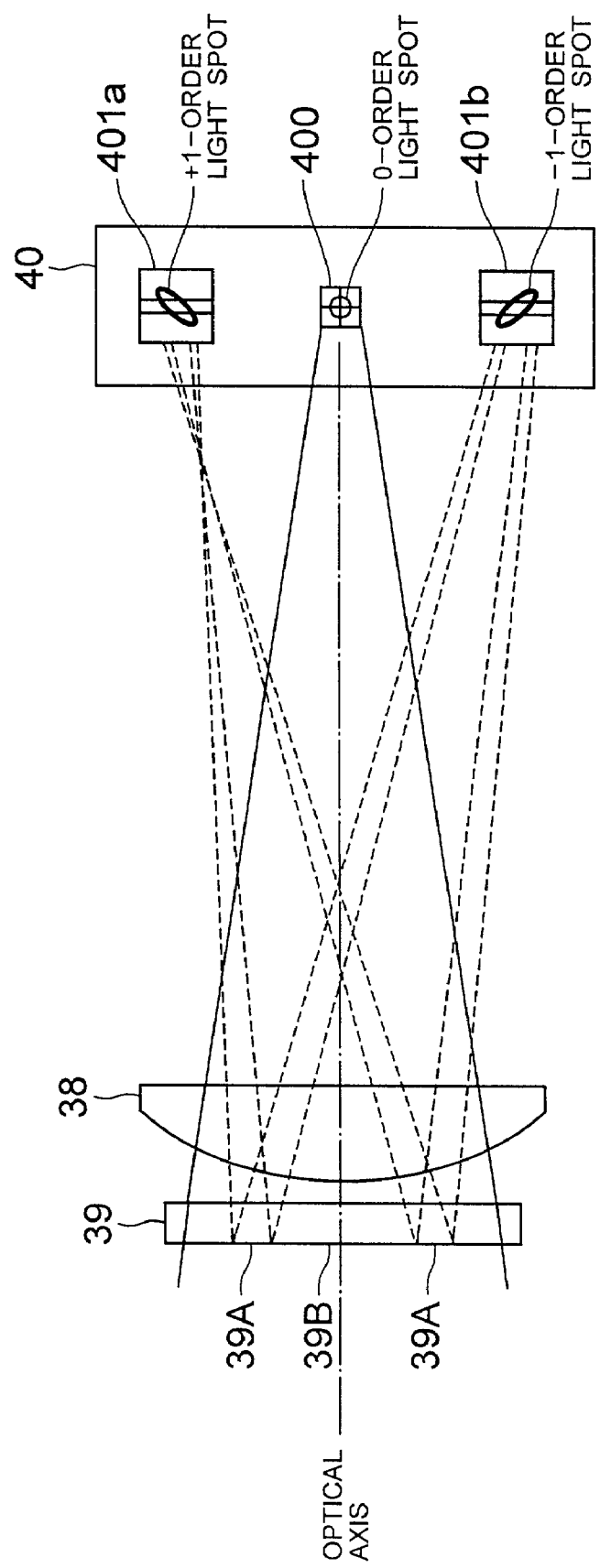
FIG. 24 is a schematic diagram depicting ray paths of diffracted light caused due to the return light from the hologram lens of the diffractive optical element to the photodetector of the optical pickup device according to another embodiment of the present invention.

FIG. 24 shows the ray paths of diffracted light from the hologram lens of the diffractive optical element 39 through the cylindrical lens 38 (AGOE) to the photodetector 40 of the optical pickup. The diffractive optical element 39 guides 0-th order diffracted light as a circular spot to the 0-th order DLRC 400 via the AGOE 38. The annulus 39A guides ±1st order diffracted light as elliptic ring spots to ±1st order DLRCs 401a and 401b of the photodetector 40 via the AGOE 38. In this way, the diffractive optical element 39 separates transmitted return light into 0-th order diffracted light and ±1st order diffracted light. The 0-th order DLRC 400 is connected to a demodulation circuit 20, the ±1st order DLRCs are connected to the driving controller 59, and their outputs are supplied to respective circuits. The outputs of the ±1st order DLRCs 401a and 401b for receiving the oval spots extracted by the annulus 39A of the diffractive optical element 39 are used for detecting focal error signals FE.

Figure 25:
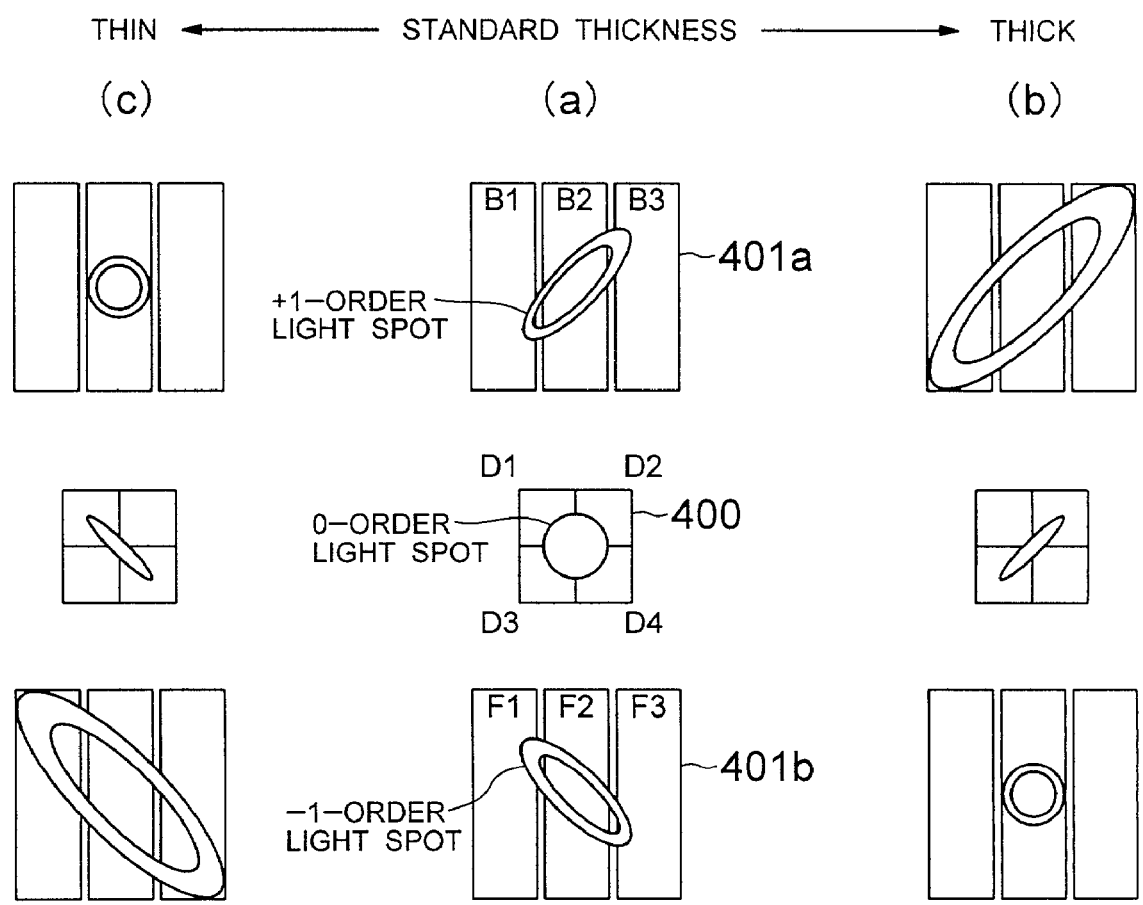
FIG. 25 is a schematic plan view depicting photodetectors and illustrating the modes of return light spots on the LRCs for 0-th or ±1st order diffracted light produced by return light during the converging of a light beam in the optical pickup device according to another embodiment of the present invention.

The driving controller 59 is configured such that the outputted focal error signal FE and reproduced signal RF are expressed by the following formulas, wherein the outputs are labeled by the symbols used for the LRCs of the photodetector 40 shown in FIG. 25.

$$FE=(B1+B3+F2)-(B2+B1+F3)$$

$$RF=D1+D2+D3+D4$$

Fourth Embodiment

Figure 26:
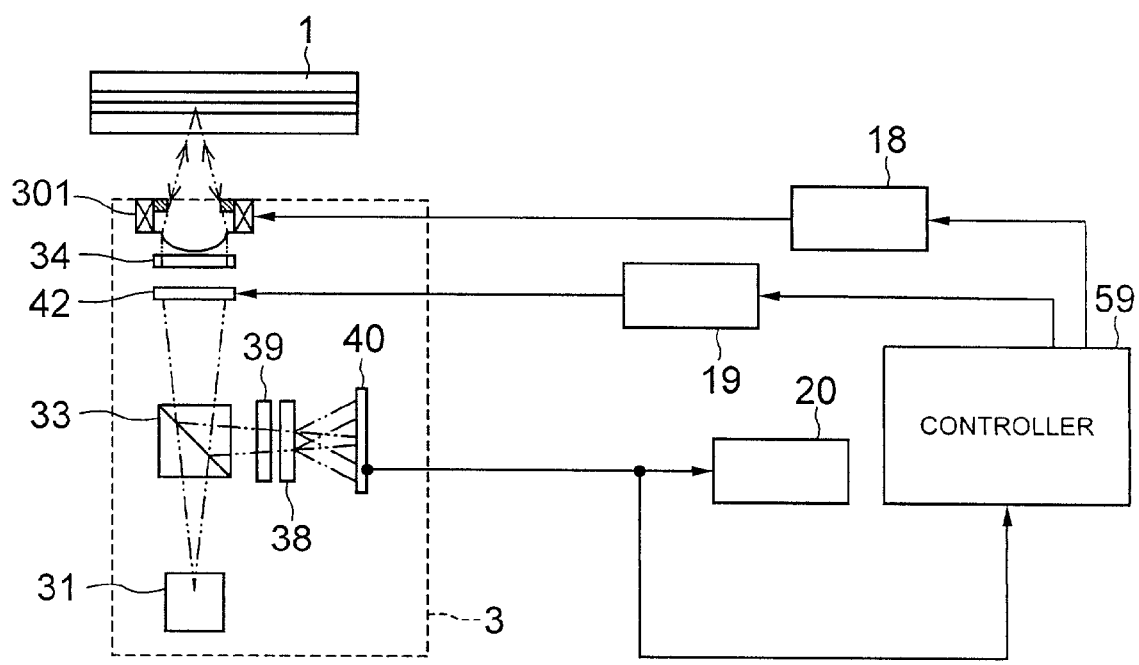
FIG. 26 is a schematic block diagram depicting the structure of a recording and reproducing apparatus provided with the optical pickup device according to the present invention.

FIG. 26 is a diagram depicting the structure of a recording and reproducing apparatus as a fourth embodiment of the present invention.

A recording and reproducing apparatus fitted with an optical pickup device 3 comprises a driving controller 59 which controllably drives a focal actuator 301 and a SACD 42 via a focal driving circuit 18 and a driving circuit 19 connected thereto respectively. A photodetector 40 in the pickup device 3 is connected to the driving controller 59. The driving controller 59 is designed to generate error signals on the basis of signals detected by the photodetector 40. The error signals are fed to the focal driving circuit 18, the driving circuit 19 for the SACD 42, and the like. The recording and reproducing apparatus also has a demodulation circuit 20 for generating a reproduced signal based on the detected signal, and is further provided with a spindle motor, slider, and a servo driving circuit for tracking (not shown).

Figure 27:
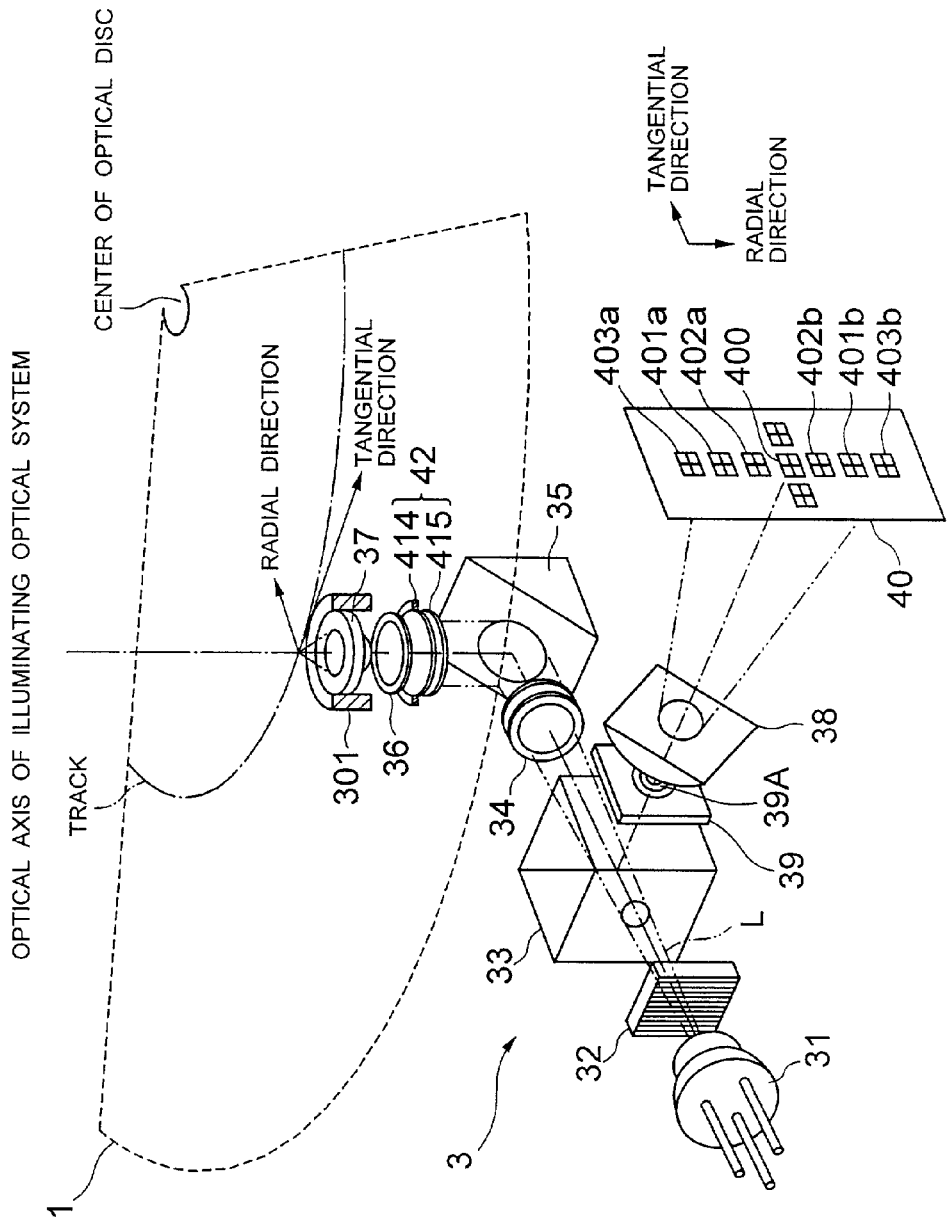
FIG. 27 is a schematic perspective view depicting the structure of the optical pickup device according to the present invention.

FIG. 27 is a schematic diagram depicting a structure of the optical pickup device according to the present invention.

The optical pickup device 3 comprises a semiconductor laser 31 or a light source; a grating 32; a polarization beam splitter 33; a collimator lens 34; a mirror 35; a quarter-wave plate 36; an objective lens 37; an AGOE 38; a diffractive optical element 39 such as a holographic lens or the like; and a photodetector 40. The AGOE 38 may be selected from a cylindrical lens, multi-lens, or the like made of a transparent material. The photodetector 40 comprises a 0-th order DLRC 400 and ±1st order DLRCs 401a, 401b, 402a, 402b, 403a and 403b. An optical disk 1 is disposed at a distance from the objective lens 37 on the turntable (not shown) of a spindle motor belonging to the recording and reproducing apparatus.

The optical pickup device 3 contains a focal actuator 301 which supports and drives the objective lens 37. The optical pickup device 3 further comprises a SACD 42 disposed between the polarization beam splitter 33 and the objective lens 37 in the optical path to correct aberration.

The focal actuator 301 performs a focal servo function to move the objective lens 37 along the optical axis in the direction perpendicular to the surface of the optical disk 1 in accordance with the level of the focal error signal provided by the focal driving circuit 18 so as to converge the light beam emitted by the light source onto the predetermined recording layer.

The SACD 42 provides a phase difference to the light beam passing through itself in accordance with the thickness error signal supplied by the driving circuit 19 so as to compensate for the wave aberration (e.g., spherical aberration) of the light beam on the predetermined recording layer as a spherical aberration correction. The SACD 42 functions as an expander which comprises a first lens 414 and a second lens 415 as an optical system obtained by combining the two lenses. The expander 42 is placed between the light source and the objective lens so as to correct the spherical aberration generated by the optical system. The conversion of expander 42 from an incoming parallel light to converging light or diverging light as a beam to be incident on the objective lens can provide a spherical aberration to light to be irradiated by the objective lens in advance. Thus the spherical aberration of the optical system is cancelled off with the previously given spherical aberration by the expander 42, so that the spherical aberration generated by the cover layer of the optical disk is corrected. Specifically, the expander 42 operates in such a manner that the incoming parallel light beam passes therethrough in parallel fashion when the cover layer has a standard thickness. This is because the objective lens is designed so as to completely cancel out the spherical aberration generated in the cover layer of standard thickness with the spherical aberrations generated in the objective lens itself during the irradiation of light. As a result, no spherical aberration is generated in the spot into which light is collected after passing through the cover layer having the standard thickness. If the cover layer has a thickness that differs from the standard thickness, then the light beam passing through the expander 42 is caused to change from parallel light to diverging light or converging light as a result of the fact that one of the lenses 414 and 415 of the device 42 is moved in parallel along the optical axis. For example, when the cover layer has a thickness thinner than the standard thickness, a correction procedure is carried out such that converging light is directed to the objective lens. As a result of this process, the spherical aberration generated by the objective lens is increased in order to balance out the spherical aberration reduced by the thickness of the cover layer, so that the data-recording surface is rendered free of aberration. In the reverse case that the cover layer has a thickness thicker than the standard thickness, diverging light is directed to the objective lens to perform the correction procedure. At least one of the lenses 414 or 415 is provided with a parallel-movement actuator (not shown). The actuator for the expander 42 is controlled to create a reverse-polarity wave aberration for balancing out the wave aberration caused by the thickness error of the optical disk on the pupil surface of the objective lens. For this reason, the driving controller 59 operates in such a manner that a signal related to the detection results of the photodetector 40 is provided to the actuator of the expander 42 via the driving circuit 19 for the spherical aberration. Besides the SACD 42 may be constructed with a transparent type liquid-crystal element having a predetermined pattern for providing a phase difference to light passing therethrough by applying a voltage corresponding to the detected spherical aberration to be canceled out instead of the expander comprising the first and second lenses 414 and 415.

Figure 28:
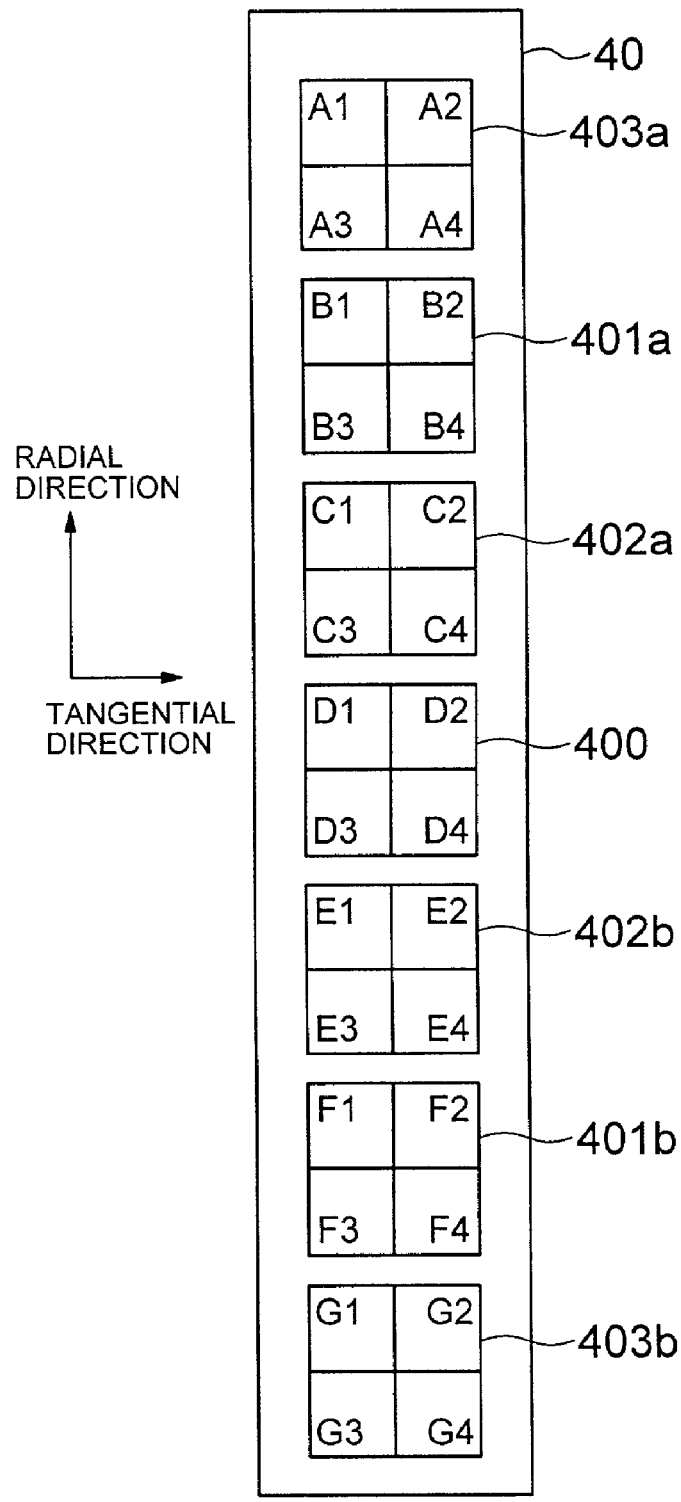
FIG. 28 is a schematic plan view depicting the photodetector of the optical pickup device according to the present invention.

FIG. 28 shows the photodetector 40 of the fourth embodiment. The 0-th order DLRC 400 is disposed on the optical axis and comprises four split light receiving elements (D1, D2, D3, D4) each having an equal area in the set. The light receiving elements are disposed adjacent to each other so as to be separated by two orthogonal dividing lines one of which is parallel to the longitudinal track direction of the optical disk 1. The ±1st order DLRCs 401a, 401b, 402a, 402b, 403a and 403b are disposed on both sides of the 0-th order DLRC 400. The ±1st order DLRCs 403a, 401a, 402a, 402b, 401b and 403b consist of, respectively, four individual light receiving elements (A1, A2, A3, A4), (B1, B2, B3, B4), (C1, C2, C3, C4), (E1, E2, E3, E4), (F1, F2, F3, F4) and (G1, G2, G3, G4) each having an equal area in the set. The light receiving elements in each set are also disposed adjacent to each other with two orthogonal dividing lines as boundaries. The photodetector 40 is disposed in the plane perpendicular to the optical axis in a manner such that, when the light spot is formed on the recording layer of an optical disk at the focal point by 0-th order diffracted light, the focusing light spot forms the least circle of confusion described below and occupies a position at the intersection of the dividing line on the 0-th order DLRC 400. The ±1st order DLRCs are formed and arranged in point-symmetry with respect to the center (i.e., intersection of orthogonal dividing lines) of the 0-th order DLRC 400. Namely, the ±1st order DLRCs are symmetrical with respect to the straight lines extending from the center in the track direction and perpendicular direction.

As shown in FIG. 27, the light beam emitted by the semiconductor laser 31 reaches the polarization beam splitter 33 via the grating 32. The polarization beam splitter 33 has a polarizing mirror, and the incident light beam passes through the polarization beam splitter 33 and travels through the collimator lens 34. The optical path is then diverted at a right angle by the mirror 35, and the light beam passes through the lenses of the spherical aberration correction 42 and the quarter-wave plate 36 and reaches the predetermined data-recording surface of the optical disk 1 from the objective lens 37. The objective lens 37 of the irradiating optical system can thus form rows of pits arranged in a spiral or in concentric circles on the optical disk 1, or can form spots on the recording surface by focusing the light beam on the tracks. The spot formed by a beam of illuminating light can thus write or read data on the data-recording surface of the optical disk.

The return light resulting from the reflection of the light beam spot on the recording surface of the optical disk is guided to the photodetector 40 by a photodetection optical system as follows. Specifically, the return light passes through the objective lens 37, quarter-wave plate 36, lenses of the SACD 42, mirror 35, and collimator lens 34, returning to the polarization beam splitter 33. In this case, the optical path of return light is changed by the polarization beam splitter 33 to a direction different from the direction oriented toward the semiconductor laser 31, and the return light is guided to the diffractive optical element 39 and AGOE 38. The return light that has passed through the diffractive optical element 39 and AGOE 38 is provided with astigmatism, diffracted, split and directed to the 0-th order DLRC 400 and ±1st order DLRCs 401a, 401b, 402a, 402b, 403a and 403b in the photodetector 40 as diffracted light. It is also possible to arrange the AGOE 38 and diffractive optical element 39 in reverse order and to provide the return light with astigmatism after it has been diffracted. According to another option, the cylindrical lens may be replaced with a holographic lens having an ability to provide the return light with astigmatism.

The LRCs of the photodetector 40 photoelectrically convert received light to photodetection electrical signals respectively and feed them to the driving controller 59 shown in FIG. 26. The driving controller 59, which is connected to the photodetector 40, performs predetermined operations and generates a focal error signal FE, a wave aberration error signal SE, and a reproduced signal RF (Radio Frequency). Specifically, the signal outputs FE, SE, and RF of the driving controller 59 can be expressed by the following equations:

$$FE=(B1+B4+F1+F4)-(B2+B4+F1+F3)$$

$$SE=(A1+A4+C2+C3+E2+E3+G1+G4)-(A2+A3+C1+C4+E1+E4+G2+G3)$$

$$RF=D1+D2+D3+D4,$$

where the outputs are denoted by the same symbols as those used for the light receiving elements of the photodetector 40 shown in FIG. 28.

The driving controller 59 presents the focal error signal FE, wave aberration error signal SE, and reproduced signal RF to the focal driving circuit 18, driving circuit 19 for the spherical aberration, and demodulation circuit 20, respectively (FIG. 26). The photoelectrically converted signals of the light receiving elements separated by the dividing lines in the tangential direction can be used to generate tracking error signals.

The hologram lens of the diffractive optical element 39, which is disposed on the optical axis of return light in the photodetection optical system shown in FIG. 27, includes a grating or a blaze-type transparent hologram comprising a diffraction grating formed on a parallel plate made of optical glass.

Figure 29:
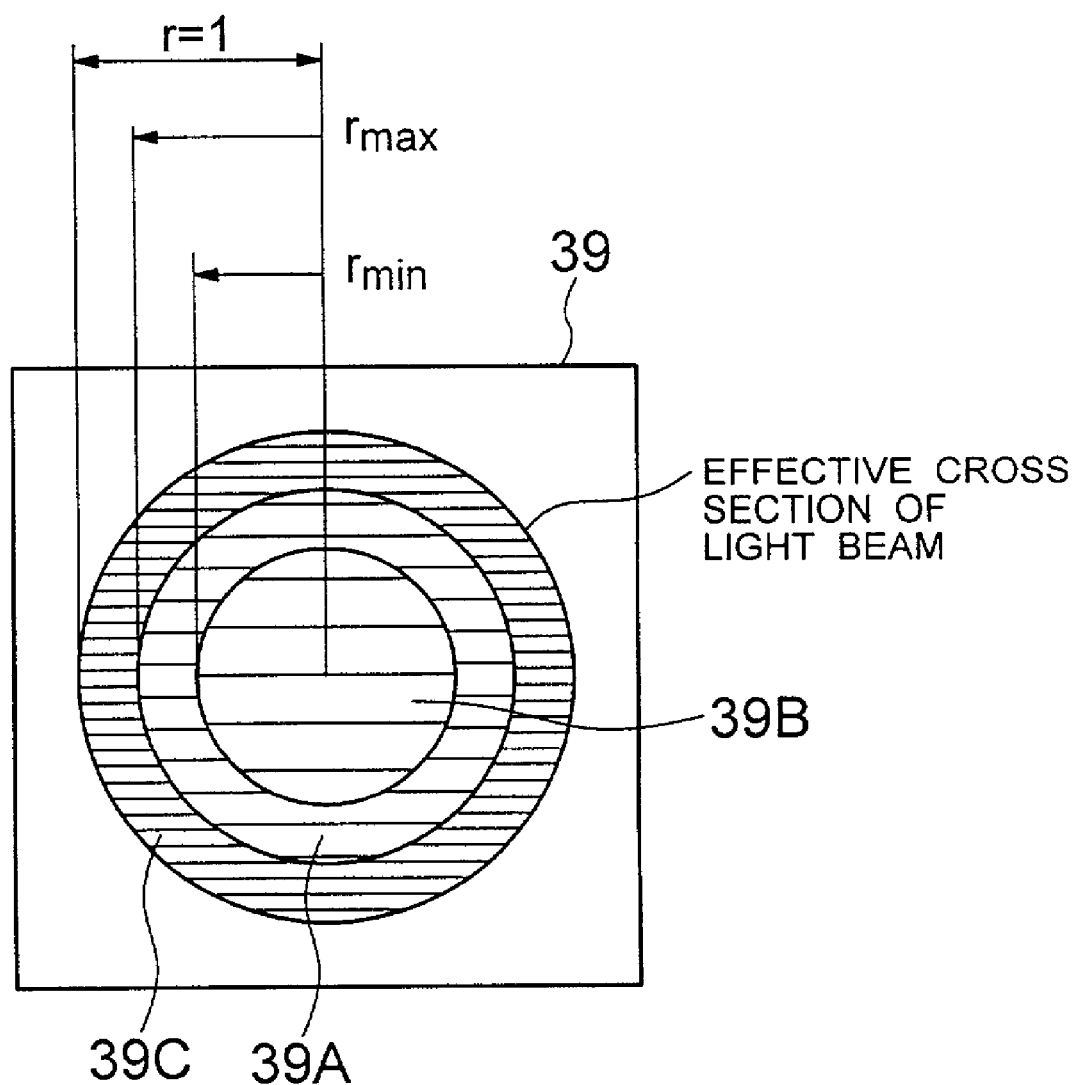
FIG. 29 is a schematic plan view depicting the structure of a hologram lens for the diffractive optical element of the optical pickup device according to the present invention.

FIG. 29 shows the hologram lens of the diffractive optical element 39 which has a diffraction grating in the form of an annulus 39A to extract the predetermined ray components from the return light in the form of a ring as described above. The diffractive optical element 39 is also provided with a second and third diffraction gratings of an internal area 39B and an external area 39C which have different functions from that of the annulus 39A. The internal area 39B is defined inside the annulus 39A as a circle shape. The external area 39C is disposed outside the annulus 39A as a ring shape to encircle it. Specifically, the annulus 39A, internal area 39B and external area 39C are provided with diffraction gratings that have mutually different pitches. The predetermined ray components extracted by the annulus 39A are certain ray components that lie in the vicinity of the predetermined radius corresponding to the maximum value of the wave aberration distribution, which is generated by a light-transmitting layer formed on the data-recording surface of the optical disk 1, appearing on the emitting pupil surface of the irradiating optical system including the objective lens 37 or the like. For this reason, the annulus 39A covers an area that extends in the range of radius from $0.71R_0$ to $0.74R_0$, where $R_0$ is the pupil radius measured in relation to the optical axis of return light.

Figure 30:
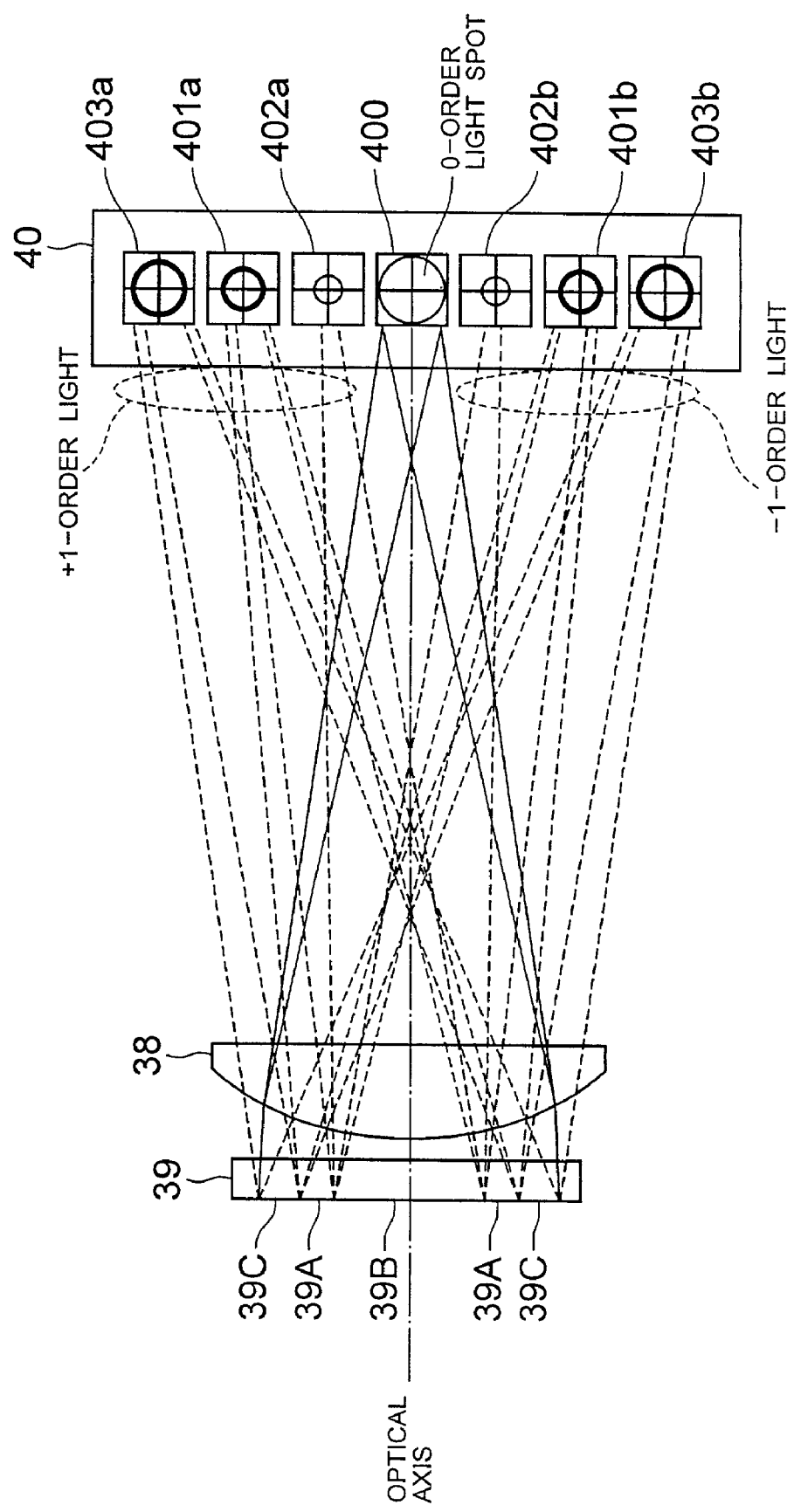
FIG. 30 is a schematic diagram depicting ray paths of diffracted light caused due to the return light from the hologram lens of the diffractive optical element to the photodetector of the optical pickup device according to the present invention.

FIG. 30 shows the ray paths of diffracted light caused due to the return light from the hologram lens of the diffractive optical element 39 through the cylindrical lens 38 (AGOE) to the photodetector 40 of the optical pickup. The element 39 and the cylindrical lens 38 appear in cross section but the photodetector 40 in front view in the Figure. The annulus 39A of the diffractive optical element 39 guides ±1st order diffracted light as ring spots to the respective ±1st order DLRCs 401a and 401b of the photodetector 40 via the cylindrical lens 38. The internal area 39B of the diffractive optical element 39 guides ±1st order diffracted light as circular spots to the respective ±1st order DLRCs 402a and 402b of the photodetector 40 via the cylindrical lens 38. The external area 39C of the diffractive optical element 39 guides ±1st order diffracted light as ring spots to the respective ±1st order DLRCs 403a and 403b of the photodetector 40 via the cylindrical lens 38. Each of he annulus 39A, internal area 39B and external area 39C of the diffractive optical element 39 guides 0-th order diffracted light as a circular spot to the 0-th order DLRC 400 of the photodetector 40 via the cylindrical lens 38. In this way, the diffractive optical element 39 separates return light into 0-th and ±1st order diffracted light. Specifically, 0-th order diffracted light passes through the diffractive optical element 39 and cylindrical lens 38 while unaffected by the action of the hologram lens. The 0-th order diffracted light travels without deviating from the original optical axis, but ±1st order diffracted light are symmetrically deflected with respect to the optical axis. The 0-th order DLRC 400 is connected to the demodulation circuit 20. The ±1st order DLRCs are connected to the driving controller 59, and the outputs thereof are presented to the corresponding electric circuits.

The focal error signal FE and wave aberration error signal SE in the driving controller 59 have S-shaped characteristics is obtained using the ±1st order diffracted light supplied from the annulus 39A, the internal area 39B and external area 39C belonging to the diffractive optical element 39, if the cover layer of the optical disk has the predetermined thickness, as seen from the description given with reference to FIGS. 6 and 7, a signal.

Figure 31:
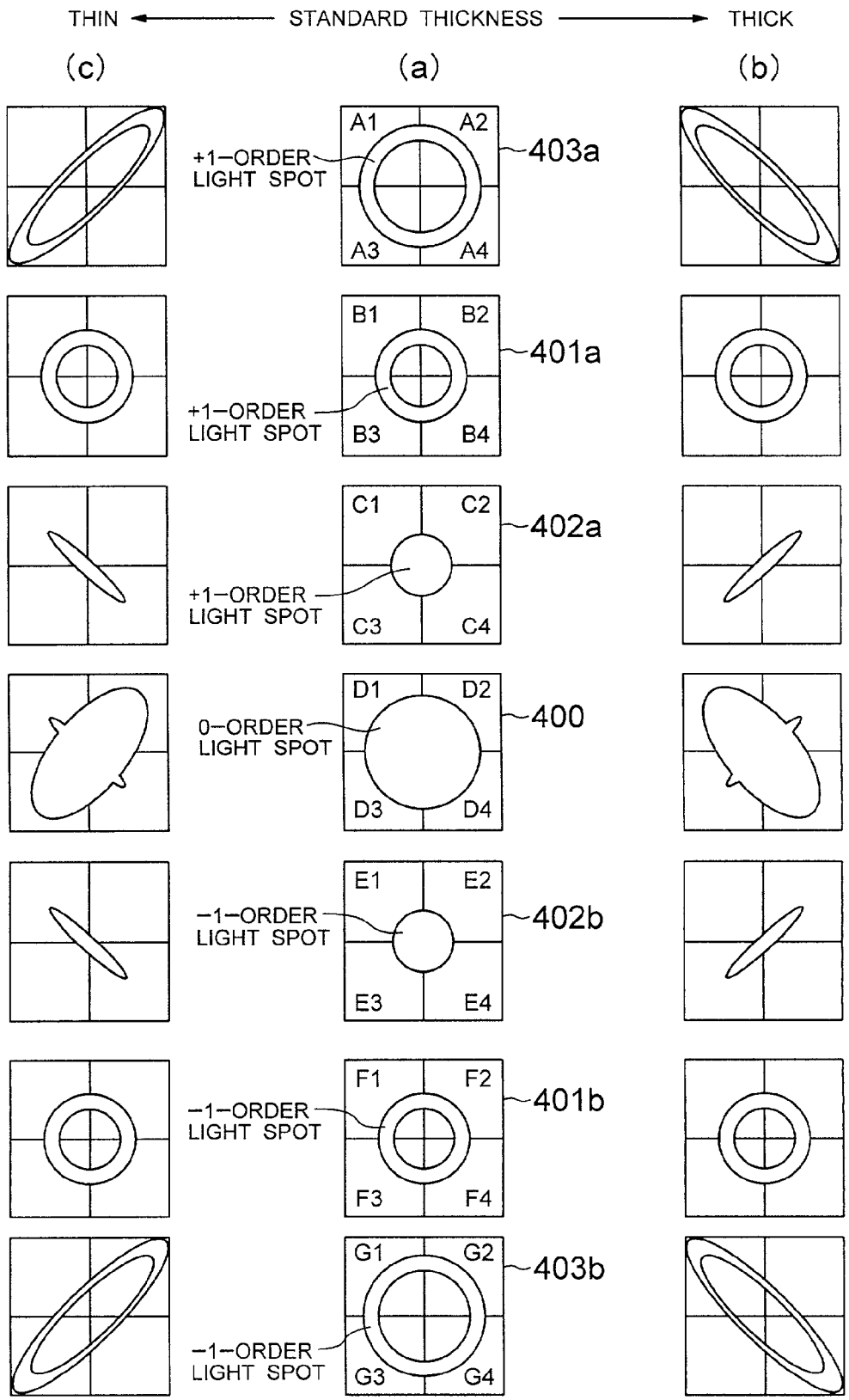
FIG. 31 is a schematic plan view depicting photodetectors and illustrating the modes of return light spots on the LRCs for 0-th or ±1st order diffracted light produced by return light during the converging of a light beam in the optical pickup device according to the present invention.

Here, it should be noted that, even during the just focusing state of the light beam depicted at (a) in FIGS. 6 and 7, spherical aberration is generated when the thickness error occurs away from the predetermined thickness of the cover layer or other layers belonging to the optical disk, whereby the spot diameter of return light illuminating the LRCs of the photodetector varies considerably. FIG. 31 will now illustrate the modes in which spots in the just focusing are generated on the 0-th and ±1st order DLRCs by using an objective lens with NA 0.85 irradiating a light beam having a Gauss intensity distribution.

As shown at (a) in FIG. 31, when the light is focused under conditions in which the cover layer of the optical disk 1 has the predetermined thickness, then 0-order diffracted light is converged into the least circle of confusion on the 0-th order DLRC 400 and, at the same time, ±1st order diffracted light are converged into the least rings and circles of confusion on the ±1st order DLRCs 401a, 401b, 402a, 402b, 403a and 403b.

As shown at (b) in FIG. 31, in case that the cover layer of the optical disk 1 has a thickness greater than the predetermined thickness, the spot formed by 0-th order diffracted light is distorted into an deformed oval even during just focusing. At the same time, ±1st order diffracted light which correspond to the internal areas of the hologram are converged into reduced ovals on the ±1st order DLRCs 402a and 402b. The ±1st order diffracted light which correspond to the external areas of the hologram are converged into reversed, slanted and expanded oval rings on the ±1st order DLRCs 403a and 403b.

As shown at (c) in FIG. 31, in case that the cover layer of the optical disk 1 has a thickness less than the predetermined thickness, the spot formed by 0-th order diffracted light is distorted into an deformed oval even during just focusing. At the same time, ±1st order diffracted light which correspond to the internal areas of the hologram are converged into reduced ovals on the ±1st order DLRCs 402a and 402b. The ±1st order diffracted light which correspond to the external areas of the hologram are converged into reversed, slanted and expanded oval rings on the ±1st order DLRCs 403a and 403b.

As can be seen in FIG. 31, the spots on the 1st order DLRCs 401a and 401b have stable shapes, that is, they keep point symmetry with respect to the centers of the LRCs. The annulus 39A of the diffraction grating belonging to the diffractive optical element 39 of the hologram lens operates to extract, from return light in the form of a ring, the predetermined ray components resistant to the thickness variations of the cover layer belonging to the optical disk 1.

As is apparent in FIG. 31, the light rays on the inside and outside of the annular aberration radius of $0.71R_0$ have different distributions when the thickness of a cover layer or the like is different from a specific thickness. The light intensity distributions are observed on the ±1st order DLRCs 401a and 401b when the cover layer or the like has a thickness error (that is, when spherical aberration is generated). Because these distributions are unbalanced, errors (defocusing) that affect the detection of the focal error are created when spherical aberration is generated. However, light rays passing through the area including an annular aberration radius of $0.71R_0$ do not move at all on the ±1st order diffracted light receiving portion 401*a* or 401*b*. Therefore, the fourth embodiment enables to perform a detection operation completely unaffected by the spherical aberration if the focal error is detected using this light ray alone.

Thus, the fourth embodiment is configured such that a light ray whose annular portion contains annular aberration from the distribution of intensities on the emission pupil is separated from the initial optical axis with the aid of a diffractive optical element provided with a diffraction grating in the annulus 39A corresponding to the annular portion while an astigmatism technique is used to detect focal errors. The annular light ray deviated and separated by the annular diffraction grating are directed to the photodetector (±1st order DLRCs 401*a* and 401*b*) used exclusively to detect focal errors, and focal errors are thus detected, with the result that the LRCs remain completely unaffected even in the presence of spherical aberration.

Another feature of the fourth embodiment is that the spherical aberration generated in the optical system can be detected by utilizing the fact that the light rays on the outside of the area of annular aberration (area that includes $0.71R_0$ as the pupil radius) and the light rays passing through the area behave differently due to the presence of spherical aberration.

As shown in FIG. 31, if spherical aberration is generated in the optical system, then the light rays passing through the diffractive optical element (internal area 39B and annular external area 39C in FIG. 29) will have astigmatism in two directions 90 degrees apart, and will strike the respective ±1st order DLRCs 402*a*, 402*b*, 403*a* and 403*b*. The spherical aberration can be detected by an operation in which the distribution of these light rays is calculated by the driving controller 59 on the basis of the equation $$SE=(A1+A4+C2+C3+E2+E3+G1+G4)-(A2+A3+C1+C4+E1+E4+G2+G3)$$

described above. The direction of spherical aberration can also be detected because the direction of the astigmatism affecting the light rays passing through the internal area 39B and annular external area 39C of the diffractive optical element varies with the polarity of the spherical aberration (according to whether the cover layer is thin or thick), as shown in FIG. 31.

Adopting this arrangement makes it possible to highly accurately detect spherical aberration without any effect from defocusing (because the focal servo function is actuated solely by the light rays passing through the annulus 39A of the diffractive optical element).

The diffractive optical element is installed such that the intensity of 0-th order diffracted light gradually increases. Since this arrangement entails detecting RF signals, thickness error signals, and the like with the 0-th order DLRC 400 for admitting 0-th order diffracted light, it is possible to reduce the number of summing amplifiers for obtaining RF signals, and to reduce the unnecessary noise.

Fifth Embodiment

The fifth embodiment is identical to the fourth embodiment except that the ±1st order DLRCs 403*a* and 403*b* are dispensed with together with the diffraction grating of the external area 39C belonging to the diffractive optical element 39 used in the fourth embodiment, and that the driving controller 59 is modified. Spherical aberration is detected solely with the light rays that pass through the diffraction grating of the circular internal area 39B, and the detection procedure is substantially identical to the one performed in the fourth embodiment.

Figure 32:
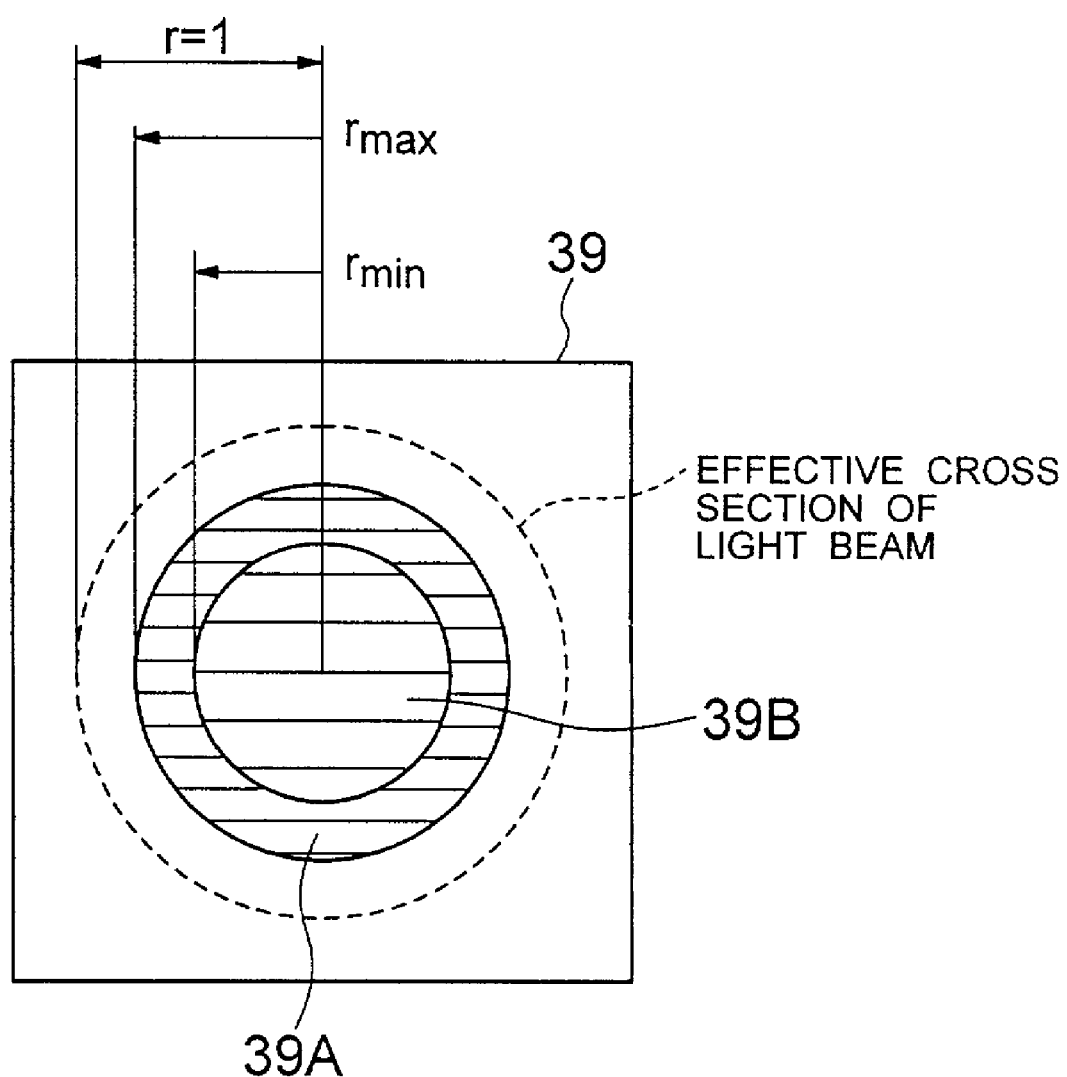
FIG. 32 is a schematic plan view depicting the structure of a hologram lens for the diffractive optical element of the optical pickup device according to another embodiment of the present invention.

As shown in FIG. 32, the diffractive optical element 39 of the fifth embodiment has an annulus 39A in the form of a diffraction grating which is designed to annularly extract ray components from the return light. The annulus 39A includes a radius of ranging from $0.71R_0$ to $0.74R_0$ on a pupil, where $R_0$ is the radius of the pupil measured relative to the optical axis of return light. The diffractive optical element 39 is also provided with a second diffraction gratings of an internal area 39B which has a diffraction grating that is different from the annulus 39A.

Figure 33:
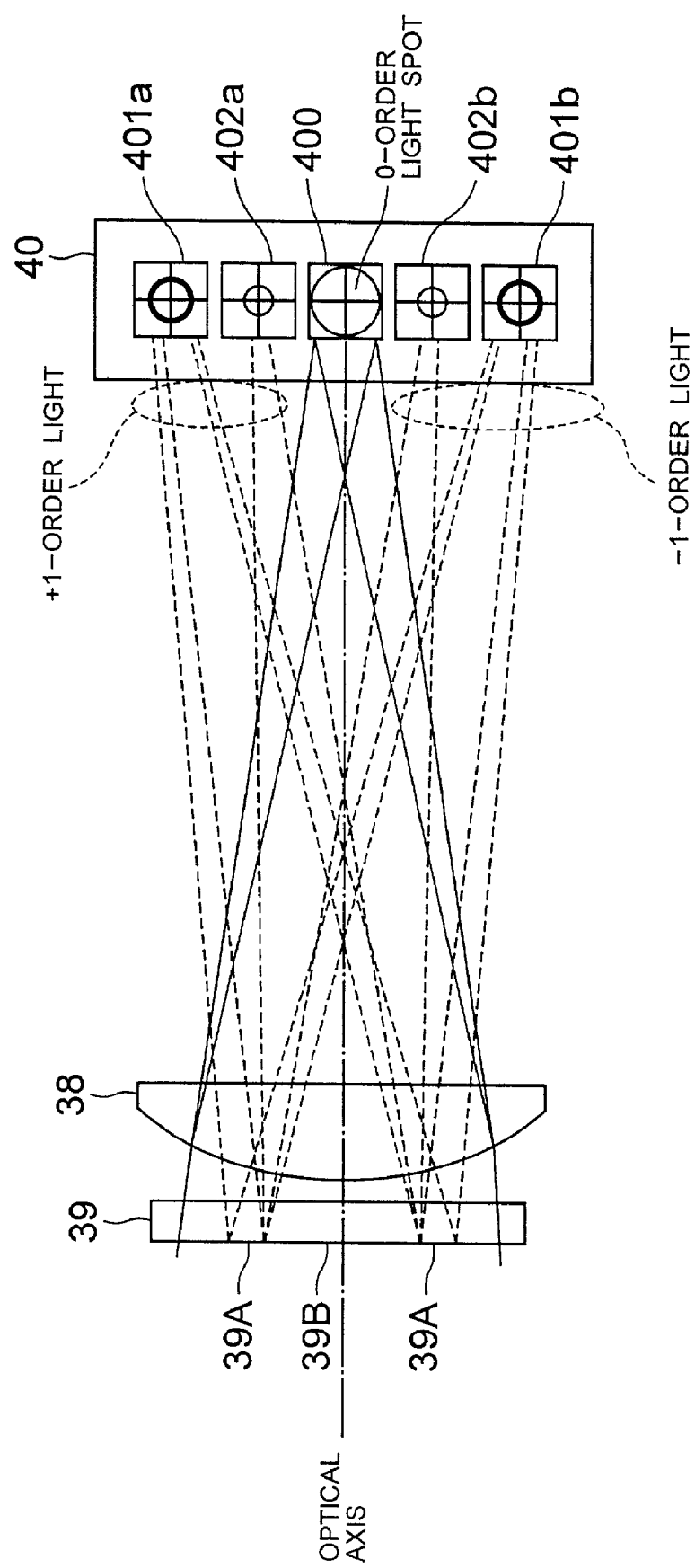
FIG. 33 is a schematic diagram depicting ray paths of diffracted light caused due to the return light from the hologram lens of the diffractive optical element to the photodetector of the optical pickup device according to another embodiment of the present invention.

FIG. 33 shows the ray paths of diffracted light from the hologram lens of the diffractive optical element 39 through the cylindrical lens 38 (AGOE) to the photodetector 40 of the optical pickup. The annulus 39A and internal area 39B of the diffractive optical element 39 guide 0-th order diffracted light as a circular spot to the 0-th order DLRC 400 via the AGOE 38. The annulus 39A guides ±1st order diffracted light as ring spots to ±1st order DLRCs 401*a* and 401*b* of the photodetector 40 via the AGOE 38. The internal area 39B of the diffractive optical element 39 guides ±1st order diffracted light as circular spots to the ±1st order DLRCs 402*a* and 402*b* via the AGOE 38. As shown at (a) in FIG. 34, if the cover layer of the optical disk 1 has the predetermined thickness, then the 0-th order diffracted light is converged into the least circle of confusion on the 0-th order DLRC 400, and at the same time the ±1st order diffracted light are converged into the least circles of confusion and the least rings on the ±1st order DLRCs 401*a*, 401*b*, 402*a*, and 402*b* during just focusing. As shown at (b) in FIG. 34, in a case that the cover layer of the optical disk 1 has a thickness greater than the predetermined thickness, the 0-th order diffracted light spot is converged into a deformed oval, and at the same time the ±1st order diffracted light are converged into reduced ovals on the ±1st order DLRCs 402*a* and 402*b* corresponding to the internal hologram area even when a focal point is maintained. As shown at (c) in FIG. 34, in a case that the cover layer of the optical disk 1 has a thickness less than the predetermined thickness, the 0-th order diffracted light spot is converged into a deformed oval and, at the same time the ±1st order diffracted light are converged into reduced ovals (rotated by 90 degrees) in the same manner as above on the ±1st order DLRCs 402*a* and 402*b* corresponding to the internal hologram area.

Figure 34:
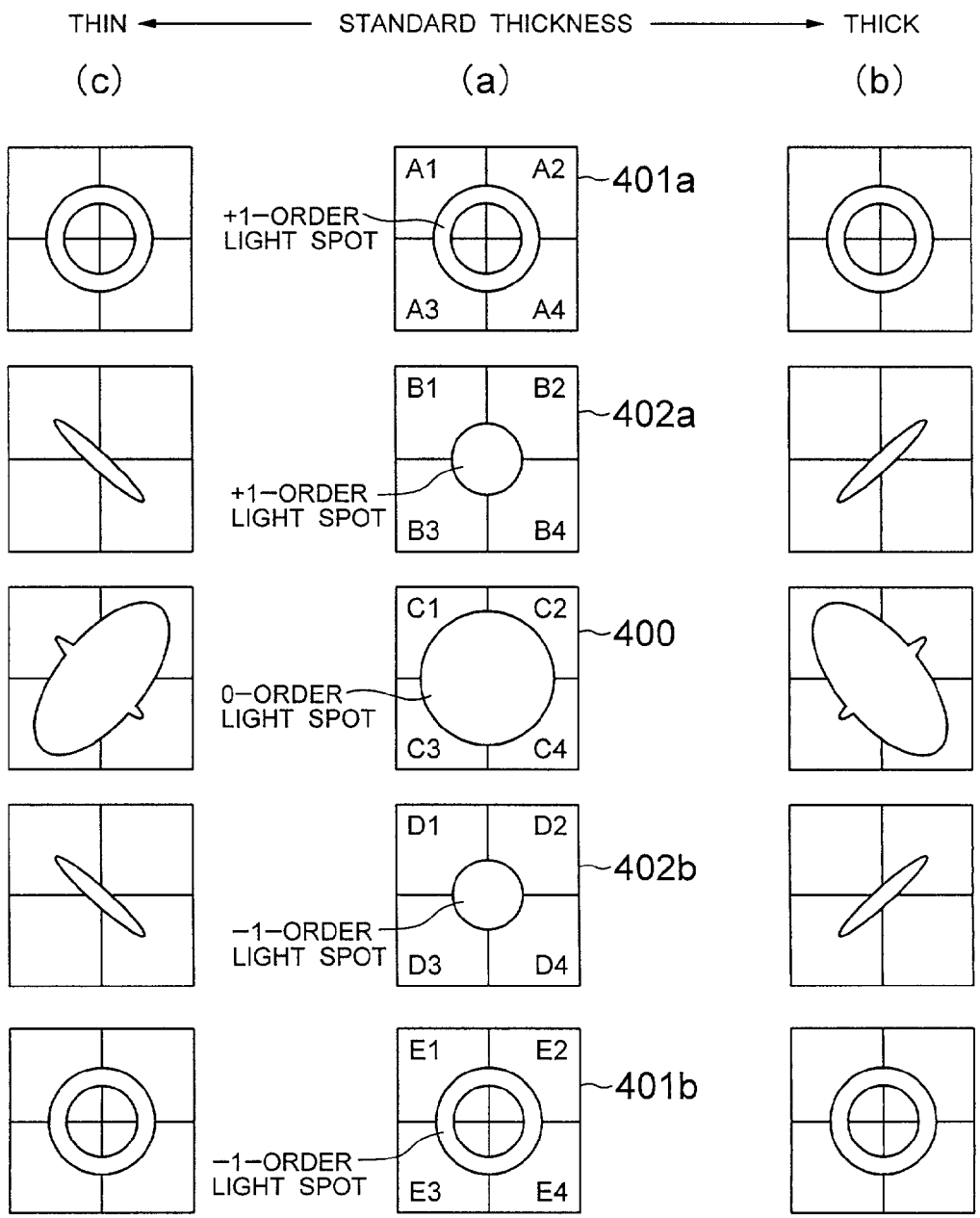
FIG. 34 is a schematic plan view depicting photodetectors and illustrating the modes of return light spots on the LRCs for 0-th or ±1st order diffracted light produced by return light during the converging of a light beam in the optical pickup device according to another embodiment of the present invention.

As can be seen in FIG. 34, the spots on the ±1st order DLRCs 401*a* and 401*b* have stable shapes and, they keep point symmetry with respect to the centers of the LRCS.

The driving controller 59 is configured such that the outputted focal error signal FE, wave aberration error signal SE, and reproduced signal RF are expressed by the following formulas, wherein the outputs are labeled by the symbols used for the LRCs of the photodetector 40 shown in FIG. 34.

$$SE=(B1+B4+D1+D4)-(B2+B3+D2+D3)$$

$$FE=(A1+A4+E1+E4)-(A2+A3+E2+E3)$$

$$RF=C1+C2+C3+C4$$

Figure 35:
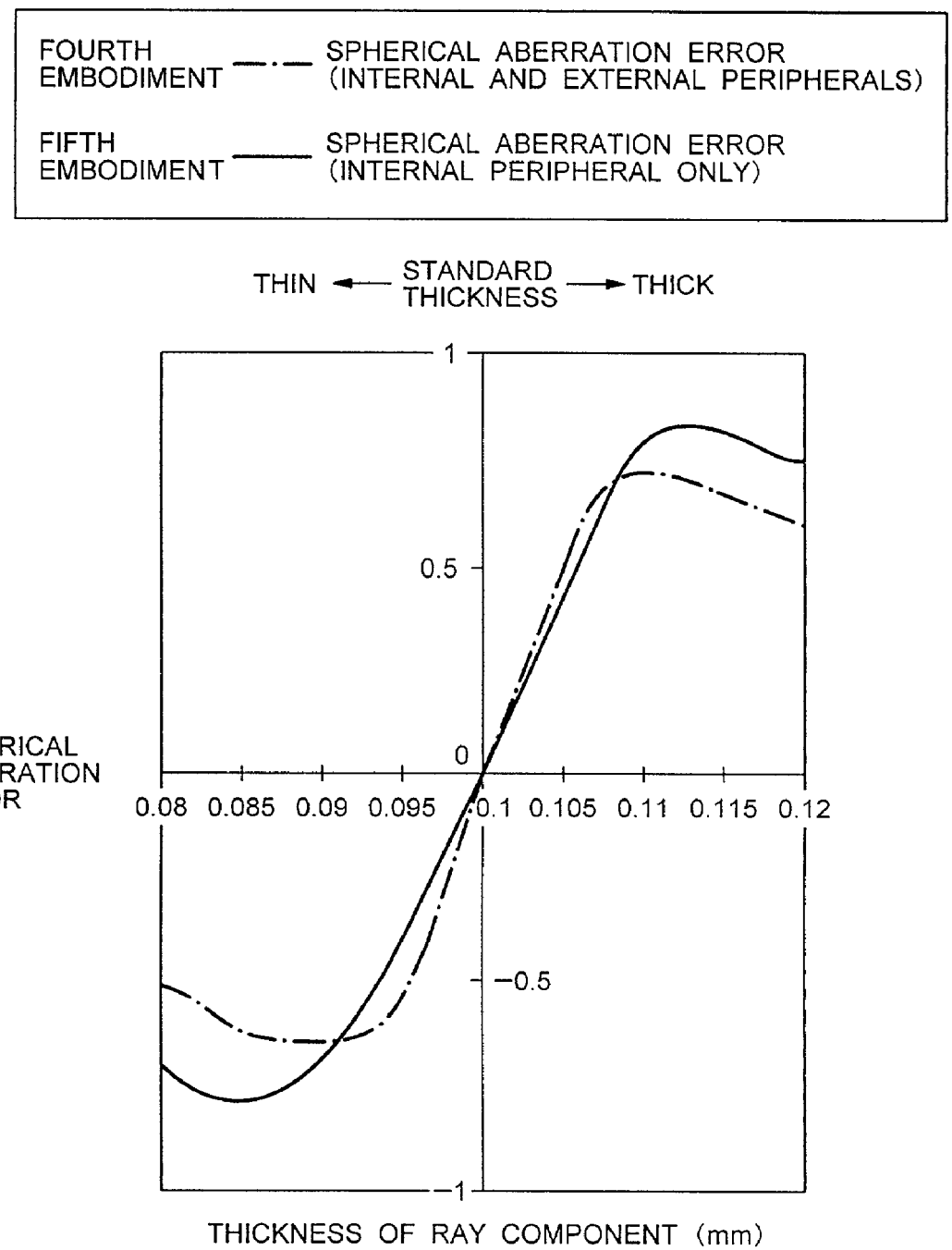
FIG. 35 is a graph depicting the manner in which the spherical aberration error varies with the thickness error in the cover layer of an optical disk in the optical pickup device according to the present invention.

FIG. 35 shows the relationship between the spherical aberration error and thickness error of cover layers belonging to optical disks according to the fourth and fifth embodiments. It can be seen in the figure that both cases yield characteristics whose linear responses have a capture range of about ±0.01 mm in relation to the thickness error of the cover layer, but that the fourth embodiment has a somewhat narrower characteristic than does the fifth embodiment.

In applications involving two-layered disks, the capture range has to be increased to at least twice the interlayer gap.

Sixth Embodiment

Figure 36:
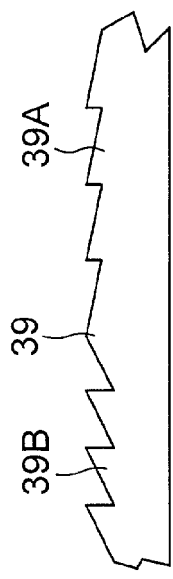
FIG. 36 is a schematic cross-sectional view depicting part of a hologram lens for the diffractive optical element of the optical pickup device according to another embodiment of the present invention.

The sixth embodiment is identical to the fifth embodiment except that the shape of the diffraction gratings for the annulus 39A and internal area 39B of the diffractive optical element 39 shown in FIG. 32 in connection with the fifth embodiment is modified to the blaze configuration shown in cross section in FIG. 36, that the ±1st order DLRC 402a and the −1st order DLRC 401b are dispensed with, and that the driving controller 59 is modified. It is also possible to endow the diffractive optical element with a blaze configuration and to extract and use solely higher-order diffracted light of either polarity. It is further possible to use one or both types of the ±1st order diffracted light produced by the diffractive optical element in the fourth embodiment.

Figure 37:
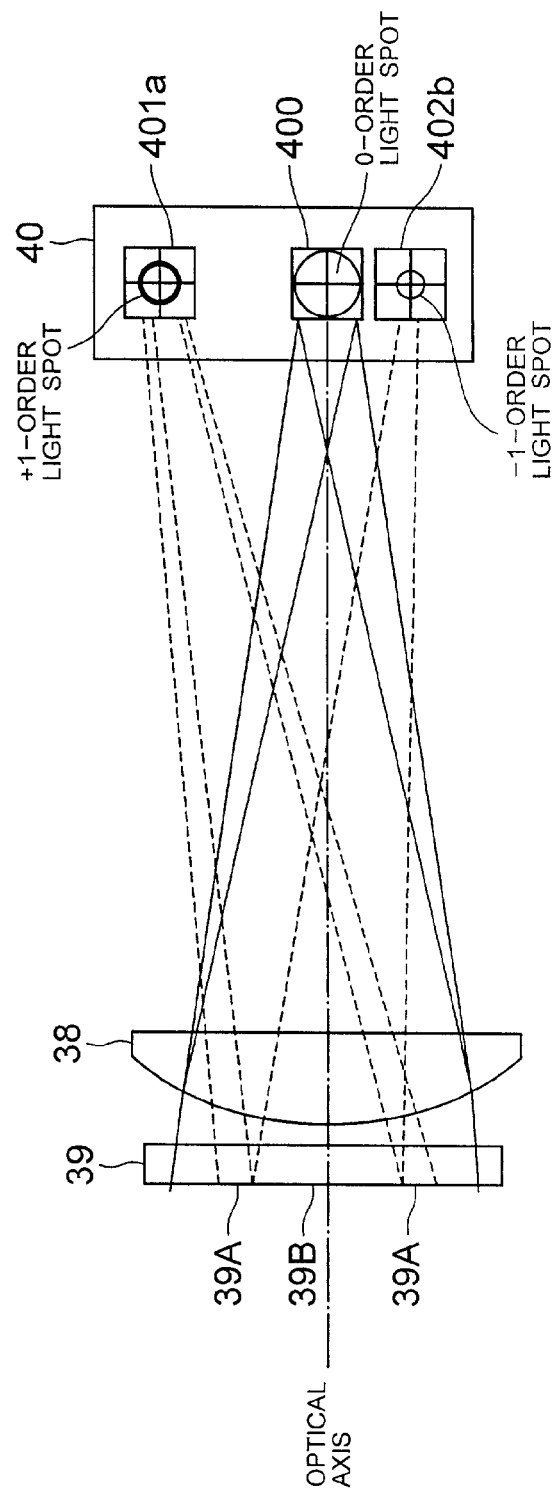
FIG. 37 is a schematic diagram depicting ray paths of diffracted light caused due to the return light from the hologram lens of the diffractive optical element to the photodetector of the optical pickup device according to another embodiment of the present invention.

FIG. 37 shows the ray paths of diffracted light from the hologram lens of the diffractive optical element 39 through the cylindrical lens 38 (AGOE) to the photodetector 40 of the optical pickup. The annulus 39A and internal area 39B of the diffractive optical element 39 guide 0-th order diffracted light as a circular spot to the 0-th order DLRC 400 via the AGOE 38. The annulus 39A guides only +1st order diffracted light as a ring spot to +1st order DLRC 401a of the photodetector 40 via the AGOE 38. The internal area 39B of the diffractive optical element 39 guides only −1st order diffracted light as a circular spot to the −1st order DLRC 402b of the photodetector 40 via the AGOE 38. As shown at (a) in FIG. 38, if the cover layer of the optical disk 1 has the predetermined thickness, then the 0-th order diffracted light is converged into the least circle of confusion on the 0-th order DLRC 400, and at the same time the ±1st order diffracted light are converged into the least circles of confusion and the least rings on the ±1st order DLRCs 401a and 402b respectively during focusing. As shown at (b) in FIG. 38, in a case that the cover layer of the optical disk 1 has a thickness greater than the predetermined thickness, the 0-th order diffracted light spot is deformed into an oval extending in one diagonal of elements and −1st order diffracted light is converged into an oval spot on the −1st order DLRC 402b even when a focal point is maintained. As shown at (c) in FIG. 38, in a case that the cover layer of the optical disk 1 has a thickness less than the predetermined thickness, 0-th order diffracted light is converged into an oval spot extending in the other diagonal of elements and −1st order diffracted light is converged into an oval spot (rotated by 90 degrees from the former) in the same manner as above on the −1st order DLRC 402b.

Figure 38:
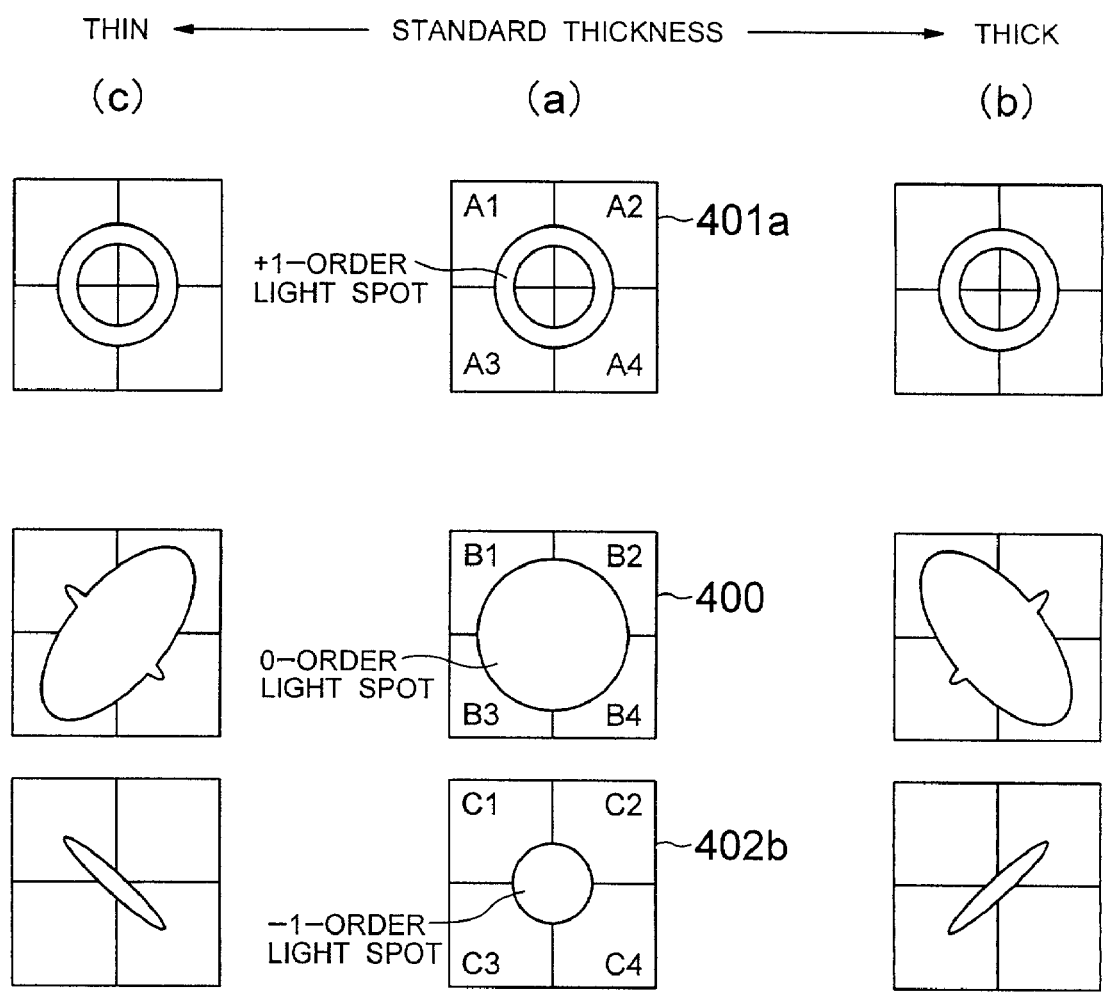
FIG. 38 is a schematic plan view depicting photodetectors and illustrating the modes of return light spots on the LRCs for 0-th or ±1st order diffracted light produced by return light during the converging of a light beam in the optical pickup device according to another embodiment of the present invention.

As can be seen in FIG. 38, the spots on the ±1st order DLRCs 401a and 401b have stable shapes and, they keep point symmetry with respect to the centers of the LRCs.

The driving controller 59 is configured such that the outputted focal error signal FE, wave aberration error signal SE, and reproduced signal RF are expressed by the following formulas, wherein the outputs are labeled by the symbols used for the LRCs of the photodetector 40 shown in FIG. 38.

$SE=(C1+C4)-(C2+C3)$ $FE=(A1+A4)-(A2+A3)$ $RF=B1+B2+B3+B4$

Seventh Embodiment

The seventh embodiment is substantially the same as the fourth embodiment except that the AGOE 38 used in the fourth embodiment is dispensed with and the photodetector 40, diffractive optical element 39, and driving controller 59 are modified in accordance with a differential spot size technique. Whereas the fourth embodiment is implemented using an astigmatism technique as the method for the focusing servo control of the focal actuator 301, this seventh embodiment is implemented using a differential spot size technique. A spot size technique is a method in which the return light from an optical disk is divided into two optical paths, the system is configured such that front and back focal points having different focal distances are generated, LRCs are positioned in front and behind the focal points, the light spots on them are compared in terms of size, and a focal error signal is generated.

Figure 39:
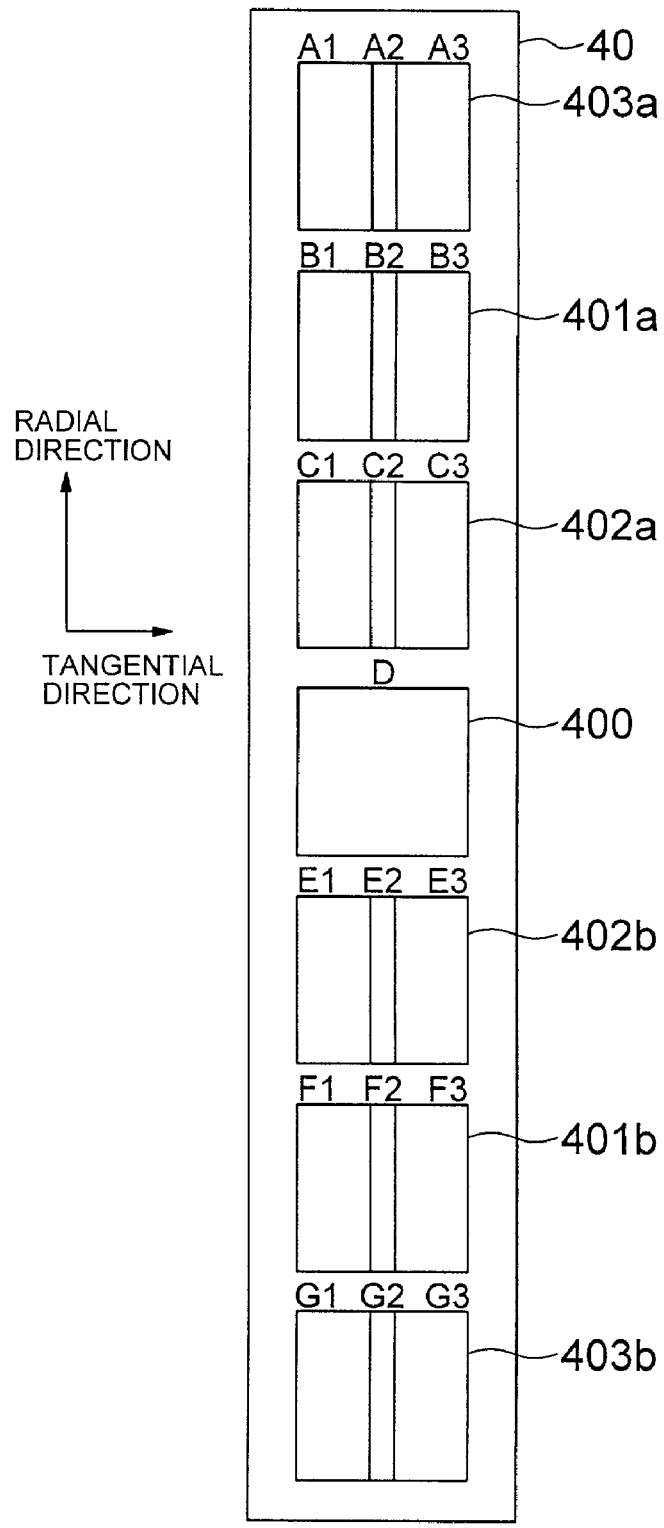
FIG. 39 is a schematic plan view depicting the photodetector of the optical pickup device according to another embodiment of the present invention.

As shown in FIG. 39, the 0-th order DLRC 400 on the optical axis is composed of a single light receiving element (D) in the photodetector 40 of the seventh embodiment. The ±1st order DLRCs 401a, 401b, 402a, 402b, 403a and 403b are disposed separately on both sides of the 0-th order DLRC 400 in the radial disk direction. The ±1st order DLRCs 401a, 401b, 402a, 402b, 403a and 403b consist of, respectively, three individual light receiving elements (A1, A2, A3), (B1, B2, B3), (C1, C2, C3), (E1, E2, E3), (F1, F2, F3) and (G1, G2, G3). The respective pairs of light receiving elements (A1, A3), (B1, B3), (C1, C3), (E1, E3), (F1, F3) and (G1, G3) have equal surface areas. These respective pairs of light receiving elements are disposed symmetrically with respect to a straight line that extends in the radial direction along the centrally located light receiving elements (A2), (B2), (C2), (E2), (F2) and (G2). The photodetector 40 is disposed in a plane perpendicular to the optical axis in a manner such that the 0-th order diffracted light spot on the recording layer of an optical disk forms the least circle of confusion described above and remains in the center of the 0-th order DLRC 400 when focused. The LRCs are symmetrical with respect to the straight lines that extend from this center in the track direction and the perpendicular direction.

Figure 40:
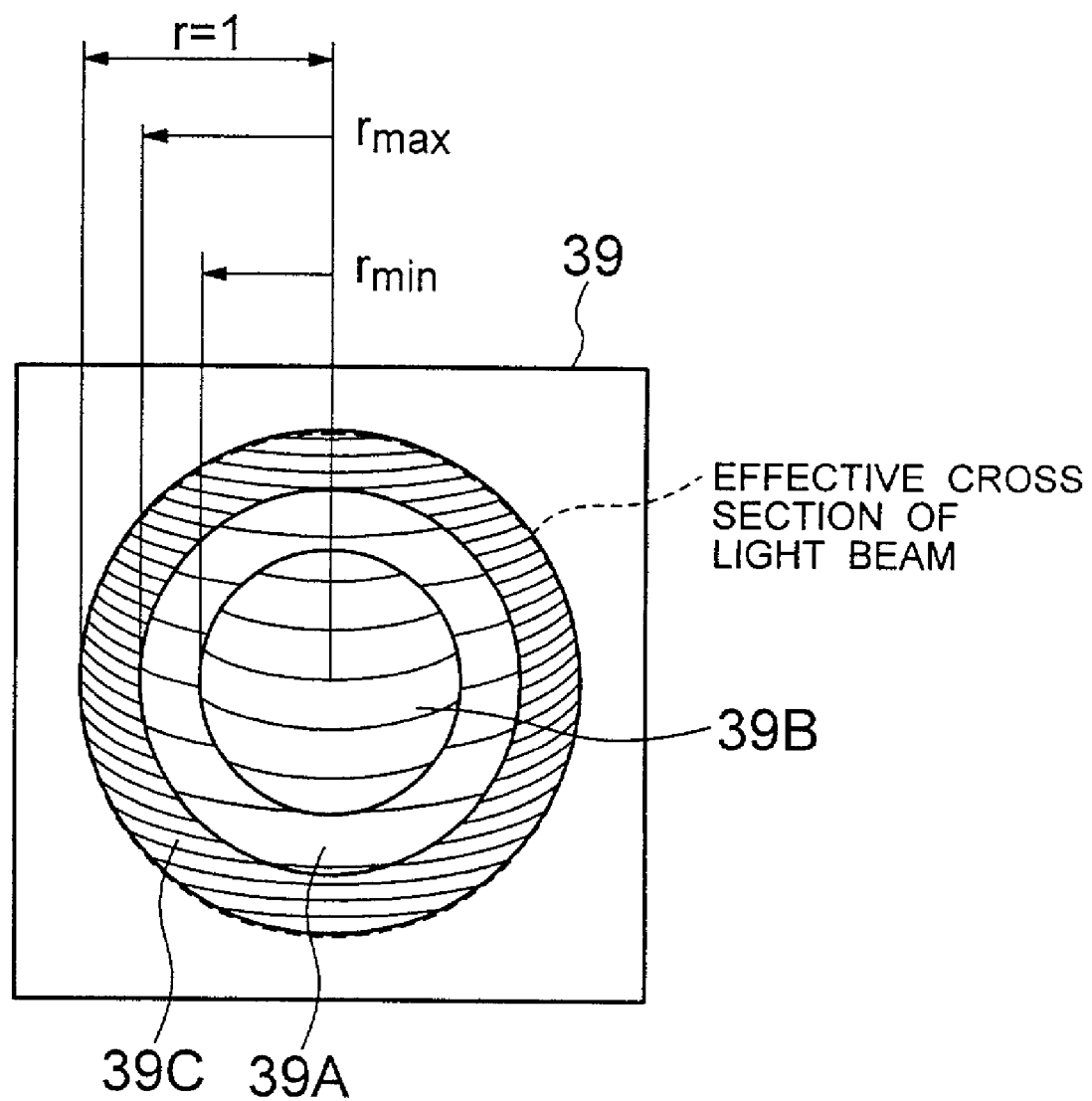
FIG. 40 is a schematic plan view depicting the structure of a hologram lens for the diffractive optical element of the optical pickup device according to another embodiment of the present invention.

FIG. 40 shows the hologram lens of the diffractive optical element 39 according to the seventh embodiment. This diffractive optical element also comprises a diffraction grating in the form of an annulus 39A whereby predetermined ray components are extracted from the return light in the form of a ring. Namely the predetermined ray components exist in the vicinity of a normalized radius for a cross section of a light beam corresponding to the maximum value of a wave aberration distribution on the emitting pupil surface of the optical system including the objective lens 37 or the like. The light-transmitting layer on the data-recording surface of an optical disk 1 generates the wave aberration distribution. The diffractive optical element 39 is also provided with a second and third diffraction gratings of an internal area 39B and an external area 39C which have different functions from that of the annulus 39A. The internal area 39B is defined inside the annulus 39A as a circle shape. The external area 39C is disposed outside the annulus 39A as a ring shape to encircle it. Specifically, the annulus 39A, internal area 39B and external area 39C are provided with diffraction gratings that have mutually different pitches. These annulus 39A, internal area 39B, and external area 39C are designed so as to provide an off-center lens effect whereby ±1st order diffracted light are converged by being deflected substantially symmetrically away from the original optical axis. The annulus 39A, internal area 39B, and external area 39C are also designed to act as a concave or convex lens for any type of ±1st order diffracted light. The annulus 39A of the diffractive optical element 39 includes an area on the pupil whose radius ranges from $0.71R_0$ to $0.74R_0$, where $R_0$ is the pupil radius measured in relation to the optical axis of return light.

Figure 41:
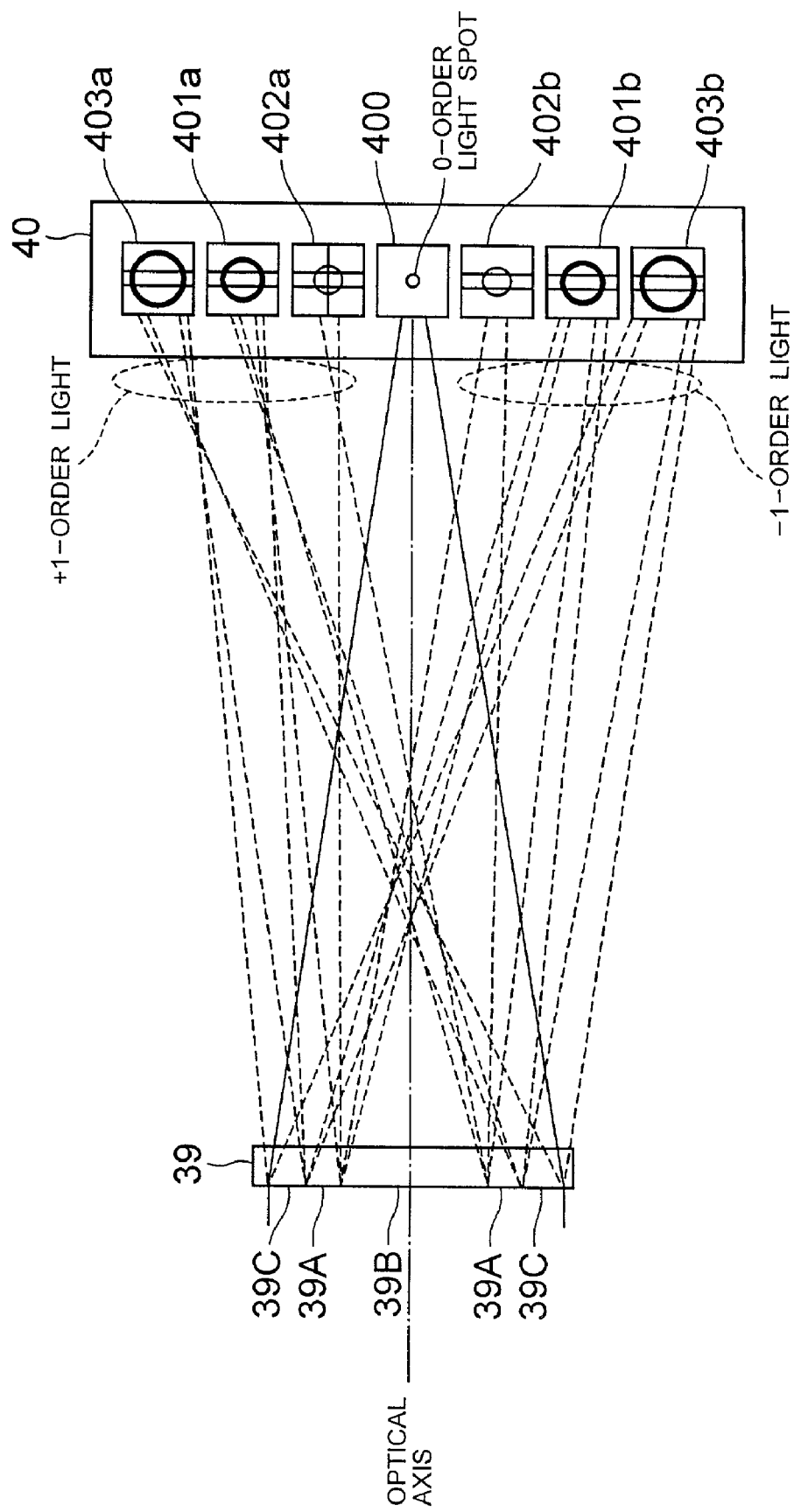
FIG. 41 is a schematic diagram depicting ray paths of diffracted light caused due to the return light from the hologram lens of the diffractive optical element to the photodetector of the optical pickup device according to another embodiment of the present invention.

FIG. 41 shows the ray paths of diffracted light caused due to the return light from the hologram lens of the diffractive optical element 39 to the photodetector 40 of the optical pickup. The element 39 appears in cross section but the photodetector 40 in front view in the Figure. The annulus 39A of the diffractive optical element 39 guides ±1st order diffracted light as ring spots to the respective ±1st order DLRCs 401a and 401b of the photodetector 40. The internal area 39B of the diffractive optical element 39 guides ±1st order diffracted light as circular spots to the respective ±1st order DLRCs 402a and 402b of the photodetector 40. The external area 39C of the diffractive optical element 39 guides ±1st order diffracted light as ring spots to the respective ±1st order DLRCs 403a and 403b of the photodetector 40. The annulus 39A, internal area 39B and external area 39C of the diffractive optical element 39 guides 0-th order diffracted light as a circular spot to the 0-th order DLRC 400 of the photodetector 40. In this way, the diffractive optical element 39 separates return light into 0-th and list order diffracted light. Specifically, 0-th order diffracted light passes through the diffractive optical element 39 while unaffected by the action of the hologram lens. The 0-th order diffracted light travels without deviating from the original optical axis, but ±1st order diffracted light are symmetrically deflected with respect to the optical axis. The 0-th order DLRC 400 is connected to the demodulation circuit 20. The ±1st order DLRCs are connected to the driving controller 59, and the outputs thereof are presented to the corresponding electric circuits. The outputs of the ±1st order DLRCs 401a and 401b for receiving the annular spots extracted by the annulus 39A of the diffractive optical element 39, are used for detecting focal error signals FE, and the outputs of the ±1st order DLRCs 402a, 402b, 403a and 403b for receiving the circular and annular spots extracted by the internal area 39B and annular external area 39C, are used for detecting spherical aberration error signals SE.

According to the differential spot size technique described with reference to FIG. 21, the driving controller 59 is configured such that the outputted focal error signal FE, wave aberration error signal SE, and reproduced signal RF are expressed by the following formulas, wherein the outputs are labeled by the symbols used for the LRCs of the photodetector 40 shown in FIG. 42.

$SE=(A1+A3+C2+E1+E3+G2)-(A2+C1+C3+E2+G1+G3)$ $FE=(B1+B3+F2)-(B2+F1+F3)$ $RF=D$

Even with the differential spot size technique, however, the spot diameter of the light beam illuminating the LRCs of the photodetector varies considerably because spherical aberration is generated when there is a thickness error in the predetermined thickness of the cover layer or other layers of the optical disk during the focusing of the light beam (in state (a) in FIG. 21).

Figure 42:
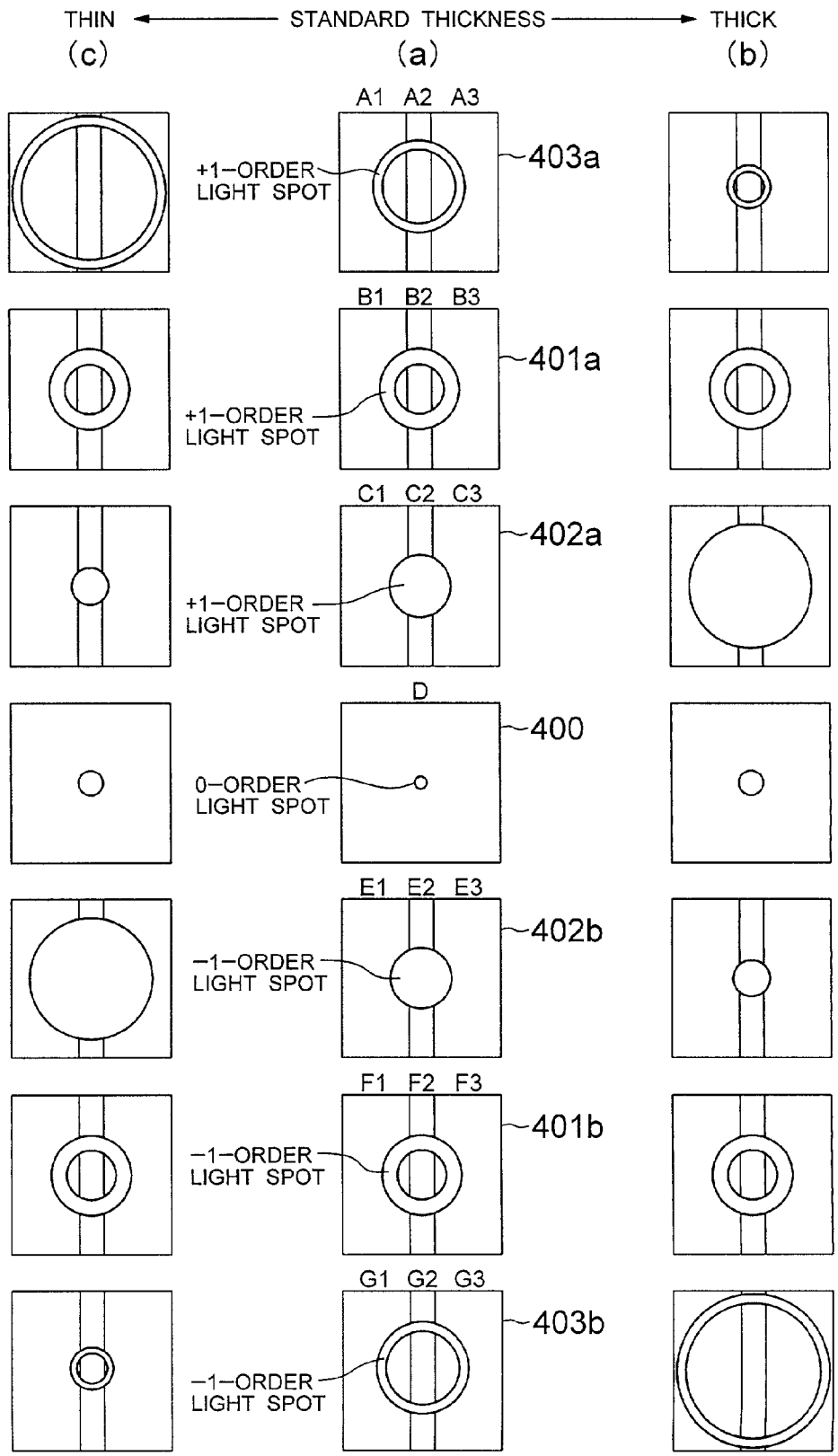
FIG. 42 is a schematic plan view depicting photodetectors and illustrating the modes of light spots on the LRCs for 0-th or ±1st order diffracted light produced by return light during the converging of a light beam in the optical pickup device according to another embodiment of the present invention.

As shown at (a) in FIG. 42, if the cover layer of the optical disk 1 has the predetermined thickness, then the 0-th order diffracted light is converged into the least circle of confusion on the 0-th order DLRC 400, and ±1st order diffracted light are at the same time converged into the least circle and ring of confusion on the ±1st order DLRCs 401a, 401b, 402a, and 402b, 403a and 403b during focusing.

As shown at (b) in FIG. 42, in a case that the cover layer of the optical disk 1 has a thickness greater than the predetermined thickness, the 0-th order diffracted light spot is somewhat expanded, and at the same time ±1st order diffracted light from the internal area 39B of hologram are converged into expanded and contracted circles on the ±1st order DLRCs 402a and 402b, and, conversely, ±1st order diffracted light from annular external area 39C are converged into contracted and expanded rings on the ±1st order DLRCs 403a and 403b.

As shown at (c) in FIG. 42, in a case that the cover layer of the optical disk 1 has a thickness less than the predetermined thickness, the 0-th order diffracted light spot is somewhat expanded, and at the same time ±1st order diffracted light from the internal area 39B of hologram are converged into contracted or expanded circles on the ±1st order DLRCs 402a and 402b, and, conversely, ±1st order diffracted light from annular external area 39C are converged into expanded and contracted rings on the ±1st order DLRCs 403a and 403b.

It can be seen in FIG. 42 that the spots on the ±1st order DLRCs 401a and 401b have a constant size independent of the configuration (that is, the thickness error). The annulus 39A of the diffraction grating belonging to the diffractive optical element 39 of the hologram lens operates such that predetermined ray components resistant to the thickness variations of the cover layer belonging to the optical disk 1 are extracted from the return light in the ring form.

Eighth Embodiment

The eighth embodiment is substantially the same as the fourth embodiment except that the photodetector 40, diffractive optical element 39 and driving controller 59 used in the fourth embodiment are modified in accordance with the astigmatism technique and differential spot size technique. Whereas an astigmatism technique is used in the above-described fourth embodiment for the focusing servo control of the focal actuator 301, a hybrid technique composed of an astigmatism technique and differential spot size technique is used in the eighth embodiment to detect focal errors.

Figure 43:
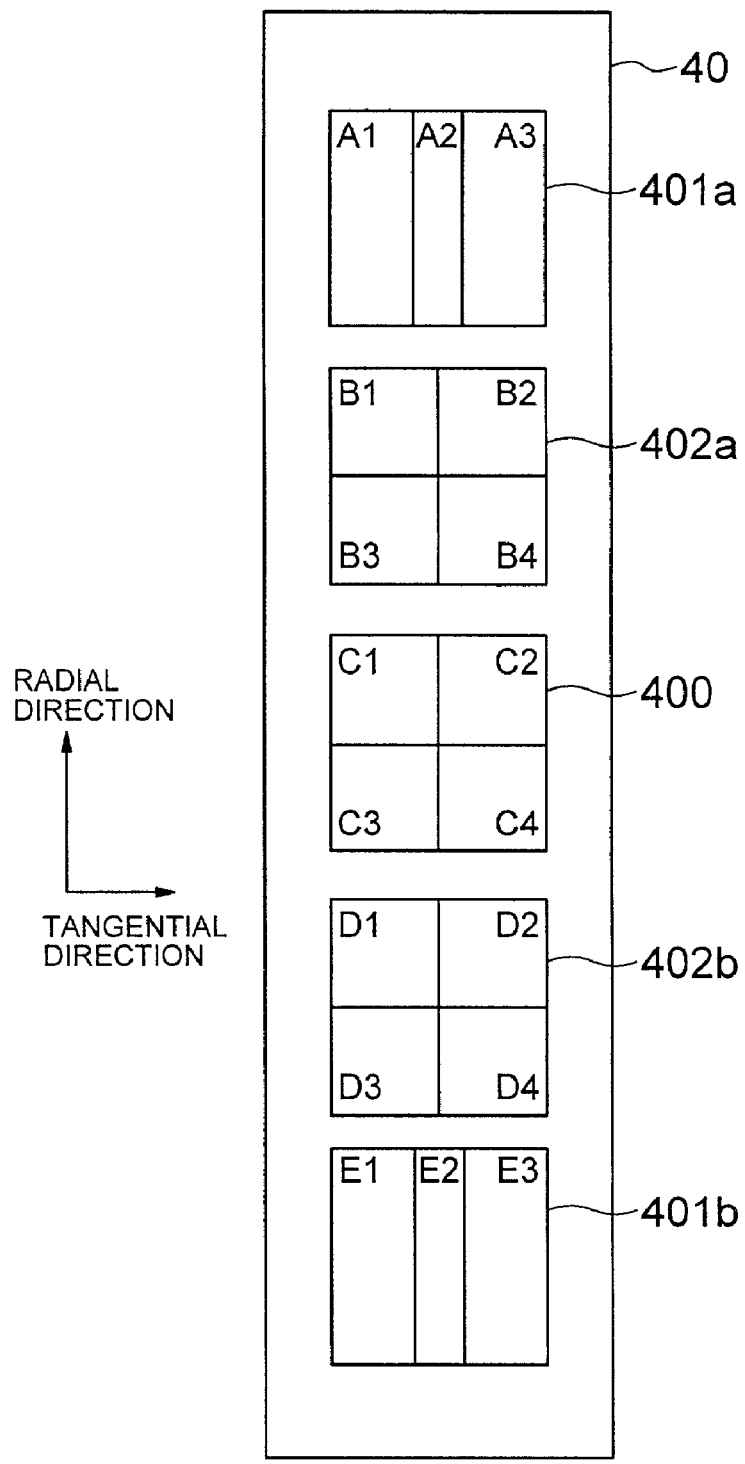
FIG. 43 is a schematic plan view depicting the photodetector of the optical pickup device according to another embodiment of the present invention.

FIG. 43 shows the photodetector 40 of the eighth embodiment. The 0-th order DLRC 400 is disposed on the optical axis and comprises four split light receiving elements (C1, C2, C3, C4) each having an equal area in the set. The light receiving elements are disposed adjacent to each other with two orthogonal dividing lines as boundaries, one of which is parallel to the longitudinal track direction of the optical disk 1. The ±1st order DLRCs 402a and 402b are disposed on both sides of the 0-th order DLRC 400. The ±1st order DLRCs 402a and 402b consist of, respectively, four individual light receiving elements (B1, B2, B3, B4) and (D1, D2, D3, D4) each having an equal area in the set. The light receiving elements in each set are also disposed adjacent to each other so as to be separated by two orthogonal dividing lines. The ±1st order DLRCs 401a and 401b are disposed farther away on both sides of the 0-th order DLRC 400 in the radial direction of the disk. The ±1st order DLRCs 401a and 401b consist of, respectively, three individual light receiving elements (A1, A2, A3) and (E1, E2, E3). The respective pairs of light receiving elements (A1, A3) and (E1, E3) have equal surface areas and are disposed symmetrically with respect to a straight line that extends in the radial direction along the centrally located light receiving elements (A2) and (E2). The photodetector 40 is disposed in a plane perpendicular to the optical axis in a manner such that the 0-th order diffracted light spot on the recording layer of an optical disk forms the least circle of confusion described above and remains at the point of intersection of dividing lines on the 0-th order DLRC 400 when focused. The LRCs are symmetrical with respect to the straight lines that extend from this center in the track direction and the perpendicular direction.

Figure 44:
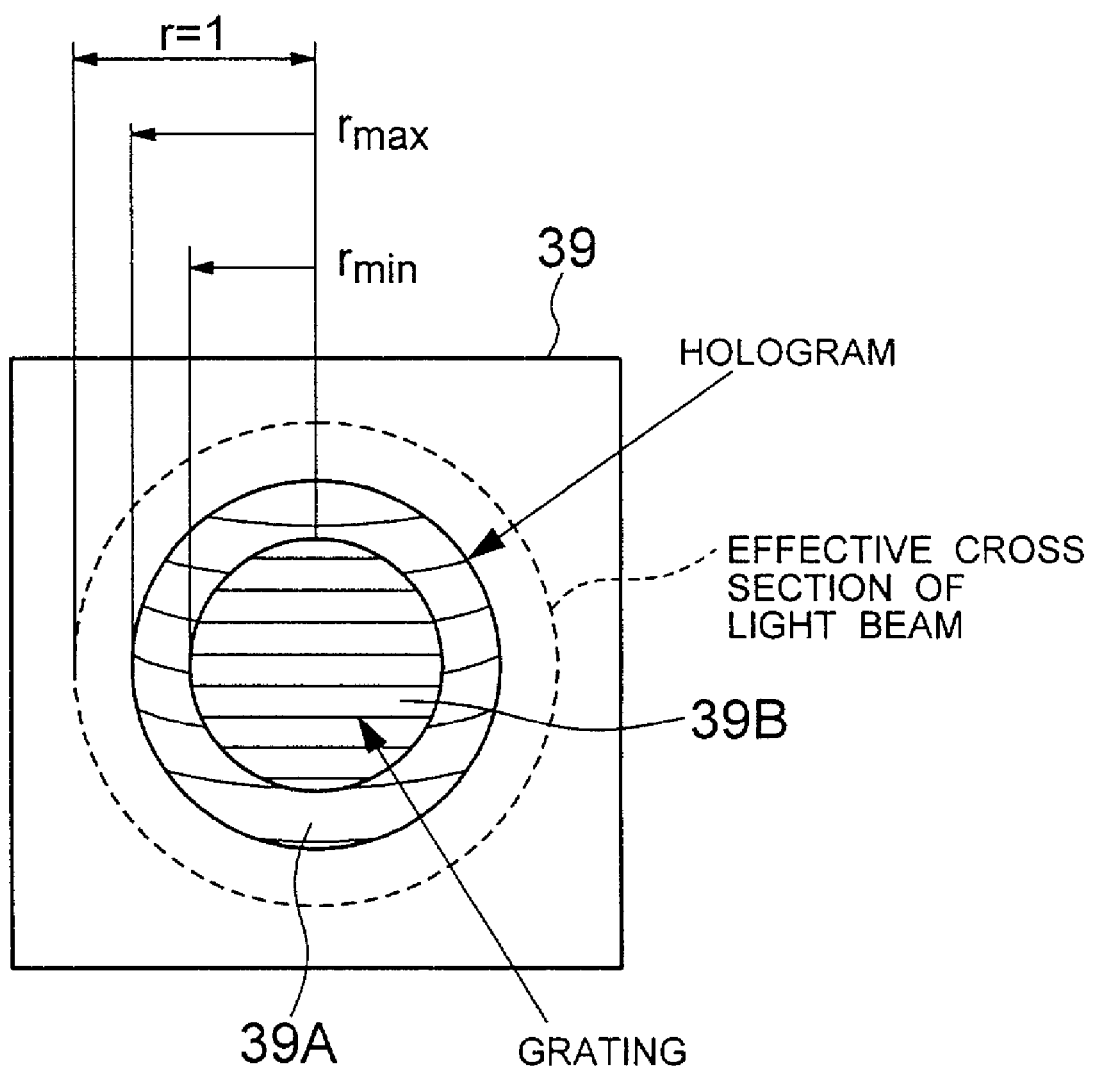
FIG. 44 is a schematic plan view depicting the structure of a hologram lens for the diffractive optical element of the optical pickup device according to another embodiment of the present invention.

FIG. 44 shows the hologram lens of the diffractive optical element 39 according to the eighth embodiment. This diffractive optical element also comprise an annulus 39A of a diffraction grating to extract predetermined ray components from the return light in the form of a ring. Similarly to the above embossments, the predetermined ray components exist in the vicinity of a normalized radius for a cross section of a light beam corresponding to the maximum value of a wave aberration distribution on the emitting pupil surface of the optical system including the objective lens 37 or the like. The light-transmitting layer on the data-recording surface of an optical disk 1 generates the wave aberration distribution. The diffractive optical element 39 is also provided with an internal area 39B composed of a diffraction grating located inside the annulus 39A. A transparent parallel plate portion devoid of a diffraction grating is provided around the annulus 39A on the outside thereof. The annulus 39A and internal area 39B are fitted with diffraction gratings at mutually different pitches to provide respective off-center lens effects so that ±1st order diffracted light are converged by being deflected substantially symmetrically away from the original optical axis respectively. The annulus 39A is designed to act as a concave or convex lens for any type of ±1st order diffracted light. The annulus 39A of the diffractive optical element 39 includes an area on the pupil whose radius ranges from $0.71R_0$ to $0.74R_0$, where $R_0$ is the pupil radius measured in relation to the optical axis of return light.

Figure 45:
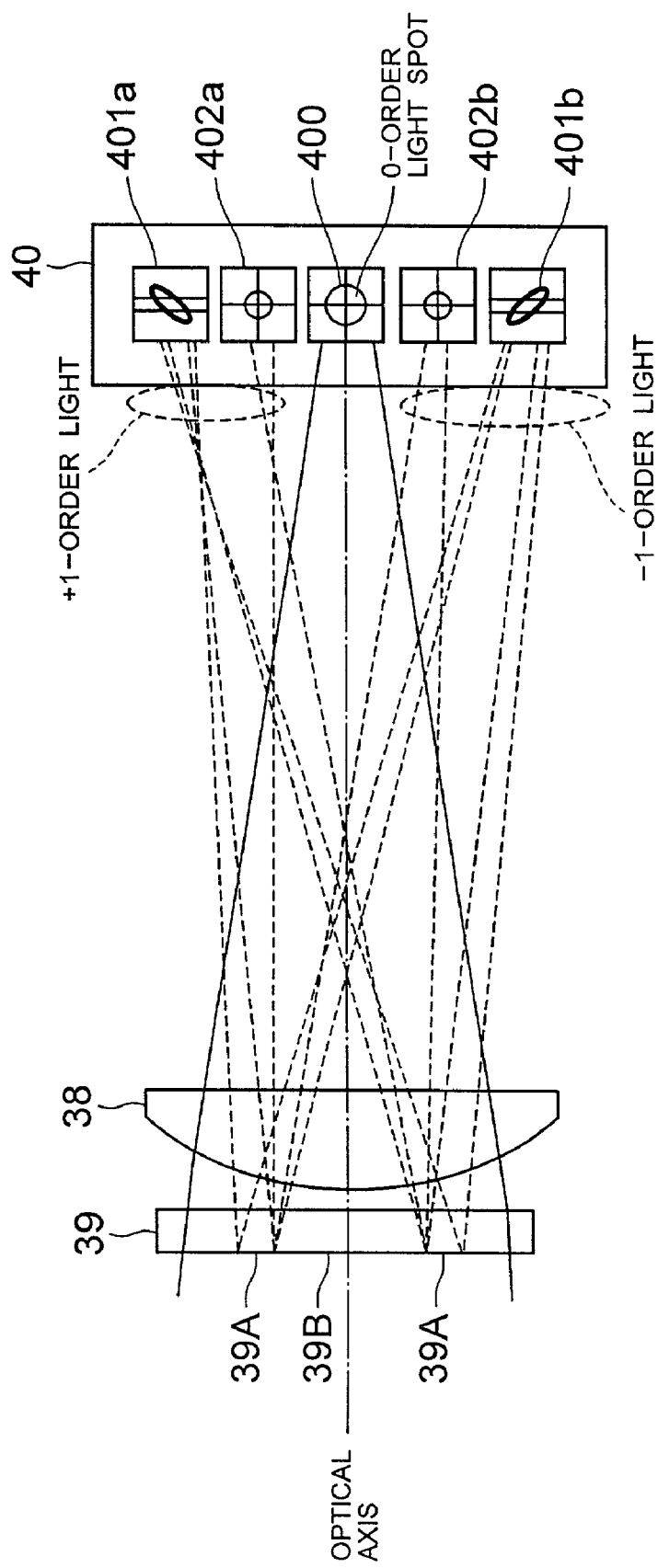
FIG. 45 is a schematic diagram depicting ray paths of diffracted light caused due to the return light from the hologram lens of the diffractive optical element to the photodetector of the optical pickup device according to another embodiment of the present invention.

FIG. 45 shows the ray paths of diffracted light from the hologram lens of the diffractive optical element 39 through the cylindrical lens 38 (AGOE) to the photodetector 40 of the optical pickup. The annulus 39A and internal area 39B of the diffractive optical element 39 guide 0-th order diffracted light as a circular spot to the 0-th order DLRC 400 via the AGOE 38. The annulus 39A guides ±1st order diffracted light as elliptic ring spots to ±1st order DLRCs 401a and 401b of the photodetector 40 via the AGOE 38. The internal area 39B of the diffractive optical element 39 guides ±1st order diffracted light as circular spots to the ±1st order DLRCs 402a and 402b via the AGOE 38. In this way, the diffractive optical element 39 separates transmitted return light into 0-th order diffracted light and ±1st order diffracted light. The 0-th order DLRC 400 is connected to a demodulation circuit 20, the ±1st order DLRCs are connected to the driving controller 59, and their outputs are supplied to respective circuits. The outputs of the ±1st order DLRCs 401a and 401b for receiving the oval spots extracted by the annulus 39A of the diffractive optical element 39 are used for detecting focal error signals FE. The outputs of the ±1st order DLRCs 402a and 402b for receiving the circular spot extracted by the internal area 39B, are used for detecting spherical aberration error signals SE.

The driving controller 59 is configured such that the outputted focal error signal FE, wave aberration error signal SE, and reproduced signal RF are expressed by the following formulas, wherein the outputs are labeled by the symbols used for the LRCs of the photodetector 40 shown in FIG. 46.

$$SE=(B1+B4+D1+D4)-(B2+B3+D2+D3)$$

$$FE=(A1+A3+E2)-(A2+E1+E3)$$

$$RF=C1+C2+C3+C4$$

The present invention can be adapted to a three-beam pickup based on DPP, CTC or the like in accordance with any of the embodiments described above. In such a case, ±1st order diffracted light are generated in the side beam of the return light, so that the ±1st order diffracted light of the side beam have fairly low luminous energy. Therefore, the present invention makes it possible to dispense with the need for light-receiving photodetectors. Such three-beam photodetectors can receive 0-th order diffracted light alone by means of the above-described diffractive optical elements.

The present invention provides an arrangement in which a focal error is detected using solely the light rays that pass through an annular region completely unaffected by spherical aberration. Therefore, the present invention makes it possible to prevent errors (defocusing) from being generated during the detection of the focal error even when spherical aberration is generated by the thickness error of the cover layer on an optical disk, and hence to adequately detect the focal error and to accurately detect the spherical aberration while excluding defocusing components. Actuating a spherical aberration compensation means on the basis of this spherical aberration addresses the problems encountered during the recording and reproducing of signals on a disk because high-accuracy compensation can be achieved even when the cover layer is affected by thickness errors or the like and spherical aberration is generated.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application Nos. 2001-227364 and 2001-227365 which are hereby incorporated by reference.

What is claimed is:

1. An optical pickup device having a function to detect focal error of a light beam, comprising:
    an irradiating optical system for converging a light beam to form a spot on a recording surface via a light-transmitting layer of an optical recording medium;
    a photodetection optical system for converging return light reflected and returned from the spot onto a photodetector;
    a diffractive optical element disposed on an optical axis of the return light in the photodetection optical system and provided with an annulus annularly extracting from the return light ray components in a vicinity of a predetermined radius on a pupil on an emitting pupil surface of the irradiating optical system, the wave aberration distribution being affected by the wave aberration generated in the optical system wherein the diffractive optical element has an internal area defined inside the annulus and an external area defined outside the annulus within the return light;
    first light receiving components provided with the photodetector and receiving the ray components transmitted and extracted by the annulus; and
    a focal error detecting circuit connected to the first light receiving components and detecting a focal error of the light beam on the basis of a photoelectrically converted output obtained from the outputs of the photodetector.

2. An optical pickup device according to claim 1, wherein the predetermined radius on the pupil ranges from $0.71R_0$ to $0.74R_0$, where $R_0$ is a radius of the pupil measured in relation to the optical axis of the return light.

3. An optical pickup device according to claim 1, wherein the annulus has inside and outside radii $r_{min}$ and $r_{max}$ that satisfy Equation (3) below, $$\int_0^{2\pi} \int_{r_{min}}^{r_{max}} I(r\cos\theta, r\sin\theta) S(y(r)) r\, dr\, d\theta = 0 \qquad (3)$$

(In Equation (3), $I(r \cos \theta, r \sin \theta)$ is the distribution of intensities on the emission pupil, $S(y)$ is the focal error signal function, and $y(r)$ is longitudinal aberration).

4. An optical pickup device according to claim 1, wherein the diffractive optical element is a hologram lens which separates transmitted light into 0-th order diffracted light and 1st order diffracted light by means of a diffraction grating with which the annulus is provided.

5. An optical pickup device according to claim 4, further comprising an astigmatism generating optical element, which is disposed in front of or behind the hologram lens on the optical axis of return light in the photodetection optical system, and which provides astigmatism to the return light.

6. An optical pickup device according to claim 4, wherein the hologram lens provides astigmatism to the return light.

7. An optical pickup device according to claim 5, wherein the first light receiving components comprise four light receiving elements which are disposed adjacent to each other with two orthogonal dividing lines as boundaries, and which receive any type of ±1st order diffracted light emitted by the annulus of the diffractive optical element and arranged about the point of intersection of the dividing lines; and wherein the focal error detecting circuit generates the difference between the output sums of each diagonally located pair of the four light receiving elements as a focal error signal of the light beam.

8. An optical pickup device according to claim 4, wherein the hologram lens has an off-center lens effect whereby ±1st order diffracted light of the return light are converged by being deflected away from the original optical axis, and possesses a function of acting as a concave or convex lens for any type of ±1st order diffracted light.

9. An optical pickup device according to claim 8, wherein the first light receiving components each comprise at least two light receiving elements which receive ±1st order diffracted light emitted from the annulus of the diffractive optical element and disposed adjacent to each other while separated by dividing lines for dividing the spot formed by the ±1st order diffracted light, the total surface area of at least the one or more light receiving elements on the side of positive polarity being substantially equal to the total surface area of at least the one or more light receiving elements on the side of negative polarity; and wherein the focal error detecting circuit generates the difference between the output sums of the light receiving elements on the side of positive polarity and the side of negative polarity as a focal error signal of the light beam.

10. An optical pickup device according to claim 5, wherein the hologram lens possesses a function of acting as a concave or convex lens for any of the types of ±1st order diffracted light produced by return light;

the first light receiving components comprise four split light receiving elements which are disposed adjacent to each other with two orthogonal dividing lines as boundaries, and which receive 1st order diffracted light emitted by the annulus of the diffractive optical element and arranged about the point of intersection of the dividing lines; and wherein the focal error detecting circuit generates the difference between the output sums of each diagonally located pair of the four light receiving elements as a focal error signal of the light beam.

11. An optical pickup device having a function to detect wave aberration and focal error of a light beam, comprising:

an irradiating optical system for converging a light beam to form a spot on a recording surface via a light-transmitting layer of an optical recording medium;

a photodetection optical system for converging return light reflected and returned from the spot onto a photodetector;

a diffractive optical element disposed on an optical axis of the return light in the photodetection optical system and provided with an annulus annularly extracting from the return light ray components in a vicinity of a predetermined radius on a pupil on an emitting pupil surface of the irradiating optical system, the wave aberration distribution being affected by the wave aberration generated in the optical system wherein the diffractive optical element has an internal area defined inside the annulus and an external area defined outside the annulus within the return light;

first light receiving components provided with the photodetector and receiving the ray components transmitted and extracted by the annulus;

second light receiving components provided with the photodetector and receiving ray components other than the ray components transmitted by the annulus;

a focal error detecting circuit connected to the first light receiving components and detecting a focal error of the light beam on the basis of a photoelectrically converted output obtained from the outputs of the photodetector; and a wave aberration error detecting circuit connected to the second light receiving components and detecting the wave aberration of the light beam on the basis of a photoelectrically converted output obtained from the outputs of the photodetector.

12. An optical pickup device according to claim 11, wherein the predetermined radius on the pupil ranges from $0.71R_0$ to $0.74R_0$, where $R_0$ is a radius of the pupil measured in relation to the optical axis of the return light.

13. An optical pickup device according to claim 11, wherein the annulus has inside and outside radii $r_{min}$ and $r_{max}$ that satisfy Equation (3) below, $$\int_0^{2\pi} \int_{r_{min}}^{r_{max}} I(r\cos\theta, r\sin\theta) S(y(r)) r\, dr\, d\theta = 0 \qquad (3)$$

(In Equation (3), $I(r \cos \theta, r \sin \theta)$ is the distribution of intensities on the emission pupil, $S(y)$ is the focal error signal function, and $y(r)$ is longitudinal aberration).

14. An optical pickup device according to claim 11, wherein the diffractive optical element is a hologram lens which separates transmitted light into 0-th order diffracted light and 1st order diffracted light by means of a diffraction grating with which the annulus is provided.

15. An optical pickup device according to claim 14, further comprising an astigmatism generating optical element, which is disposed in front of or behind the hologram lens on the optical axis of return light in the photodetection optical system, and which provides astigmatism to the return light.

16. An optical pickup device according to claim 14, wherein the hologram lens provides astigmatism to the return light.

17. An optical pickup device according to claim 15, wherein the first light receiving components comprise four split light receiving elements which are disposed adjacent to each other with two orthogonal dividing lines as boundaries, and which receive any type of ±1st order diffracted light emitted by the annulus of the diffractive optical element and arranged about the point of intersection of the dividing lines; and wherein the focal error detecting circuit generates the difference between the output sums of each diagonally located pair of the four light receiving elements as a focal error signal of the light beam.

18. An optical pickup device according to claim 17, wherein the diffractive optical element is a hologram lens which separates transmitted light into 0-th order diffracted light and 1st order diffracted light by means of a diffraction grating provided to an internal area defined inside the annulus;

the second light receiving components comprise four split light receiving elements which are disposed adjacent to each other with two orthogonal dividing lines as boundaries, and which receive any type of 1st order diffracted light emitted by the internal area of the diffractive optical element and arranged about the point of intersection of the dividing lines; and wherein the wave aberration error detecting circuit generates the difference between the output sums of each diagonally located pair of the four light receiving elements as a wave aberration error signal of the light beam.

19. An optical pickup device according to claim 17, wherein the diffractive optical element is a hologram lens which separates transmitted light into 0-th order diffracted light and 1st order diffracted light by means of a diffraction grating provided to an external area defined outside the annulus;

the second light receiving components comprise four split light receiving elements which are disposed adjacent to each other with two orthogonal dividing lines as boundaries, and which receive 1st order diffracted light emitted by the external area of the diffractive optical element and arranged about the point of intersection of the dividing lines; and wherein the wave aberration error detecting circuit generates the difference between the output sums of each diagonally located pair of the four light receiving elements as a wave aberration error signal of the light beam.

20. An optical pickup device according to claim 14, wherein the hologram lens has an off-center lens effect whereby ±1st order diffracted light of the return light are converged by being deflected away from the original optical axis, and possesses a function of acting as a concave or convex lens for any type of ±1st order diffracted light.

21. An optical pickup device according to claim 20, wherein the first light receiving components each comprise at least two light receiving elements which receive ±1st order diffracted light emitted from the annulus of the diffractive optical element and disposed adjacent to each other while separated by dividing lines for dividing the spot formed by the ±1st order diffracted light, the total surface area of at least the one or more light receiving elements on the side of positive polarity being substantially equal to the total surface area of at least the one or more light receiving elements on the side of negative polarity; and wherein the focal error detecting circuit generates the difference between the output sums of the light receiving elements on the side of positive polarity and the side of negative polarity as a focal error signal of the light beam.

22. An optical pickup device according to claim 21, wherein the diffractive optical element is a hologram lens which separates transmitted light into 0-th order diffracted light and 1st order diffracted light by means of a diffraction grating provided to an internal area defined inside the annulus;

the second light receiving components each comprise at least two light receiving elements which receive 1st order diffracted light emitted from the internal area of the diffractive optical element and which are disposed adjacent to each other while separated by dividing lines for dividing the spot formed by the 1st order diffracted light, the total surface area of the at least one or more light receiving elements on the side of positive polarity being substantially equal to the total surface area of the at least one or more light receiving elements on the side of negative polarity; and wherein the wave aberration error detecting circuit generates the difference between the output sums of the light receiving elements on the side of positive polarity and the side of negative polarity as a wave aberration error signal of the light beam.

23. An optical pickup device according to claim 21, wherein the diffractive optical element is a hologram lens which separates transmitted light into 0-th order diffracted light and 1st order diffracted light by means of a diffraction grating provided to an external area defined outside the annulus;

the second light receiving components each comprise at least two light receiving elements which receive 1st order diffracted light emitted from the external area of the diffractive optical element and which are disposed adjacent to each other while separated by dividing lines for dividing the spot formed by the 1st order diffracted light, the total surface area of the at least one or more light receiving elements on the side of positive polarity being substantially equal to the total surface area of the at least one or more light receiving elements on the side of negative polarity; and wherein the wave aberration error detecting circuit generates the difference between the output sums of the light receiving elements on the side of positive polarity and the side of negative polarity as a wave aberration error signal of the light beam.

24. An optical pickup device according to claim 15, wherein the hologram lens possesses a function of acting as a concave or convex lens for any of the types of ±1st order diffracted light produced by return light;

the first light receiving components comprise four split light receiving elements which are disposed adjacent to each other with two orthogonal dividing lines as boundaries, and which receive 1st order diffracted light emitted by the annulus of the diffractive optical element and arranged about the point of intersection of the dividing lines; and wherein the focal error detecting circuit generates the difference between the output sums of each diagonally located pair of the four light receiving elements as a focal error signal of the light beam.

25. An optical pickup device according to claim 24, wherein the diffractive optical element is a hologram lens which separates transmitted light into 0-th order diffracted light and 1st order diffracted light by means of a diffraction grating provided to an internal area defined inside the annulus;

the second light receiving components comprise four split light receiving elements which are disposed adjacent to each other with two orthogonal dividing lines as boundaries, and which receive 1st order diffracted light emitted by the internal area of the diffractive optical element and arranged about the point of intersection of the dividing lines; and wherein the wave aberration error detecting circuit generates the difference between the output sums of each diagonally located pair of the four light receiving elements as a wave aberration error signal of the light beam.

* * * * *